(12) United States Patent
Gillard et al.

(10) Patent No.: US 9,979,900 B2
(45) Date of Patent: May 22, 2018

(54) METHOD AND APPARATUS FOR APPLYING A BORDER TO AN IMAGE

(71) Applicant: Sony Corporation, Minato-ku (JP)

(72) Inventors: Clive Henry Gillard, Alton (GB); Robert Mark Stefan Porter, Winchester (GB)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 14/177,563

(22) Filed: Feb. 11, 2014

(65) Prior Publication Data
US 2014/0300687 A1    Oct. 9, 2014

(30) Foreign Application Priority Data

Apr. 4, 2013   (GB) .................................. 1306050.4
Nov. 14, 2013  (GB) .................................. 1320154.6

(51) Int. Cl.
*H04N 7/00*    (2011.01)
*H04N 5/265*   (2006.01)
(Continued)

(52) U.S. Cl.
CPC .............. *H04N 5/265* (2013.01); *G06T 3/00* (2013.01); *G06T 15/20* (2013.01); *H04N 5/23238* (2013.01); *H04N 5/2628* (2013.01)

(58) Field of Classification Search
CPC ....... G06T 15/20; G06T 3/00; H04N 5/23238; H04N 5/265; H04N 5/2628
(Continued)

(56) References Cited

U.S. PATENT DOCUMENTS 8,391,641 B2   3/2013  Porter
8,717,412 B2 *  5/2014  Linder .................. G03B 37/00
                                                    348/222.1
(Continued)

FOREIGN PATENT DOCUMENTS

CN       101119442 A       2/2008
EP       1 530 360 A2      5/2005
JP       2011-248630       12/2011

OTHER PUBLICATIONS

U.S. Appl. No. 13/777,759, filed Feb. 26, 2013, 2013/0163817 A1, Robert M. Porter et al.
(Continued)

*Primary Examiner* — Mohammed Rahaman
*Assistant Examiner* — Richard Carter
(74) *Attorney, Agent, or Firm* — Oblon, McClelland, Maier & Neustadt, L.L.P.

(57) ABSTRACT

Disclosed is a method for generating an image, comprising: obtaining a first image comprised of a first area being a plurality of images having different field of views of a real-life scene and captured from a location above the real-life scene stitched together to form a panoramic view of the real-life scene, and a second area which does not include the plurality of images; generating a second image which is a segment of the first image; determining whether the second image includes only the first area; and when the second image includes both the first area and at least part of the second area, the method further comprises: applying a border to the second image that extends along an upper boundary and along a lower boundary of the second image, the border being applied above the upper boundary and below the lower boundary.
A corresponding device is also disclosed.

11 Claims, 33 Drawing Sheets

(51) Int. Cl.
*H04N 5/232* (2006.01)
*H04N 5/262* (2006.01)
*G06T 3/00* (2006.01)
*G06T 15/20* (2011.01)

(58) Field of Classification Search
USPC .................................. 348/36, 222.1, 239
See application file for complete search history.

(56) References Cited

U.S. PATENT DOCUMENTS

| | | | |
|---|---|---|---|
| 2005/0099494 A1* | 5/2005 | Deng .................. | H04N 1/2112 |
| | | | 348/36 |
| 2005/0185070 A1* | 8/2005 | Cheatle .............. | H04N 5/23293 |
| | | | 348/239 |
| 2007/0052851 A1* | 3/2007 | Ochs .................. | H04N 5/44513 |
| | | | 348/556 |
| 2009/0021576 A1 | 1/2009 | Linder et al. | |
| 2010/0097443 A1* | 4/2010 | Lablans ................ | G03B 37/00 |
| | | | 348/36 |
| 2011/0052093 A1 | 3/2011 | Porter | |
| 2012/0250980 A1 | 10/2012 | Gillard et al. | |
| 2013/0163817 A1 | 6/2013 | Porter et al. | |

OTHER PUBLICATIONS

U.S. Appl. No. 13/418,987, filed Mar. 13, 2012, 2012/0250980 A1, Clive H. Gillard et al.

Office Action dated Nov. 16, 2017 in Chinese Patent Application No. 2014101336128, (English translation only).

* cited by examiner

US 9,979,900 B2

METHOD AND APPARATUS FOR APPLYING A BORDER TO AN IMAGE

BACKGROUND

Field of the Disclosure

The present disclosure relates to a method and apparatus for applying a border to an image.

Description of Related Art

It is known to generate an ultra-high definition image of a scene from a concatenation of lower definition images stitched together. It is also known to generate a cut out from the ultra-high definition image. By moving the cut out around the ultra-high definition image, and displaying the cut out on a separate display that is of a lower resolution than the ultra-high definition image, a viewer of the lower resolution display has the illusion that they are viewing a virtual camera output. That is, the user will feel that the cut out is in fact a camera capturing the image. This allows a real life scene to be captured by stationary cameras and an editor located in an editing suite to control the view of the scene sent to the viewer. However, with increased resolution achievable in the ultra-high definition image, it is possible to apply this virtual camera view to high definition displays. However, given the increased resolution of these displays, it is necessary to ensure that any ambiguities provided by the use of the cut out are reduced where possible. It is an aim of the disclosure to address this.

SUMMARY

The foregoing paragraphs have been provided by way of general introduction, and are not intended to limit the scope of the following claims. The described embodiments will be best understood by reference to the following detailed description taken in conjunction with the accompanying drawings.

A method, apparatus and computer program for generating an image, comprising obtaining a first image comprised of a first area being a plurality of images having different field of views of a real-life scene and captured from a location above the real-life scene stitched together to form a panoramic view of the real-life scene, and a second area which does not include the plurality of images and generating a second image which is a segment of the first image and determining whether the second image includes only the first area; and when the second image includes both the first area and at least part of the second area, and further comprising applying a border to the second image that extends along an upper boundary and along a lower boundary of the second image, the border being applied above the upper boundary and below the lower boundary.

BRIEF DESCRIPTION OF DRAWINGS

Embodiments of the present disclosure will now be described, by way of example only and with reference to the accompanying drawings, in which.

DESCRIPTION OF THE EMBODIMENTS

Figure 1:
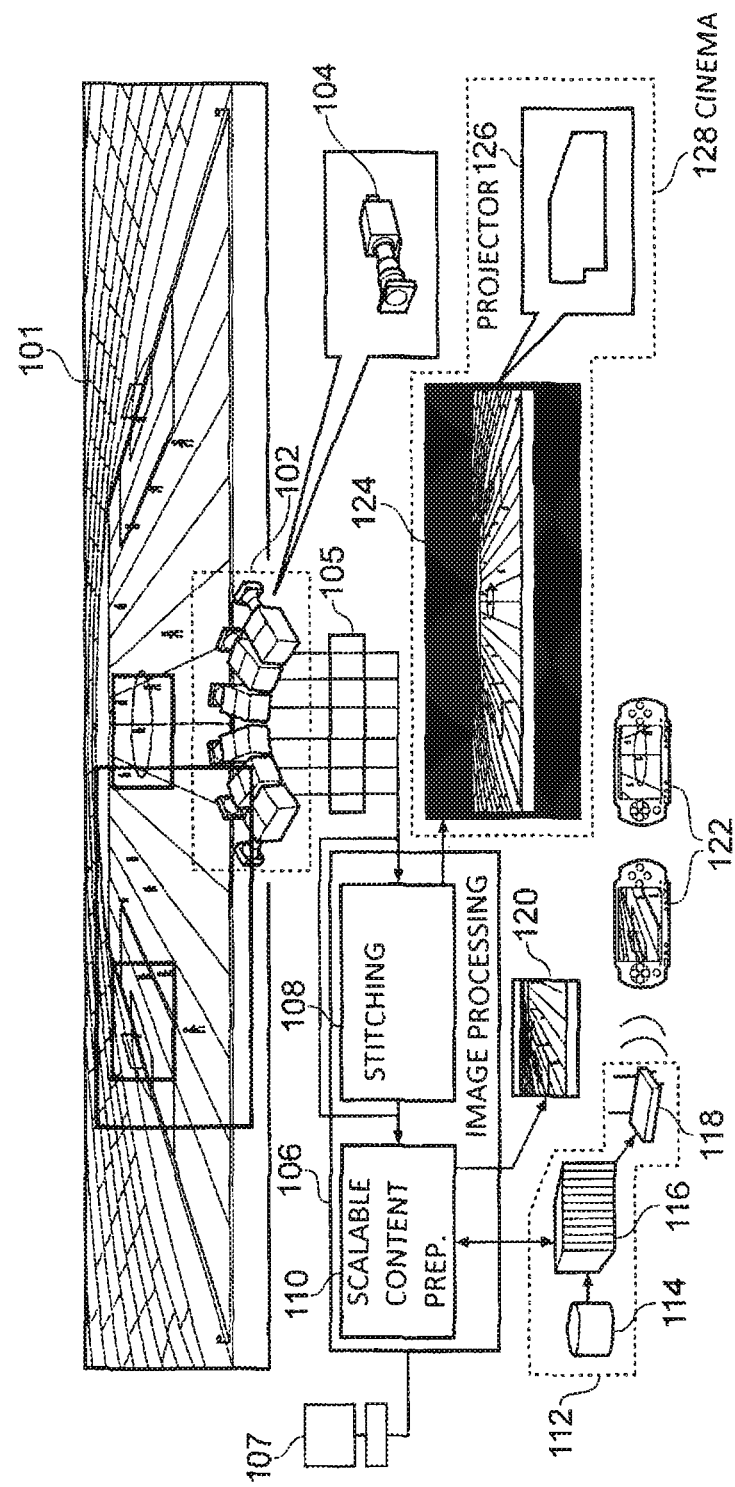
FIG. 1 is a schematic diagram showing a system for capturing elementary images which form a composite image and are aligned according to one embodiment of the present disclosure.

According to embodiments of the disclosure, there is provided a method of generating an image, comprising: obtaining a first image comprised of a first area being a plurality of images having different field of views of a real-life scene and captured from a location above the real-life scene stitched together to form a panoramic view of the real-life scene, and a second area which does not include the plurality of images; generating a second image which is a segment of the first image; determining whether the second image includes only the first area; and when the second image includes both the first area and at least part of the second area, the method further comprises: applying a border to the second image that extends along an upper boundary and along a lower boundary of the second image, the border being applied above the upper boundary and below the lower boundary.

This may further comprise: determining the co-ordinates of the upper corners of each of the plurality of images; applying a transform to the upper corner co-ordinates to obtain transformed upper corner co-ordinates; determining the co-ordinates of the lower corners of each of the plurality of images; applying a transform to the lower corner co-ordinates to obtain transformed lower corner co-ordinates; and determining the upper boundary as passing through the lowest of the transformed upper corner co-ordinates and determining the lower boundary as passing through the highest of the transformed lower corner co-ordinates.

In this case, the upper boundary may be a horizontal line passing through the lowest transformed upper corner co-ordinate and the lower boundary is a horizontal line passing through the highest transformed lower co-ordinate.

The step of determining whether the second image includes only the first area may comprise the steps of: determining whether the second image includes the lowest of the transformed lower corner co-ordinates and the highest of the transformed upper corner co-ordinates, whereby when the second image does include both the lowest of the transformed upper corner co-ordinates and the highest of the transformed lower corner co-ordinates, then determining that the second image includes both the first area and the second area.

The step of determining whether the second image includes only the stitched image may comprise the steps of: determining whether the centre of the second image is located between the lowest of the transformed lower corner co-ordinates and the highest of the transformed upper corner co-ordinates.

A computer program containing computer readable instructions which, when loaded onto a computer, configure the computer to perform a method according to the above is also envisaged.

A computer program product configured to store computer readable instructions, which when loaded onto a computer, configure the computer to perform a method according to the above is envisaged.

According to embodiments, there is provided a device for generating an image, comprising: an imaging unit configured to obtain a first image comprised of a first area being a plurality of images having different field of views of a real-life scene and captured from a location above the real-life scene stitched together to form a panoramic view of the real-life scene, and a second area which does not include the plurality of images; an image processing unit configured to i) generate a second image which is a segment of the first image; ii) determine whether the second image includes only the first area; and when the second image includes both the first area and at least part of the second area, the image processing unit is further configured to: apply a border to the second image that extends along an upper boundary and along a lower boundary of the second image, the border being applied above the upper boundary and below the lower boundary.

The image processing unit may be further configured to: determine the co-ordinates of the upper corners of each of the plurality of images; apply a transform to the upper corner co-ordinates to obtain transformed upper corner co-ordinates; determine the co-ordinates of the lower corners of each of the plurality of images; apply a transform to the lower corner co-ordinates to obtain transformed lower corner co-ordinates; and determine the upper boundary as passing through the lowest of the transformed upper corner co-ordinates and determining the lower boundary as passing through the highest of the transformed lower corner co-ordinates.

The upper boundary may be a horizontal line passing through the lowest transformed upper corner co-ordinate and the lower boundary is a horizontal line passing through the highest transformed lower co-ordinate.

The image processing unit may be further configured, when determining whether the second image includes only the first area, to: determine whether the second image includes the lowest of the transformed lower corner co-ordinates and the highest of the transformed upper corner co-ordinates, whereby when the second image does include both the lowest of the transformed upper corner co-ordinates and the highest of the transformed lower corner co-ordinates, then determining that the second image includes both the first area and the second area.

The image processing unit may be further configured, when determining whether the second image includes only the stitched image to:
determine whether the centre of the second image is located between the lowest of the transformed lower corner co-ordinates and the highest of the transformed upper corner co-ordinates.

Generation of Stitched Image

Referring to FIG. 1, the live event 101, which in this example is a soccer match is held in a venue, which in this example is a stadium.

A camera cluster 102, which in this Figure consists of six individual cameras 104 arranged in a certain configuration (but in FIG. 6 consists of two individual cameras 104), is positioned at an appropriate vantage point in the stadium. The configuration of the camera cluster 102 will be explained in more detail with reference to FIGS. 2A, 2B and 2C. However, in summary, the camera cluster 102 is configured so that the field of view of each camera 104 within the camera cluster 102 overlaps to a small degree with the field of view of an adjacent camera 104 in the camera cluster 102. Thus, the entire live event is covered by panoramic view generated by the totality of the field of view of the camera cluster 102. The vantage point may be at an elevated position in the stadium.

In this embodiment, each camera 104 is a 4K camera whose having a resolution of 3840×2160 pixels. Additionally, each camera 104 operates in progressive mode rather than interlaced mode. This makes processing of the images generated by the cameras 104 easier. However, the skilled person will appreciate that each camera 104 may, alternatively, operate in interlaced mode. The camera cluster 102 is used to produce a video stream of the soccer match. As the skilled person would appreciate, although the camera cluster 102 is described as being composed of a number of individual cameras 104, the present disclosure is not so limited. Indeed, the camera cluster need not be made up of a concatenation of complete cameras 104, merely camera elements that each produce an image output. The camera cluster 102 may therefore be a single unit.

In addition to the camera cluster 102, one or more microphones (not shown) may also be provided proximate the camera cluster 102 or disparate to the camera cluster 102 to provide audio coverage of the soccer match.

The output of each camera 104 in the camera cluster 102 is fed to a chromatic aberration corrector 105. In this example, each camera 104 within the camera cluster 102, produces an individual video output and so the camera cluster 102 has, in this case, two outputs. However, in other embodiments only one output of the camera cluster 102 may instead be used which is the multiplexed output of each of the two cameras 104. The output of the chromatic aberration corrector 105 is fed to an image stitching means 108 and a scalable content preparation means 110 which both form part of an image processing device 106 which is an embodiment of the present disclosure. The image processing device 106 consists of the image stitching means 108 and the scalable content preparation means 110 and in this embodiment, will be realised on a computer. The output of the image stitching means 108 is connected to the scalable content preparation means 110.

The image stitching means 108 takes each high definition image (or elementary image) captured by the respective camera 104 in the camera cluster 102 and combines them so as to produce a panoramic view of the venue. It is important to note that in this embodiment, the output of the image stitching means 108 is not simply the same view as taken using a wide angle lens. The output of image stitching means 108 is a tapestry, or conjoined, version of the output of each individual camera 104 in the camera cluster 102. This means that the output of the image stitching means 108 has a resolution of approximately 8000×2000 (or at or around 8K resolution) rather than a resolution of 4K as would be the case if one 4K camera was fitted with a wide angle lens. The conjoined image (or composite image) is therefore an ultra high resolution image. The advantages of the high definition arrangement are numerous including the ability to highlight particular features of a player without having to optically zoom and therefore affecting the overall image of the stadium. Further, the automatic tracking of an object is facilitated because the background of the event is static and there is a higher screen resolution of the object to be tracked. The image stitching means 108 is described in more detail with reference to FIG. 3.

The output of the image stitching means 108 is fed to either the scalable content preparation means 110 and/or one or more Super High Definition cinemas 128. In this embodiment, the or each super high definition cinema 128 is in a different location to the venue. This allows many spectators who are unable to attend the stadium due to shortage of capacity, or the location of the stadium, to view the live event. Additionally or alternatively, other locations around a stadium may be used to situate the super high definition cinema 128. For example, a bar in the stadium serving refreshments may be used.

The scalable content preparation means 110 is used to generate an image from the ultra high resolution output of the image stitching means 108 so that it may be used by one or more High Definition televisions 120, personal display device 122 having a screen size smaller than the super high definition cinemas 124. The scalable content preparation means 110 may generate either a scaled down version of the ultra high resolution image or may generate a segment of the ultra high resolution image using the mapping technique explained hereinafter. In one embodiment, the personal display device 122 is a PlayStation® Vita (PS Vita®). However, it is envisaged that the personal display device 122 may also be a cell phone, tablet, laptop, Personal Digital Assistant or the like or any combination thereof. Indeed, the personal display device 122 may also be a television or any display device having a resolution smaller than a super high definition cinema showing the super High Resolution image 101. Additionally, the scalable content preparation means 110 also implements an automatic tracking algorithm to select parts of the ultra-high resolution image to produce video streams for display on the personal display device 122. For example, the scalable content preparation means 110 may automatically track the ball or a particular player or even produce fixed shots of a particular special event, such as scoring a goal in a soccer match or a touch-down in a US Football game. The scalable content preparation means 110, as will be explained later, allows a virtual camera output to be created. In other words, the output of the scalable content preparation means 110 takes a cut-out from the super high resolution image. The cut-out is then transformed to make it appear to come from a camera pointing at that location within the captured scene. This transformation will be explained later under the heading "Virtual Camera". The output of the virtual camera will be provided on computer 107 so that a user of the computer 107 may control the virtual camera view. This control may be via a dedicated editing control joystick allowing the user to easily move the virtual camera around the stitched image. In order to assist the user of the computer 107, a wire box may be superimposed on the stitched image to identify to the user where the virtual camera is pointing (i.e. which segment of the stitched image is fed over distribution means 118.

The output of the scalable content preparation means 110 is fed to the distribution means 112. The distribution means 112 consists of a content database 114 that stores content which may be also distributed, for example replays of special events, or further information relating to a particular player etc. Also within the distribution means 112 is a data streaming means 116 which converts the content to be distributed, either from the scalable content preparation means 110 or from the content database 114 into a format that has an appropriate bandwidth for the network over which the streamed data is to be fed or broadcast. For example, the data streaming means 116 may compress the stream such that it can be fed over an IEEE 802.11b WiFi network or over a cellular telephone network or any appropriate network, such as a Bluetooth network or a Wireless Network. In this embodiment, the network is a WiFi network which is appropriate for the personal display device 122 so the output of the data streaming means 110 is fed to a Wireless Router 118. Although the foregoing describes the data being fed over a WiFi network or a cellular telephone phone network, the disclosure is not so limited. The data streaming means 116 may compress the stream for broadcast over any network which supports streaming video data such as a $3^{rd}$ or $4^{th}$ generation cellular network, Digital Video Broadcast-Handheld (DVB-H) network, DAB network, T-DMB network, MediaFLO® network or the like.

Although, in this part of the disclosure, the distribution means 112 provides the output from the scalable content preparation means 110 over a network, the distribution means 112 may be a broadcaster so that the output of the scalable content preparation means 110 may be distributed over a television network for users to watch in their own home.

The super high definition cinema 124 includes a large screen projector 126 and a screen 124. The output of the image stitching means 108 is fed to the large screen projector 126. In order to provide adequate resolution, the large screen projector 126 may have a display resolution of 8000×2000 pixels (or even 8K resolution) or may consist of two conjoined projectors each having a resolution of 4000×2000 pixels (or even two 4K projectors). Additionally, the large screen projector 126 may include watermarking technology which embeds a watermark into the displayed image to prevent a user viewing the live event in the super high definition cinema 124 from making an illegal copy of the event using a video camera. Watermarking technology is known and will not be explained in any further detail.

Figures 2A, 2B:
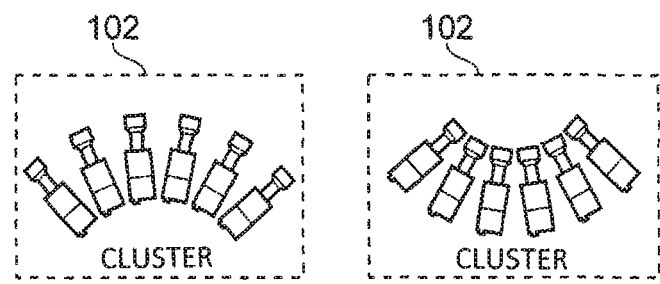
FIGS. 2A and 2B are diagrams showing two alternative camera configurations used in the system of FIG. 1.

Referring to FIG. 2A, in one embodiment, the lenses of the cameras 104 in the camera cluster 102 are arranged in a horizontally convex manner. In the alternative embodiment in FIG. 2B, the camera lenses of cameras 104 in the camera cluster 102 are arranged in a horizontally concave manner. In either of the two alternative configurations, the cameras 104 in the camera cluster 102 are arranged to produce the minimum parallax effect between adjacent cameras 104 in the camera cluster 102. In other words, the cameras 104 in the camera cluster 102 are arranged such that the focal point of a pair of adjacent cameras are the closest together. The cameras 104 in the arrangement of FIG. 2B have been found to produce a slightly lower parallax error between adjacent cameras 104 than those of FIG. 2A.

Figure 2C:
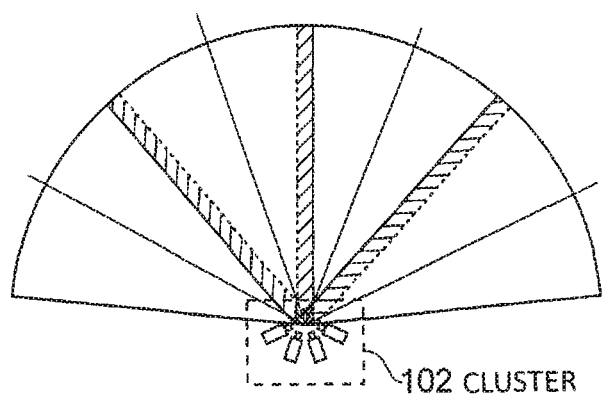
FIG. 2C is a diagram showing the field of vision of the camera cluster shown in FIG. 2B.

In FIG. 2C, the field of view of the camera cluster 102 formed of four cameras arranged in a horizontally concave manner is shown. This is for ease of understanding and the skilled person would appreciate that any number of cameras can be used, including six as is the case with FIG. 1 or two as is the case with FIG. 6. As noted above, in order to ensure that the entire event is captured by the camera cluster 102, in embodiments of the present disclosure, the field of view of one camera 104 in the camera cluster 102 slightly overlaps the field of view of another camera 104 in the camera cluster 102. This overlap is shown by the hashed area in FIG. 2C. As is explained hereinafter, the effect of the overlap in the conjoined image is reduced in the image stitching means 108. In the camera cluster 102 arranged in the horizontally concave manner, the amount of overlap between the field of view of different, adjacent, cameras 104 is substantially constant regardless of distance from the camera cluster 102. As the amount of overlap is substantially constant, the processing required to reduce the effect of the overlap is reduced. Although the above is described with reference to arranging the cameras in a horizontal manner, the skilled person will appreciate that the cameras may be arranged in a vertical manner.

As described in relation to FIG. 1, the output from the camera cluster 102 is fed into the chromatic aberration corrector 105. The chromatic aberration corrector 105 is known, but will be briefly described for completeness. The chromatic aberration error is corrected for each camera 104. The chromatic aberration manifests itself particularly at the edge of images generated by each camera 104. As already noted, the image output from each camera is 104 is stitched together. Therefore, in embodiments, the chromatic aberration is reduced by the chromatic aberration corrector 105 to improve the output ultra high resolution image.

The chromatic aberration corrector 105 separates the red, green and blue components of the image from each camera 104 for individual processing. The red and green and blue and green components are compared to generate red and blue correction coefficients. Once the red and blue correction coefficients are generated, the red and blue corrected image components are generated in a known manner. The corrected red and blue image components are then combined with the original green image. This forms a corrected output for each camera 104 which is subsequently fed to the image stitching means 108.

The image stitching means 108 then aligns the elementary images according to embodiments of the present disclosure to improve the appearance of the stitched image and then combines the aberration corrected individual outputs from each camera 104 into the single ultra high definition image. The aligning process is described with reference to FIG. 7 and the combining process is described with reference to FIG. 3.

The output from the chromatic aberration corrector 105 is fed into an image alignment means 301 according to embodiments of the disclosure and a virtual image projection means 304. The output of the image alignment means 301 is fed a camera parameter calculation means 302. The output of the camera parameter calculation means 302 generates camera parameters which minimise the error in the overlap region between two adjacent cameras 104 and improves the overall alignment of the elementary images in the composite image. In this embodiment, the error is the average mean squared error per pixel, although the disclosure is not so limited. Also, in this embodiment only the roll, pitch, yaw, barrel and focal length of each camera 104 are calculated. As the cameras 104 have similar focal lengths (the values of which are calculated) to reduce the parallax effect noted above and focal points, the relative position between the cameras is not considered. It is envisaged that other parameters are also found, and correction of lens distortion is performed before the alignment process according to embodiments of the present disclosure takes place. Other errors such as spherical aberration, and the like may also be corrected. Additionally, it is noted that chromatic aberration correction may again be performed after the alignment phase or after generation of the ultra high definition image.

The camera parameters are fed into the virtual image projection means 304. The output of the virtual image projection means 304 is fed into a colour correction means 306. The output of the colour correction means 306 is fed into an exposure correction means 308. The output of the exposure correction means 308 is fed into a parallax error correction means 310. The output of the parallax error correction means 310 is the single ultra high definition image. As noted earlier, it is possible to use an image generated by one camera. In this case, the virtual image projection means 304 would not be required.

Figure 4:
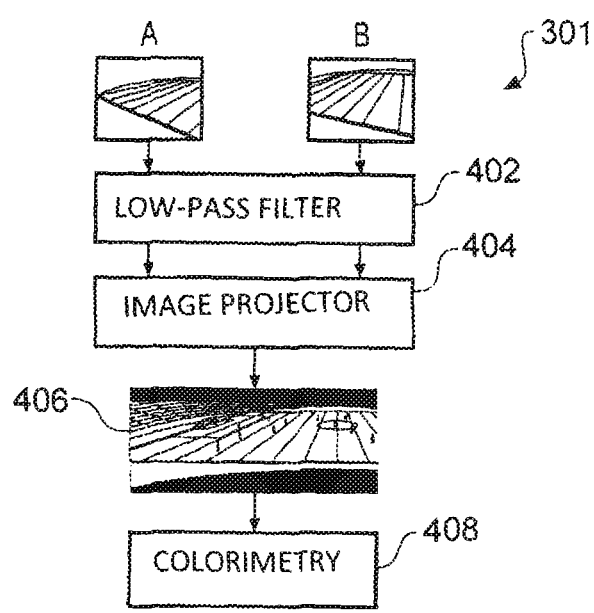
FIG. 4 is a diagram describing the stitching process shown in FIG. 3.

The image alignment means 301 is described with reference to FIG. 4. It is to be noted that the following only describes finding the camera parameters for two adjacent cameras. The skilled person will appreciate that using this method, the camera parameters for any number of cameras can be found.

Live images A and B are generated by two respective adjacent cameras 104 in the camera cluster 102. Before the elementary images can be stitched together, they are aligned according to embodiments of the present disclosure. This alignment process is discussed with reference to FIGS. 5-10.

After the elementary images have been aligned, in order to minimise the error in the overlap region, a hierarchical search technique is used by the image alignment means 301. Using this method, it is assumed that the camera producing image A is fixed. Both live images are fed into a low pass filter 402. This removes the fine details of the image. By removing the fine detail of the image, the likelihood of the search finding a local minimum is reduced. The amount of filtering applied to each image may be varied during the search. For example, at the start of the search, a greater amount of filtering may be applied compared to at the end of a search. This means that an approximate value of the parameters may be generated and may be refined towards the end of the search allowing a greater amount of detail to be considered and to improve the results.

Figure 3:
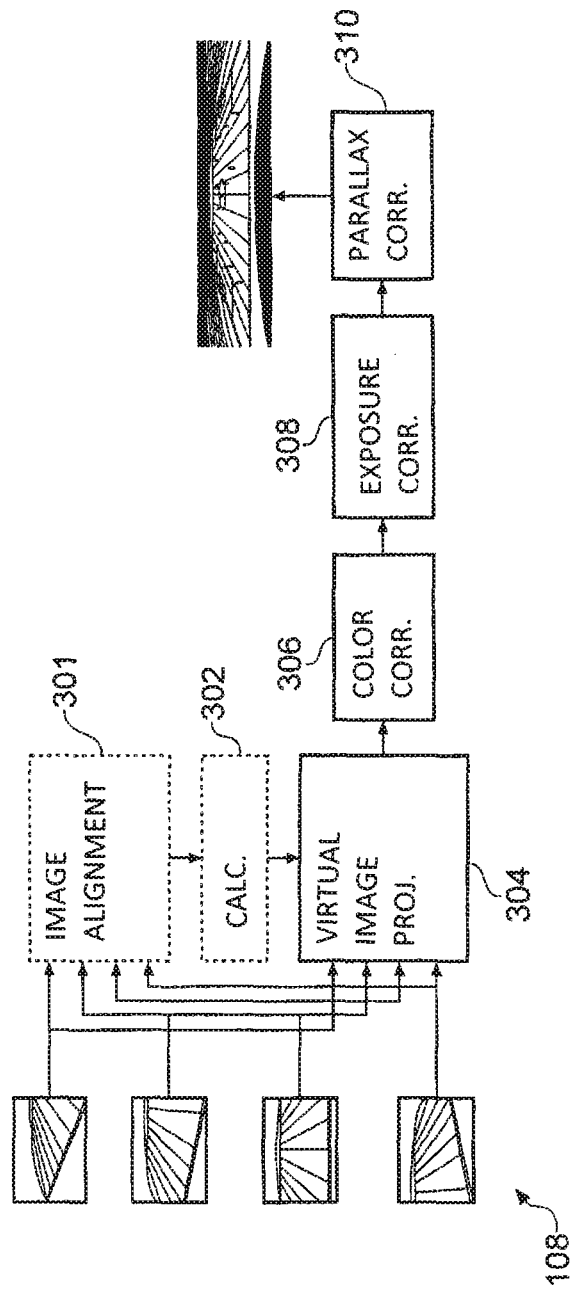
FIG. 3 is a diagram describing the stitching process aligned according to an embodiment of the present disclosure.

The low pass filtered images are then fed into the virtual image projection means 304 shown in FIG. 3. The virtual image projection means 304 is used to compensate for the fact that each camera 104 in the camera cluster 102 is facing in a different direction but the ultra high resolution image to be generated should appear to come from one camera pointing in one direction. The virtual image projection means 304 therefore maps one pixel of light received by one camera 104 onto a virtual focal plane. The virtual focal plane corresponds to the focal plane which would have been produced by a virtual camera capable of capturing the panoramic view with ultra high resolution. In other words, the output of the virtual camera would be the stitched ultra high resolution image. The manner in which the virtual image projection means 304 operates is known and is discussed in GB2444533 A and so will not be discussed any further here.

Returning to FIG. 4, after the image has been mapped by the virtual image projection means 304 (resulting in a shot similar to that shown in 406), the mapped image is fed into an exposure corrector 408. The exposure corrector 408 is configured to analyse the exposure and/or colourimetry of the overlap images produced by each camera 104 in the camera cluster 102. With this information, the exposure corrector 408 adjusts the exposure and/or colourimetry parameters of one camera to match those of the other camera. Alternatively, the exposure and/or colourimetry settings of one camera are adjusted such that any sudden changes in exposure and/or colourimetry are removed. However, it is possible that a combination of the above alternatives is utilised. It is advantageous to correct the exposure and/or colourimetry during the alignment process as this results in improved camera parameters. However, it is envisaged that such parameters need not be corrected during the alignment process. If such parameters are not considered during alignment of the cameras, then such correction can be carried out on the images output from the cameras. In this case, it is to be noted that adjusting the image output from one camera to match the exposure and/or colourimetry of the other image may increase the overall dynamic range of the image which would require additional storage and/or processing.

The image output from the exposure corrector 408 is the composite image.

It is noted that although the alignment process has been described with reference to live images, it is possible to use a calibration target which is held in front of the camera. However, using this technique has one distinct disadvantage. For a live event, the calibration target may need to be very large (in excess of 10 meters). Additionally, using live images means that if the camera(s) within the cluster move slightly, for example, due to wind, small adjustments can be made in real-time without affecting the live stream. For example, one of the previously stored minima could be used and the alignment process re-calibrated. Accordingly, the camera parameters may be determined "off-line" i.e. not live on air, or "on-line" i.e. live on air if the re-calibration of cameras is required.

Returning now to FIG. 3, the image stitching means 108 will be further described. After the camera parameters have been established according to embodiments of the present disclosure, the image output from each camera is fed into a second image projection means 304. The output from the second image projection means 304 is fed into a colour corrector 306. The output from the colour corrector 306 is fed into an exposure corrector 308. It is noted here that the functionality of the second image projection means 304, the colour corrector 306 and the exposure corrector 308 is the same as the image projector 404 and exposure and/or colourimetry corrector 408 described with reference to FIG. 4. This means that the ultra high definition image is subjected to the same corrections as the individual images output from the cameras 104.

The output of the exposure corrector 308 is fed into a parallax error corrector 310. The parallax error corrector 310 prevents "ghosting" which is caused when an object located in the overlap region of two camera images appears twice when the images are stitched together.

In order to address this, in the stitched image, a mask is generated for each of the overlap regions. It is then assumed that any significant errors within the mask are caused by the parallax phenomenon. These errors are quantified using the mean squared average error between pixels in the overlap region. This is a valid assumption as the alignment process minimised any errors due to camera parameters. All individual objects within the masks are labelled using known morphological and object segmentation algorithms. If the significant error between pixels in the overlap region is below a threshold then the two images are blended together. Alternatively, in areas where the error is high, ghosting is deemed to have taken place and only one image from one camera is used. In order to reduce the parallax phenomenon, it is desirable to have the focal points of each camera close together.

Figure 5:
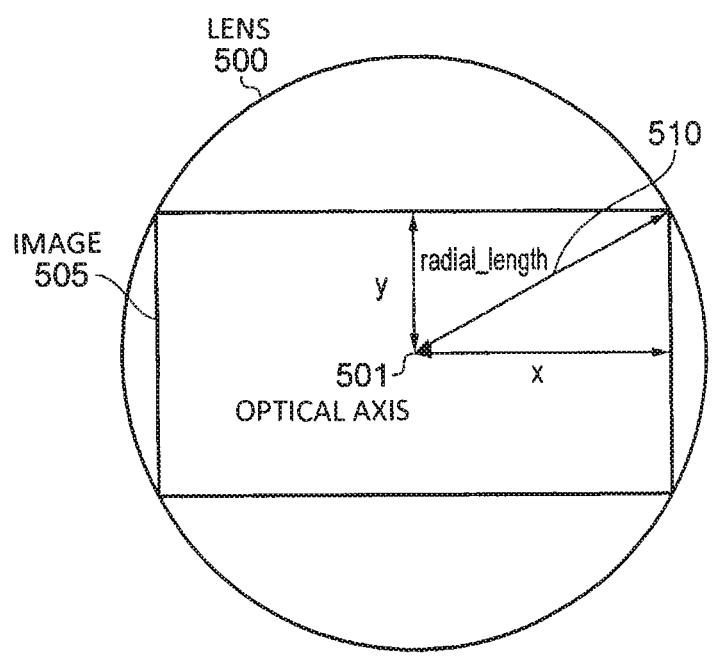
FIG. 5 shows a schematic diagram illustrating the correction for lens distortion.

The alignment process according to embodiments of the present disclosure will now be described. Referring to FIG. 5, a lens 500 of one of the camera elements 104 is shown. As is understood by the skilled person, a lens 500 has barrel distortion and/or pin-cushion distortion. Collectively, these are referred to as "lens distortion". These distortions are particularly noticeable if the captured image is a large distance from the lens 500 and typically results in straight lines appearing to droop as the line extends away from the optical axis 501 of the lens 500. In other words, as a straight line extends towards the edge of a field of view (in this case a 16:9 image shown by box 505), the straight line will drop as it approaches the edge. In order to improve the quality of the stitched image, and to particularly improve the appearance of straight lines across the image, the lens distortion is corrected before the alignment process of embodiments of the disclosure takes place.

In order to correct for these distortions, the position of each pixel in the image is converted into an offset from the centre of the image normalised by half the width of the image. In the case of the image being a 16:9 ratio image, the x (or horizontal) value of the offset will be between −1 and +1. In other words, the x-coordinate of the pixel will be an offset from −1 to +1. The y (or vertical) value of the offset will be between −9/16 and +9/16. This is calculated by using the following relationships:

$$x = (\text{image\_col} - \text{image\_width}/2)/(\text{image\_width}/2)$$

$$y = (\text{image\_height}/2 - \text{image\_row})/(\text{image\_width}/2)$$

Whereby image_col is the value of the position of the x co-ordinate; image_width is the total image width; and image_row is the value of the position of the y co-ordinate.

The radial length between the centre of the image (the optical axis 501) and each pixel is then calculated. This is calculated using Pythagoras' theorem such that the calculated radial length is normalised to give a value of 1 at the edge of the lens using the equation $$\text{radial\_length}^2 = (x^2 + y^2)/(1.0^2 + 0.5625^2)$$

The new position value of each pixel (x',y') is then calculated such that $$x' = x - x * \text{correction\_factor} * CCD\_\text{factor} * (1 - \text{radial\_length\_squared})$$

$$y' = y - y * \text{correction\_factor} * CCD\_\text{factor} * (1 - \text{radial\_length\_squared})$$

where
correction_factor>0.0 for correcting barrel distortion; correction_factor<0.0 for correcting pin cushion distortion; and correction_factor=0.0 for no lens distortion correction.

The term CCD_factor is a constant which is dependent upon the CCD size of the camera element 104. In one embodiment, the value of CCD_factor in 1.702 and correction_factor is −0.022 which corrects for typical amounts of pin cushion distortion on a wide angle lens.

In embodiments, the user of the system manually identifies the distortion on the image and applies a correction. Typically, this is done by identifying a straight line in the scene (for instance, a line on the soccer pitch) and choosing a value for correction_factor that makes the line appear straight on the image. This may be done manually, or by clicking on the line in the image and dragging the line so that it corresponds with the straight line on the pitch. It is possible to perform this lens distortion correction for each camera element 104 in the camera array. Alternatively, it is possible to assume that the lenses in each camera element 104 within the array are well matched and to apply the correction_factor to each camera element 104.

After lens distortion has been corrected, the alignment of the elementary images captured by the camera elements 104 according to embodiments of the present disclosure takes place so that these images may be stitched together to form the composite image.

Figure 6A:
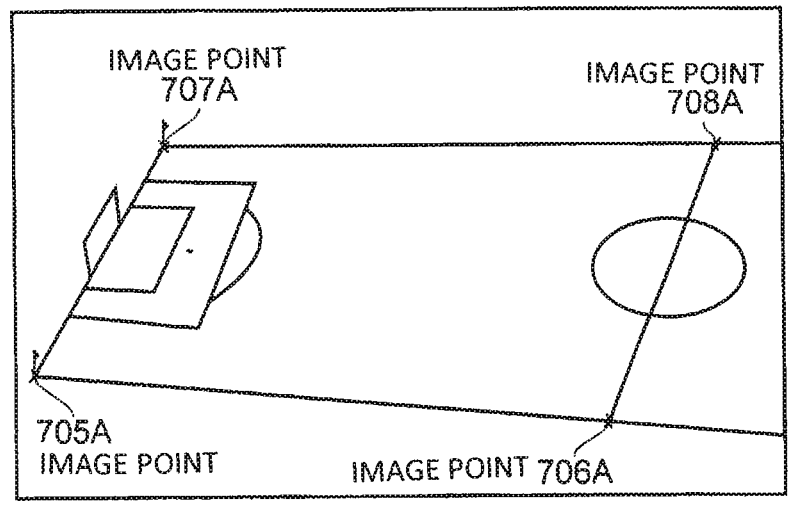
FIG. 6 shows a schematic diagram of outputs from two cameras which are used in the system of FIG. 1 to capture the composite images.
Figure 6B:
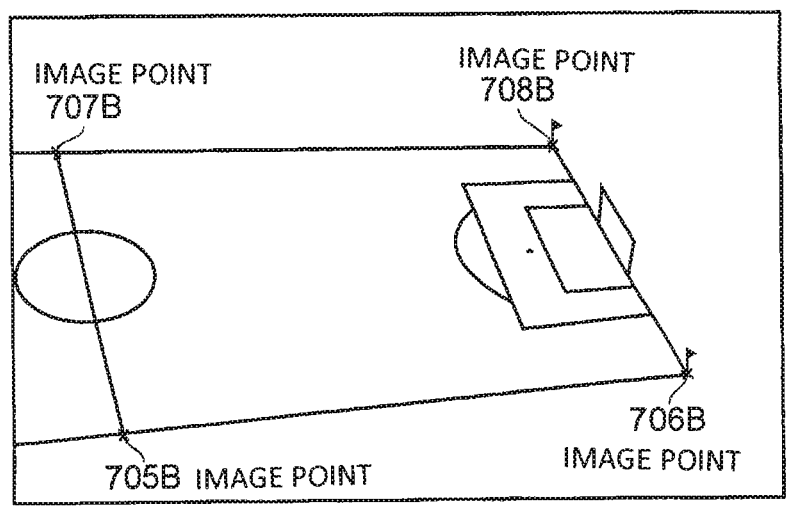

Firstly, the user of the system of FIG. 1 selects the left camera feed (i.e. camera feed A in FIG. 6). The user then selects four image points on the image (705A, 706A, 707A and 708A). It is noted here that the four points are located towards the edge of the image. These points are called "corresponding points" and will be explained later.

The user then selects the second of the camera feeds. The user then selects four image points on the image (708B, 705B, 706B, 707B). It should be noted here that image point 706A and 705A are also "corresponding points". A "corresponding point" means a point in the image that refers to a specific point in the scene. In other words, image point 706A and 705B refer to the same point in the scene and similarly image point 707B and 708A also refer to the same point in the scene. Consequently, point 705B and 707B and 706A and 708A are in an area of overlap between the image feed from camera A and B and image point 705B will overlap with image point 706A and image point 707B will overlap with image point 708A.

Image points 705A and 707A are located near the respective corner flags of the soccer pitch. This is because, as will be explained later, in embodiments image point 705A is located on the same straight line in the scene as image point 706A and image point 707A is located on the same straight line in the scene as image point 708A. As will be explained later, in embodiments of the disclosure, the gradient of the straight lines within the scene will be measured. Therefore, by separating image point 708A and 707A and 706A and 705A as far as possible, the resolution of any gradient measure will be increased and will thus increase the accuracy of the gradient measure.

Figure 7:
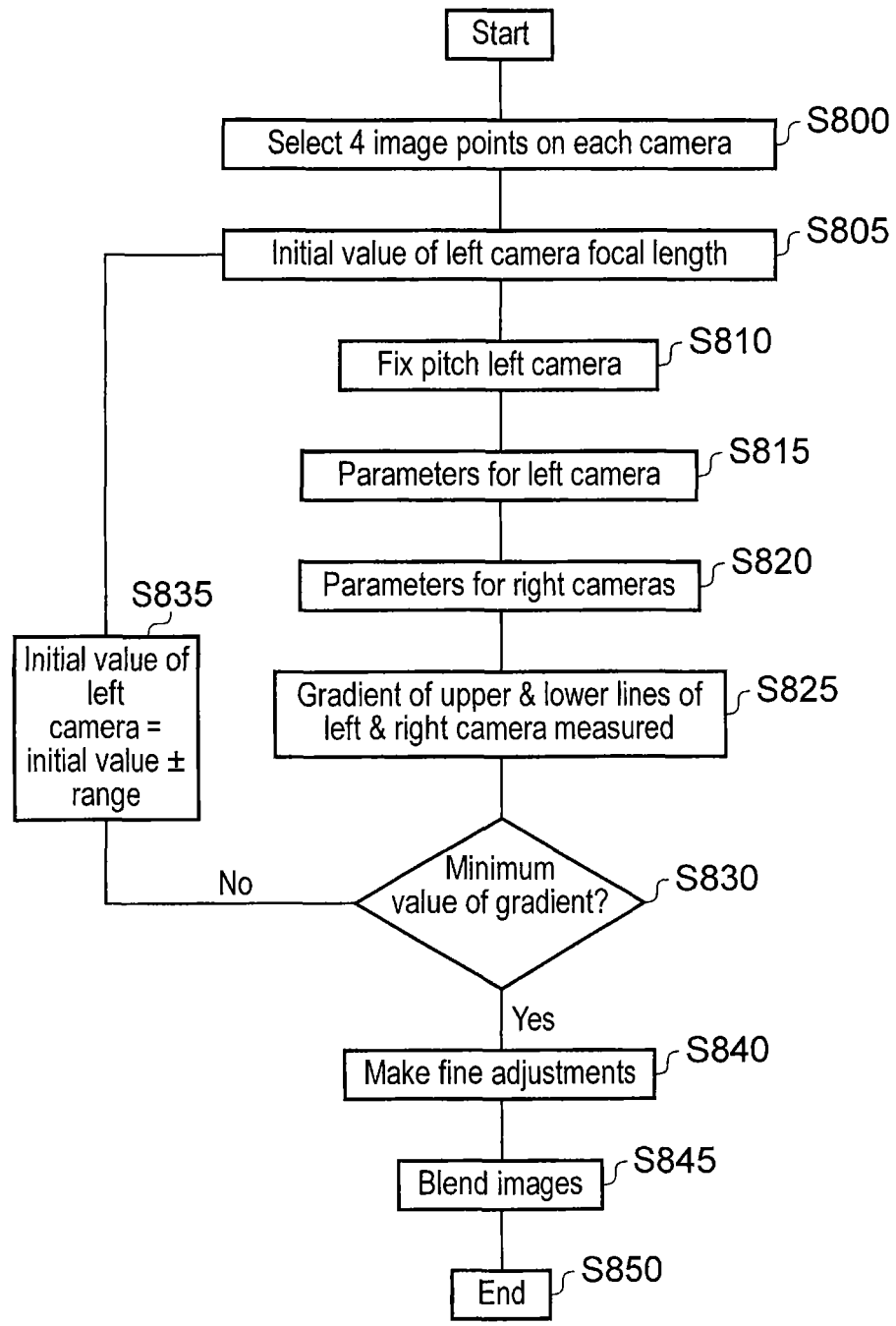
FIG. 7 shows a flow diagram explaining the alignment process according to embodiments of the present disclosure.
Figure 8:
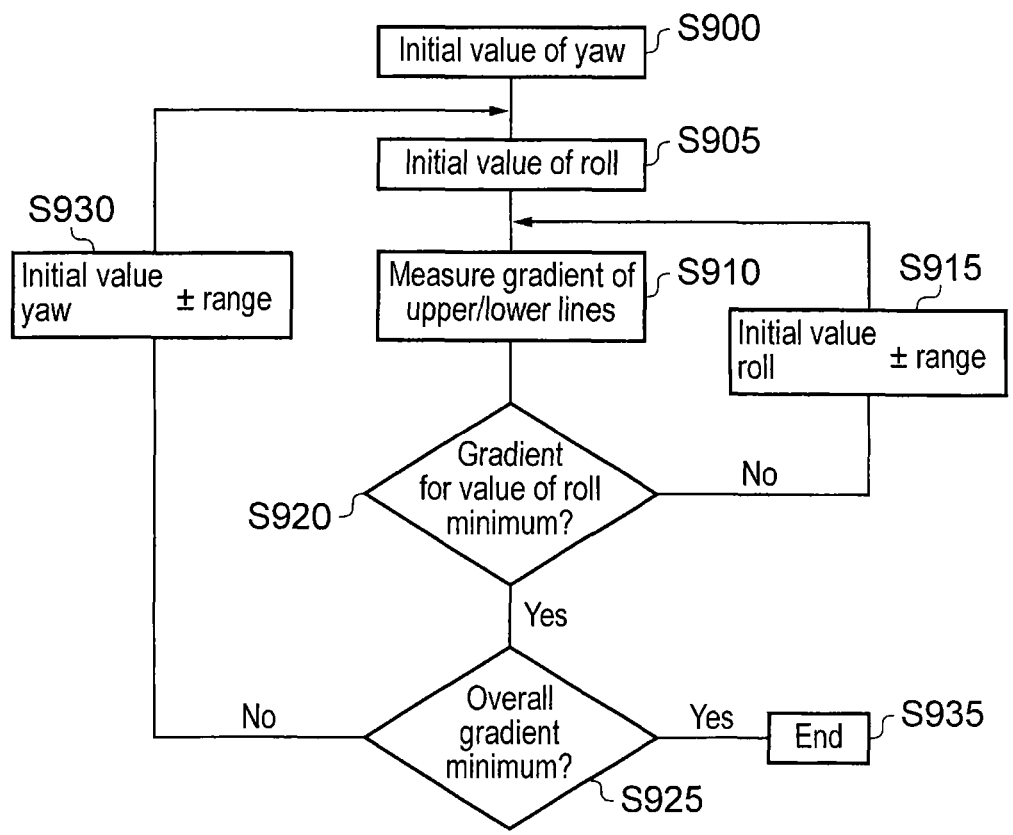
FIG. 8 shows a flow diagram explaining the calibration of the left of the two cameras of FIG. 6.

The selection of the image points is step S800 in FIG. 7.

After the image points have been selected, a focal length for camera feed A or in other words, the left camera element 104 is selected (Step S805 of FIG. 7). This is effectively the amount of zoom that is applied at the camera element 104. By knowing the actual focal length of the camera element 104, it is possible to manipulate the image provided by camera feed A to replicate different focal lengths of the camera element 104. In other words, knowing the focal length of camera element 104 providing camera feed A, it is possible to electronically replicate different focal lengths without constantly changing the actual focal length of camera element 104.

During the alignment process of embodiments of the present disclosure, the image points that have been selected by the user will be transformed to replicate the effect of adjusting the camera parameters. This transformation process will now be described.

As the skilled person will appreciate, a camera can be moved in three ways; pitch (or upward and downward vertical inclination of the camera), yaw (or sideward motion about the vertical axis); and roll (or rotation around the optical axis of the camera). These effects are replicated on the image points selected by the user by the transformation process described below.

Firstly, the image points are converted into an offset from the optical axis, normalised by half the width of the image. This is performed in a similar manner to that described in relation to the correction of lens distortion. In embodiments, the image points are then corrected for lens distortion as explained above, although this correction is not essential.

The pitch of the left camera is fixed to zero (step S810 of FIG. 7). The calibration of the left camera then begins (step S815 of FIG. 7). This is discussed in relation to FIG. 8.

In step S900, an initial value of yaw is provided. This may be +5°, although any value can be used. In step S905, an initial value of roll is selected. This can be any value for example −5°.

In order to calculate the gradient of the line connecting image points 705A and 706A and between lines 707A and 708A, so that such gradient can be minimised, it is necessary to apply a rotational transform to each of the image points to replicate the adjustment process.

The transformation process for the image points is applied as a three-dimensional matrix of the form $$\text{RotationMatrix} = \text{rotation(yaw)} * \text{rotation(pitch)} * \text{rotation(roll)}$$

This has the effect of applying a roll rotation, followed by a pitch rotation and finally a yaw rotation.

In particular, each matrix is of the form $$\text{Rotation (yaw)} = \begin{bmatrix} \cos(\alpha) & 0 & -\sin(\alpha) \\ 0 & 1 & 0 \\ \sin(\alpha) & 0 & \cos(\alpha) \end{bmatrix}$$

$$\text{Rotation (pitch)} = \begin{bmatrix} 1 & 0 & 0 \\ 0 & \cos(\beta) & -\sin(\beta) \\ 0 & \sin(\beta) & \cos(\beta) \end{bmatrix}$$

$$\text{Rotation (roll)} = \begin{bmatrix} \cos(\gamma) & -\sin(\gamma) & 0 \\ \sin(\gamma) & \cos(\gamma) & 0 \\ 0 & 0 & 1 \end{bmatrix}$$

Where $\alpha$, $\beta$ and $\gamma$ are angles of yaw, pitch and roll respectively.

The input vector which represents the image points selected by the user is of the form $$V = \begin{bmatrix} x' \\ y' \\ \text{focal\_length} \end{bmatrix}$$

Where x' is the image co-ordinate in the x-direction corrected for lens distortion; y' is the image co-ordinate in the y-direction corrected for lens distortion and focal-length represents the focal length applied to the lens.

The transformation is then performed such that $$V' = \text{RotationMatrix} * V$$

In order for the transformed image points to be normalised for depth (as the points are projected onto the same z-plane i.e. displayed on a screen), the co-ordinates have to be divided by the z-co-ordinate (i.e. the co-ordinate looking into the image along the optical axis).

Therefore, the x and y co-ordinates of the user selected image points (x" and y") are given by $$x'' = V'(1)/V'(3)$$

$$y'' = V'(2)/V'(3)$$

As noted above, the gradient between the transformed image points is calculated. The gradient is measured by dividing the difference in the y" co-ordinates by the difference in the x" co-ordinates. In other words, to calculate the gradient between lines 705B and 706B, the following equation is used $$\text{Gradient}_{705A\text{to}706A} = (y''_{705A} - y''_{706A})/(x''_{705A} - x''_{706A})$$

A similar calculation is performed to calculate the gradient between lines 707A and 708A.

As the gradient for both lines should be minimised, and the transform affects both lines, the sum of the absolute values of the gradients is calculated. In other words, $$\text{Gradient\_sum} = \text{abs}(\text{gradient}_{705A\text{to}706A}) + \text{abs}(\text{gradient}_{707A\text{to}708A})$$

is calculated.

As noted above, as the pitch is fixed at zero, the yaw and roll should be established for the parameters of the left camera element 104 which minimises the Gradient\_sum. In order to achieve this, the yaw is adjusted by an increment such as 0.5°. For each value of yaw, the roll value across a range of values (say initially 20° increments) is adjusted and the Gradient\_sum for each adjusted roll value is calculated by applying the transform and calculating the Gradient\_sum described above.

In order to determine the most suitable yaw and roll values, a binary search technique is used. This technique is described in FIG. 8 and is particularly suitable because the intention of the optimal value is to quickly minimise a metric (the Gradient\_sum in this case). In order to perform the binary search, an initial value of yaw is chosen (step S900 in FIG. 8) (for example +0.2°) and for this initial value of yaw, an initial roll value (say +0.4°) is chosen Step S905.

The gradient of the lines is measured for these values Step S910. In other words, the equation for Gradient\_sum is solved.

As the gradient will not be a minimum at this stage Step S920, new roll values will be used. The next roll values will be above and below this initial roll value (keeping the yaw value the same). For example, with the yaw value the same, the next roll value will be +20.4° (i.e. initial\_value+range) and the subsequent roll value will be −19.6° (i.e. initial\_value−range). This is shown in step S915.

The value of Gradient\_Sum is solved for each of the roll values. The roll value giving the lowest value of Gradient\_sum will be used as the next initial\_value. The process is then repeated. However, in order to converge on a minimum value quickly, the value of range is halved for each subsequent iteration. This binary search algorithm will terminate for this particular value of yaw when the range reaches a certain threshold value, and thus the gradient for the roll value is deemed a minimum value.

After a roll value giving the minimum value of Gradient\_sum is calculated (the "yes" path at step S920), the next iteration of yaw value is selected. The yaw value is also found using a binary search technique.

The next values of yaw will be above and below this initial value of yaw in a similar manner to that described above in respect of roll values. In other words, the next value of yaw will be determined by (initial\_value$_{yaw}$+range$_{yaw}$) and (initial\_value$_{yaw}$−range$_{yaw}$) step S930. For each one of these values of yaw, the value of roll giving the lowest Gradient\_sum value is determined using the binary search technique.

After the minimum value of Gradient\_sum for each value of yaw is calculated, the value of yaw providing the minimum value of Gradient\_sum will be selected as the new initial\_value$_{yaw}$ and the range will be halved to provide convergence to the value of yaw providing the lowest value of Gradient\_sum.

The binary search algorithm to find the value of yaw is stopped when the value of the range$_{yaw}$ is below a certain threshold value (step S935). After the binary search algorithm to find the value of yaw is performed, the yaw value and the roll value giving the lowest value of Gradient\_sum is determined. In other words, the value of yaw and roll is established which provides the lowest gradient for the horizontal lines on the pitch.

After the camera parameters for the left camera element 104 have been established, the right camera feed (i.e. camera feed B) is selected.

In order to properly align the image from camera feed A with the image from camera feed B, the image points 706A and 708A need to be aligned with image points 705B and 707B respectively. For this, the parameters of camera feed B need to be found (step S820 of FIG. 7).

In order to achieve this, a set of nested binary search algorithms are used which determine the minimum distance between the respective image points. In order to calculate this value, the minimum horizontal distance and vertical distance between the corresponding image points needs to be calculated.

The horizontal positions of image points 708A and 706A are compared with the horizontal positions of image points 707B and 705B. The yaw value that minimises this horizontal distance is selected to be the appropriate yaw value. In other words, a binary search algorithm is used which minimises the equation Horizontal_distance_sum=$(x_{706A}-x_{705B})^2+$
$(x_{708A}-x_{707B})^2$ Additionally, in order to calculate the minimum vertical distance between image points 708A and 707B and image points 706A and 705B, the pitch value providing the minimum value for the following equation needs to be found Vertical_distance_sum=$(y_{706A}-y_{705B})^2+(y_{708A}-y_{707B})^2$ In order to find the minimum overall distance between the image points, the sum of the horizontal_distance_sum and the vertical_distance_sum is calculated. In other words, the equation combined_distance_sum=horizontal_distance_sum+ vertical_distance_sum should be minimised to determine the optimal focal length for camera feed B.

Additionally, to improve the continuity of the upper and lower pitch lines, the gradient of the upper and lower pitch lines need to be minimised. In other words, the roll of the camera needs to be established that minimises the gradient of a line between 707B and 708B and 705B and 706B respectively. To achieve this, the equation Gradient_sum$_{right}$=abs(gradient$_{707B to 708B}$)+abs (gradient$_{705B to 706B}$)

needs to be minimised.

Figure 9:
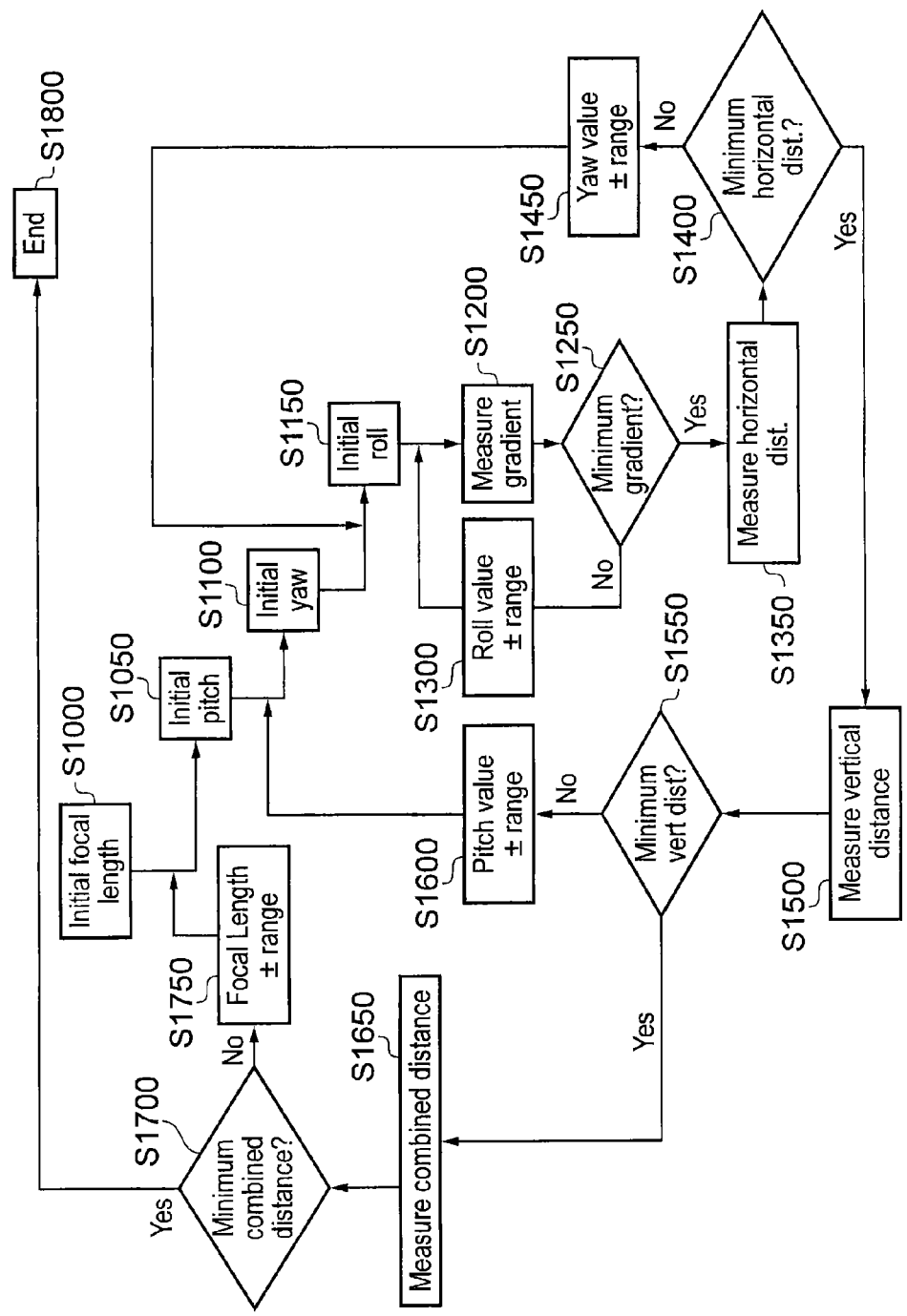
FIGS. 9 and 10 show a flow diagram explaining the calibration of the left camera in FIG. 6.

So, turning to FIG. 9, a starting value for the focal length of the camera providing camera feed B is chosen (step S1000). Due to the proximity of the camera element providing camera feed B to the camera element providing camera feed A, the same focal length as that provided on the left camera is chosen as an initial value for focal length.

For this focal length, the pitch value of the camera element 104 providing feed B is adjusted. As in the binary search algorithm mentioned above, an initial value for the pitch is chosen (step S1050). For this initial value of the pitch, an initial value of yaw is selected (step S1100). For this initial value of the yaw, an initial value of the roll is selected (step S1150). The value of Gradient_sum$_{right}$ is calculated for the initial value of roll (step S1200).

The value of the roll is then varied in a manner similar to the binary search algorithm explained hereinbefore. In other words, the next value of the roll is set above and below the initial value by a range (step S1300). The value of the Gradient_sum$_{right}$ is calculated for the next values of roll (step S1200). The value of roll giving the lowest Gradient_sum$_{right}$ value is chosen as the next initial value of roll. The range is halved and the binary search is continued until a minimum value of Gradient_sum$_{right}$ is established (step S1250). This is deemed to have occurred when the range falls below a certain threshold value (such as 0.05 degrees).

The value of horizontal_distance_sum is then measured using the initial value of yaw (step S1350). The value of the yaw is then varied in a manner similar to the binary search algorithm explained hereinbefore. In other words, the next value of the yaw is set above and below the initial value by a range (step S1450). The value of the horizontal_distance_sum is calculated for the next value of yaw. However, for each value of yaw, the value of roll giving the lowest value of Gradient_sum$_{right}$ is calculated. In other words, the binary search algorithm used to calculate the Gradient_sum$_{right}$ is nested in the binary search algorithm used to calculate every value of the horizontal_distance_sum. The value of yaw giving the lowest horizontal_distance_sum value is chosen as the next initial value of yaw. The range is halved and the binary search is continued until a minimum value of horizontal_distance_sum is established (step S1400). This is deemed to have occurred when the range falls below a certain threshold value (such as 0.05 degrees).

The value of vertical_distance_sum is then measured using the initial value of pitch (step S1500). The value of the pitch is then varied in a manner similar to the binary search algorithm explained hereinbefore. In other words, the next value of the pitch is set above and below the initial value by a range (step S1600). The value of the vertical_distance_sum is calculated for the next value of pitch. However, for each value of pitch, the value of yaw giving the lowest value of horizontal_distance_sum is calculated. In other words, the binary search algorithm used to calculate the horizontal_distance_sum is nested in the binary search algorithm used to calculate every value of the vertical_distance_sum. The value of pitch giving the lowest vertical_distance_sum value is chosen as the next initial value of pitch. The range is halved and the binary search is continued until a minimum value of vertical_distance_sum is established (step S1550). This is deemed to have occurred when the range falls below a certain threshold value (such as 0.05 degrees).

The value of combined_distance_sum is then measured using the initial value of focal length (step S1650). The value of the focal length is then varied in a manner similar to the binary search algorithm explained hereinbefore. In other words, the next value of the focal length is set above and below the initial value by a range (step S1750). The value of the combined_distance_sum is calculated for the next value of focal length. However, for each value of focal length, the value of pitch giving the lowest value of vertical_distance_sum is calculated. In other words, the binary search algorithm used to calculate the vertical_distance_sum is nested in the binary search algorithm used to calculate every value of the combined distance_sum. The value of focal length giving the lowest combined_distance_sum value is chosen as the next initial value of focal length. The range is halved and the binary search is continued until a minimum value of combined_distance_sum is established (step S1700). This is deemed to have occurred when the range falls below a certain threshold value (such as 0.01 millimeters).

The result of these nested algorithms is that the minimum distance between corresponding image points for a given focal length of the left camera 104 is established. It should be noted here that the distance between the points can be changed by altering the pitch, yaw and roll as described. Additionally, the distance between the points can be altered by altering the focal length of one or more cameras. This may be done instead of, or in combination with the changing of the pitch, roll and yaw of the cameras. This also applies to determining the gradient of the line overlapping the boundary between each elementary image.

In order to provide a stitched image having an improved alignment, the gradient of the upper and lower lines of feed A and B needs to be minimised (step S825 in FIG. 7).

To do this, the value of the focal length is varied to minimise the gradient of the line between image points 707A and 708B and the gradient of the line between image points 705A and 706B. In other words, a binary search is carried out which establishes the focal length of the left camera element 104 that minimises the equation Overall_gradient_sum=Gradient_sum$_{left}$+gradient_ sum$_{right}$ By minimising the overall gradient between the most extreme image points which are located along a straight line in the scene, the stitched image looks more realistic.

In the binary search, the next value of the focal length of the left camera 104 is then varied in a manner similar to the binary search algorithm explained hereinbefore. In other words, the next value of the focal length is set above and below the initial value by a range (step S835). The value of the overall_gradient_sum is calculated for the next value of focal length. However, for each value of focal length, the parameters of yaw and roll of the left camera is found as well as the values of focal length, pitch, roll and yaw for the right hand camera feed. In other words, the binary search algorithm used to calculate all the camera parameters is nested in the binary search algorithm used to calculate every value of the overall_gradient_sum. The value of focal length of the left camera giving the lowest overall_gradient_sum value is chosen as the next initial value of focal length. The range is halved and the binary search is continued until a minimum value of overall_gradient_sum is established (step S830 in FIG. 7). This is deemed to have occurred when the range falls below a certain threshold value (such as 0.001 millimeters).

Optionally, the user manually adjusts some of the calculated parameters to achieve the most accurately stitched image (step S840). The manual adjustments have a much finer range of change than those used in the binary search algorithm. For example, the range of change of the manual adjustment may be $1/10^{th}$ the value of the minimum range used as a threshold in the binary search algorithm. Although it is possible for the user to manually adjust the calculated parameters, this is inconvenient for the user. In many instances, the user would manually adjust the roll of one or more of the cameras. However, by applying roll, the straight lines would appear kinked. In other words, the straight lines of the touchline would appear to change direction at the join. This is undesirable.

Therefore, in embodiments of the disclosure, the inventors have not only automated this process, which is more convenient for the user, but have also improved the straightness of the touchlines by removing the kink at the join.

In order to achieve this, a shear correction is applied to each camera. Specifically, in embodiments, different amounts of equal and opposite shear are applied to the left and right cameras until the mis-alignment between the left and right camera in the stitched image at correspondence points 708A and 707B and 706A and 705B is zero (or at least within a threshold value).

In order to achieve this, at step S840 in FIG. 7, the nested algorithm of FIG. 9 is run for a specific value of shear. Specifically, referring to FIG. 10, step S840 is shown. At the start of the process (step S8400), an initial value of shear is chosen and applied to the left camera image (step S8401). In embodiments this value will be −0.01.

An equal and opposite amount of shear is applied to the right camera image (step S8402).

The nested algorithm of FIG. 9 is then run. In other words, for these values of shear, the focal length, pitch, yaw and roll are obtained that provides a minimum combined distance for that initial value of shear. In other embodiments, just the pitch, yaw and roll nested searches of FIG. 9 are run. Also, this only need be done for the right camera—the yaw, pitch and roll of the left camera can be left alone at this stage.

A check is then made at step S8404 to determine whether the overall minimum combined distance is reached. In other words, the output value of the nested algorithm of FIG. 9 is checked against a threshold value. If the overall minimum combined distance is less than or equal to the threshold then the yes path is followed and the process is completed in step S8406. The images are blended according to step S845 as will be explained later. Alternatively, if the overall minimum combined distance is not reached, the value of the shear applied to the left camera is changed. This is step S8405.

In embodiments, the values of shear+shear_range and shear−shear_range are tested. The yaw, pitch and roll of the right camera are then adjusted for each shear value and a measure of the combined distance is calculated. The value of shear with the lowest combined distance is chosen and the test is repeated with new shear values above and below the selected shear. In order to achieve a quick solution, the value of shear_range is now halved. The process is repeated until the value of shear_range is below a threshold value. This may be, in embodiments, 0.0001. At this point the optimal shear will have been found and should be used with the yaw, pitch and roll parameters calculated for the right camera.

This changed value will be applied to the image of the left camera as the value for step S8401 and an equal and opposite value of shear is applied to the image from the right camera (step S8402).

This process continues until the overall minimum combined distance is reached.

Figure 10:
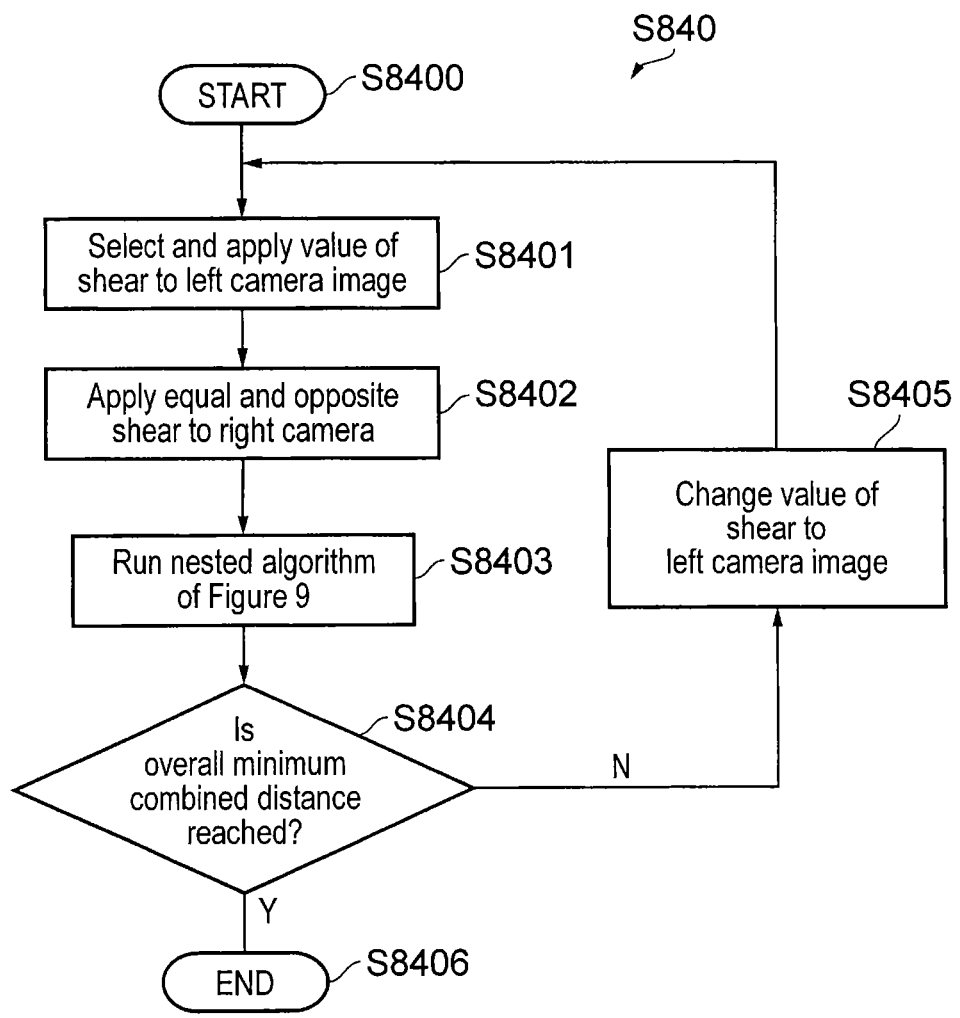

It will be appreciated by the skilled person that the above method described in FIG. 10 is particularly quick. This is because the search range over which the shear values are tested is small. In other words, by placing the application of shear correction after the focal length, yaw, pitch and roll is correct, the search range is small compared to applying shear correction as part of the algorithm to find the focal length, yaw, pitch and roll.

In order to further improve the stitched image, a luminance correction is applied. This corrects for differences in exposure. Multiplication factors are applied to the luminance values in order to better match the exposures of adjacent camera elements 104. These can be performed manually, or automatically. If automatically performed, the luminance multiplication factors are found which make the average pixel values in the overlap region on each camera element the same.

Finally, Alpha blending is applied to the edges of the overlapping regions (step S845). A start point and percentage of image is defined for the left and right hand side of each camera element.

In embodiments of the disclosure, where there are three camera feeds, the central camera image is displayed over the left and right hand camera images. This means that blending only needs to be applied to the left and right hand edges of the centre image.

After the edges have been blended, the composite image is formed.

Virtual Camera

As noted above, the output of the scalable content preparation means 110 provides a virtual camera output. This virtual camera output allows a user to move a segment anywhere within the stitched image and to output this segmented area to the user devices 122. In order to create a realistic virtual camera output, the scalable content preparation means 110 needs to perform a transformation on the segment as will be explained.

Image Captured by a Single Camera

Figure 11:
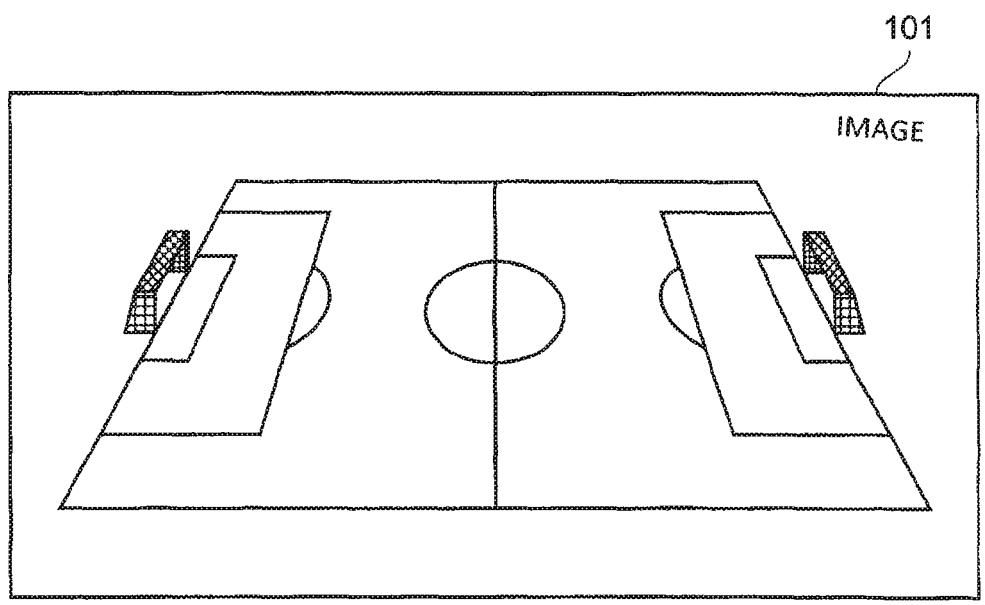
FIG. 11 shows a plan view of a camera capturing the live event.

Although the foregoing has been described with the image 101 being a stitched image, the virtual camera output can be generated as a cut-out from an image captured by a single camera. FIG. 11 shows an image captured by a single camera using a wide angle lens 101. As the camera elements 104 are located above the soccer pitch, the image 101 is a "telebroadcast" view. In other words, the camera elements 104 have a slight downward pitch when capturing the real-life scene.

Figure 12:
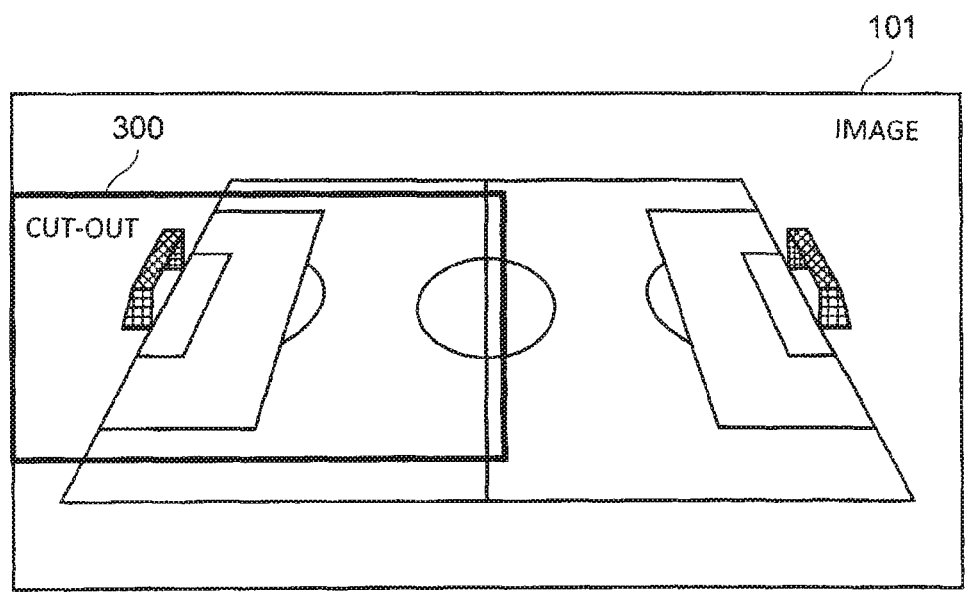
FIG. 12 shows the image 101 captured by the camera of FIG. 1.

FIG. 12 shows a cut-out (or segment) 300 of one part of the image shown in FIG. 12. The cut-out of the image is a segment of the image 101 and replicates a virtual camera pointing at that position within the real-life scene. The position and size of the cut-out 300 of the image 101 may be controlled by a user, using a mouse, or specific roller ball in an editing suite. This replicates the action of a camera operator applying pan, tilt and yaw to camera elements 104. By adjusting the size of the cut-out 300, the application of zoom is replicated. In other words, the position and size of the cut-out of the image may be moved and altered according to production requirements. The editing suite may be remote to the real-life scene or may be performed on computer 107. Alternatively, an object detection and/or tracking algorithm may determine the position of the cut-out 300 of the image. In this example, the cut-out 300 of the image may follow the ball or one or more particular players or groups of players.

Typically, the cut-out 300 of the image 101 is to be provided to a different display to that of the image 101. For example, if the image 101 is an image formed from stitching two images captured using two cameras each having a 4K resolution, the cut-out 300 may be provided to a high-definition television or, as in the case of FIG. 1, a handheld device. The cut-out 300 of the image aims to replicate a camera pointing at and zooming into a particular area of the real life scene.

It is noted that although the cut-out 300 has been described as being displayed on a lower resolution display, this need not necessarily be the case. For example, although the cut-out 300 may cover a smaller area than the area of the image 101, and will thus be formed from a smaller number of pixels, the cut-out 300 may still be displayed on 4K resolution display. In this case, pixel interpolation could be used so that the lower resolution cut-out can still be displayed over the entirety 4K resolution display.

Figure 13:
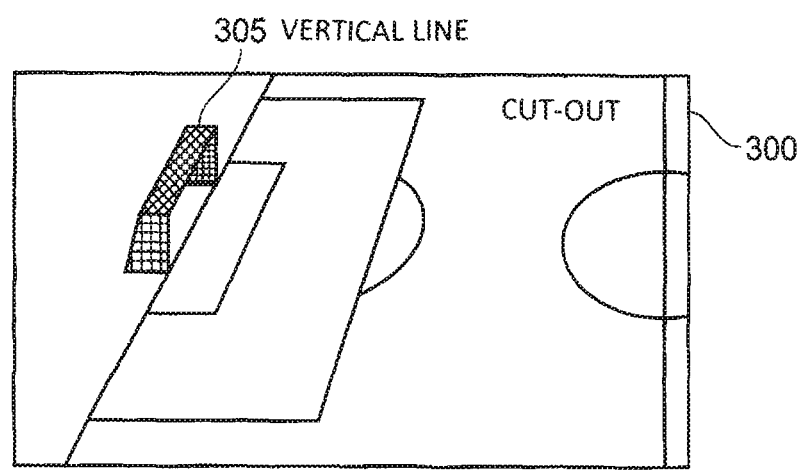
FIG. 13 shows a cut-out 300 of one part of the image captured in FIG. 2.

FIG. 13 shows an expanded view of the cut out 300 when displayed.

This cut-out is generated in a manner similar to that explained in the aforementioned US publication (US 2011/0052093 A), where the cut-out 300 is typically displayed on a handheld device.

From FIG. 13, it may be seen that the perspective of the cut-out image 300 is different to the perspective shown if the camera elements 104 did in fact capture the segment of the image. In other words, from the perspective of the cut-out image 300, it is apparent that the cut-out of the image does not replicate camera elements 104 pointing at that position within the real-life scene. In particular, vertical line 305 of the goal post appears slanted in the cut-out 305 of the image 101 which is not correct.

Figure 14A:
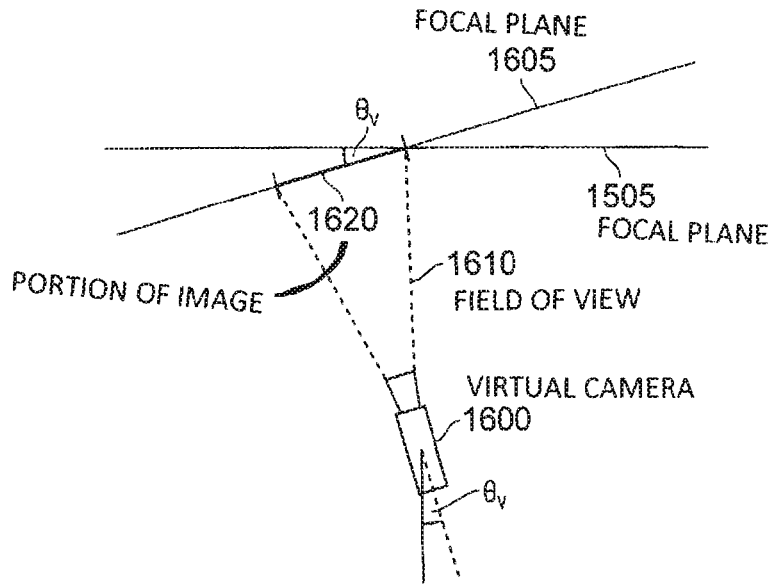
FIGS. 14A to 14C show the positioning of a virtual camera whose image plane forms the cut-out of FIG. 13.
Figure 14B:
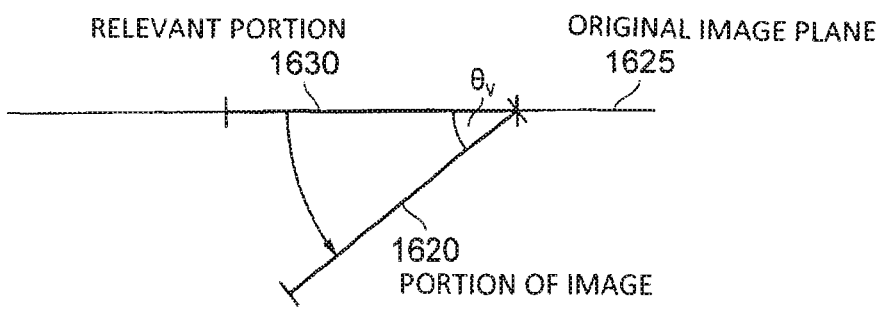
Figure 14C:
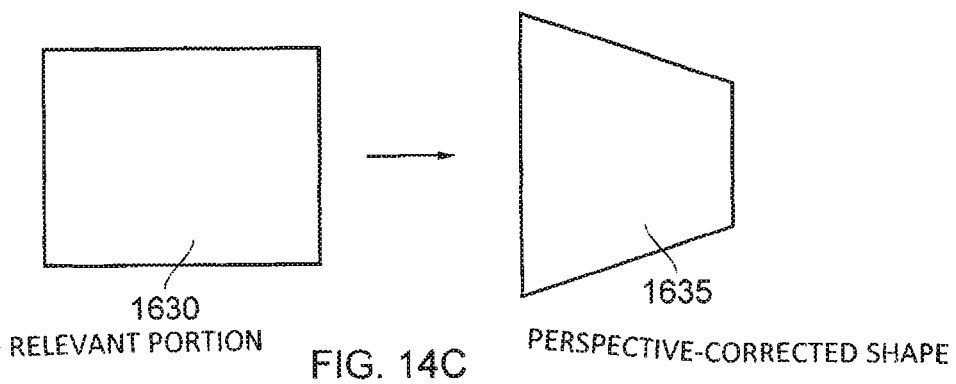

As can be seen in FIGS. 14A-14C, in embodiments, the scalable content preparation means 110 makes use of a virtual camera 1600 to obtain a cut-out of the image 101 which has been corrected for perspective. The position of the virtual camera 1600 is specified with respect to the position of the real camera 104. Specifically, the position of the virtual camera 1600 is defined by a yaw, pitch and roll with respect to the yaw, pitch and roll of the real camera 104. By then considering the focal plane 1605 of the virtual camera 1600 and its position with respect to the focal plane 1505 of the real camera 104, an image cut-out shape which has been corrected for perspective may be obtained. This is explained in detail below. In FIG. 14A, the virtual camera 1600 is positioned with a yaw of $\theta_V$ with respect to the yaw of the real camera 104 which captures the image of the scene, the yaw of the real camera 104 being set to zero. For simplicity, FIG. 14A shows only the yaw of the virtual camera 1600. It does not show any pitch or roll applied to the virtual camera 1600. However, the skilled person will appreciate that FIG. 14A could equally apply to the virtual camera pitch or roll, and that in reality, any one of the yaw, pitch and/or roll of the virtual camera may change simultaneously as the virtual camera is rotated in three dimensions. As the yaw of the virtual camera 1600 differs to the yaw of the real camera 104 by $\theta_V$, the focal plane 1605 of the virtual camera 1600 is offset from the focal plane 1505 of the real camera 104 by an angle of $\theta_V$.

It can be seen in FIG. 14A that the focal plane 1605 of the virtual camera 1600 includes a portion 1620 corresponding to the field of view of the virtual camera 1600; the field of view of the virtual camera 1600 being indicated by the dashed lines 1610. In embodiments, a shape of a cut-out of the image 101 which has been corrected for perspective can be obtained by projecting a relevant portion of the image 101 onto the portion 1620 associated with the virtual camera 1600. In other words, by performing a rotation transformation on a relevant portion of the image 101 by the angle $\theta_V$, a cut-out of the image 101 which has been corrected for perspective may be obtained.

This is illustrated in FIG. 14B, in which the original image is established as a plane 1625 in 3D space. Here, the plane 1625 of the original image is viewed directly from above. The virtual camera portion 1620, which is a portion of the virtual camera focal plane 1605, is also illustrated. In order to obtain a cut-out shape of the image 101 which has been corrected for perspective, a relevant portion 1630 of the original image plane 1625 is transformed by the angle $\theta_V$ onto the virtual camera portion 1620. In embodiments, the relevant portion 1630 of the original image plane 1625 is rectangular in shape and is equivalent to the rectangular cut-out portion 300 of FIG. 13. As illustrated in FIG. 14C, by transforming the relevant portion 1630 by the angle $\theta_V$, the rectangular shape of the relevant portion 1630 is transformed to a perspective-corrected shape 1635, when considered from the viewpoint of the real camera 104. As will be explained, this perspective-corrected shape 1635 is used for generating a cut-out of the image 101 which has been corrected for perspective and which may be displayed on a device such as a high definition television or handheld device.

As already mentioned, FIGS. 14A-14C illustrate a transform resulting from a change in the yaw $\theta_V$ of the virtual camera 1600 only. In reality, any one or more of the yaw, pitch and roll of the virtual camera 1600 may change simultaneously as the virtual camera is rotated in three dimensions. In embodiments, each of the transforms associated with the yaw, pitch and roll of the virtual camera 1600 may be expressed as a respective matrix. Of course, any one of more of the yaw, pitch and roll may be expressed as a respective matrix.

The transform associated with the pitch of the virtual camera 1600 may be expressed using the pitch rotation matrix:

$$P_V = \begin{bmatrix} 1 & 0 & 0 \\ 0 & \cos\varphi_V & \sin\varphi_V \\ 0 & -\sin\varphi_V & \cos\varphi_V \end{bmatrix},$$

the pitch being defined by an angle $\varphi_V$ about the x-axis.

The transform associated with the yaw of the virtual camera 1600 may be expressed using the yaw rotation matrix:

$$Y_V = \begin{bmatrix} \cos\theta_V & 0 & -\sin\theta_V \\ 0 & 1 & 0 \\ \sin\theta_V & 0 & \cos\theta_V \end{bmatrix},$$

the yaw being defined by an angle $\theta_V$ about the y-axis.

The transform associated with the roll of the virtual camera 1600 may be expressed using the roll rotation matrix:

$$R_V = \begin{bmatrix} \cos\rho_V & \sin\rho_V & 0 \\ -\sin\rho_V & \cos\rho_V & 0 \\ 0 & 0 & 1 \end{bmatrix},$$

the roll being defined by an angle $\rho_V$ about the z-axis.

The complete transform may thus be expressed as a virtual camera rotation matrix given by:

$$V = P_V * Y_V * R_V \quad (1)$$

It should be noted that the order in which the matrices $P_V$, $Y_V$ and $R_V$ are written in equation 1 results in a virtual camera rotation matrix V which achieves the most natural-looking perspective-corrected image cut-outs. However, in embodiments, the order in which the matrices $P_V$, $Y_V$ and $R_V$ are multiplied together may also be different to that written in equation 1.

So far in this description, the concept of obtaining a perspective-corrected shape 1635 from a relevant portion 1630 of the original image has been introduced, according to embodiments. Specifically, it has been explained that by performing a transform on a relevant portion 1630 of the original image plane 1625 (the transform being determined according to any one or more of the pitch, roll and yaw of the virtual camera), the rectangular shape of the relevant portion 1630 is transformed into a perspective-corrected shape 1635.

In embodiments, a cut-out of the image 101 which has a perspective-corrected shape 1635 may be displayed as a zoomed-in image on a device such as a high definition television or handheld device (that is, on a device which displays images of a lower resolution than that of the image 101). This will now be described.

Figure 15A:
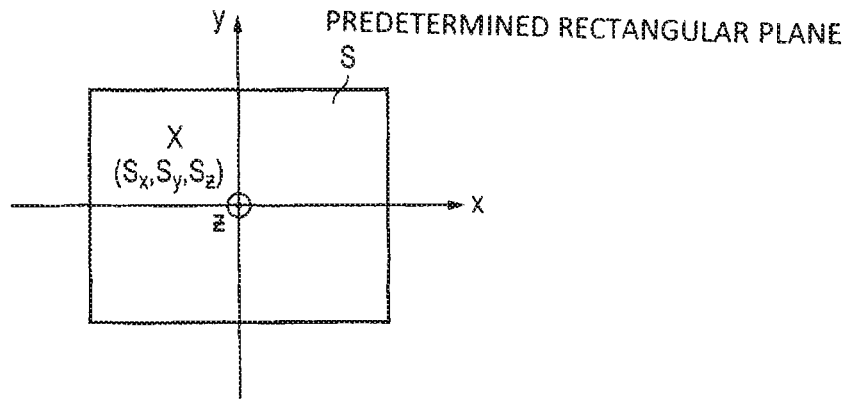
FIGS. 15A-15C shows a rectangular plane to which transforms are applied.
Figure 15B:
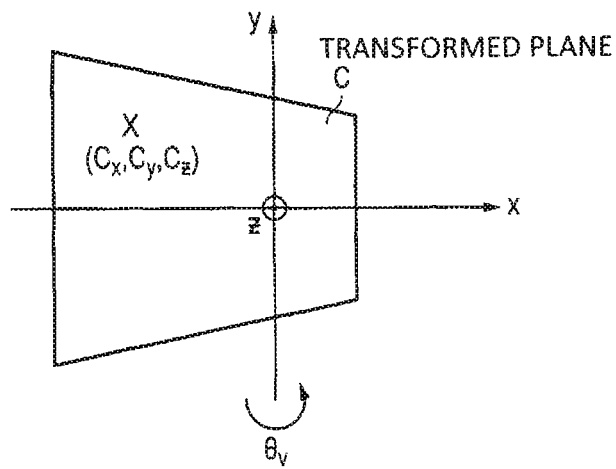
Figure 15C:
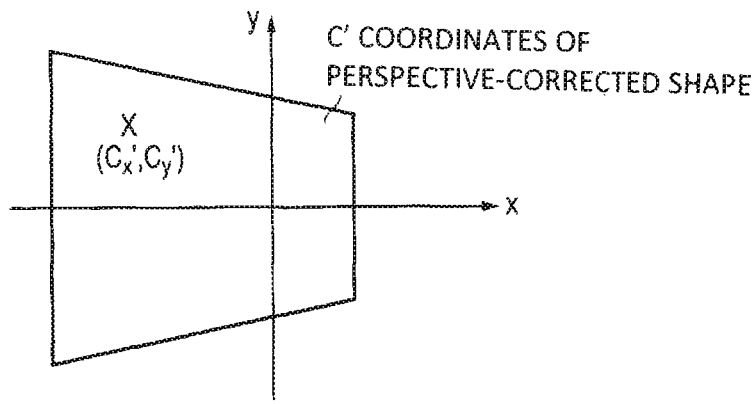

According to embodiments, the generation of a perspective-corrected cut-out involves starting from a predetermined rectangular plane. The rectangular shape represents the desired shape of the perspective-corrected cut-out when it is displayed on the display device. For example, the rectangular shape is the shape of the screen upon which the perspective-corrected cut-out is displayed. The predetermined rectangular plane is then transformed, according to the yaw, pitch and roll of the virtual camera, so as to obtain a perspective-corrected cut-out shape. This process is illustrated in FIGS. 15A-15C. FIG. 15A shows the predetermined rectangular plane as defined in a three-dimensional coordinate system. The predetermined rectangular plane is defined by:

$$s = \begin{bmatrix} s_x \\ s_y \\ s_z \end{bmatrix}$$

where:

$s_x$ is defined to be within the range $-n_x$–$+n_x$, where $$n_x = \frac{\text{cut-out width}}{\text{image width}};$$

$s_y$ is defined to be within the range $-rn_x$–$+rn_x$, where r is the screen aspect ratio of the cut-out, given by $$r = \frac{\text{cut-out height}}{\text{cut-out width}};$$

and $s_z = -F_V * n_x =$ focal length of the virtual camera 600, $F_V$, normalised by $n_x$. Here, the cut-out width/height is the width/height of the cut-out when it is displayed on a lower resolution device and the image width is the width of the image 200. In embodiments, the cut-out width/height and image width may be measured in pixels. As $s_z = -F_V * n_x$ (that is, the negative of the normalised virtual camera focal length), the rectangular plane illustrated in FIG. 7A is effectively positioned at a distance $-F_V * n_x$ into the page. The virtual camera focal length $F_V$ is defined in units such that the focal length is 1 for a field of view of 90 degrees.

The predetermined rectangular plane is then transformed according to the virtual camera rotation matrix V. This results in a transformed plane c, given by:

$$c = \begin{bmatrix} c_x \\ c_y \\ c_z \end{bmatrix}$$

The transformed plane c is obtained by the equation:

$$c = V * s$$

This can be written out in full as:

$$\begin{bmatrix} c_x \\ c_y \\ c_z \end{bmatrix} = \begin{bmatrix} 1 & 0 & 0 \\ 0 & \cos\varphi_V & \sin\varphi_V \\ 0 & -\sin\varphi_V & \cos\varphi_V \end{bmatrix} *$$

$$\begin{bmatrix} \cos\theta_V & 0 & -\sin\theta_V \\ 0 & 1 & 0 \\ \sin\theta_V & 0 & \cos\theta_V \end{bmatrix} * \begin{bmatrix} \cos\rho_V & \sin\rho_V & 0 \\ -\sin\rho_V & \cos\rho_V & 0 \\ 0 & 0 & 1 \end{bmatrix} * \begin{bmatrix} s_x \\ s_y \\ s_z \end{bmatrix}$$

$$\begin{bmatrix} c_x \\ c_y \\ c_z \end{bmatrix} = \begin{bmatrix} 1 & 0 & 0 \\ 0 & \cos\varphi_V & \sin\varphi_V \\ 0 & -\sin\varphi_V & \cos\varphi_V \end{bmatrix} *$$

$$\begin{bmatrix} \cos\theta_V \cos\rho_V & \cos\theta_V \sin\rho_V & -\sin\theta_V \\ -\sin\rho_V & \cos\rho_V & 0 \\ \sin\theta_V \cos\rho_V & \sin\theta_V \sin\rho_V & \cos\theta_V \end{bmatrix} * \begin{bmatrix} s_x \\ s_y \\ s_z \end{bmatrix}$$

-continued $$\begin{bmatrix} c_x \\ c_y \\ c_z \end{bmatrix} = \begin{bmatrix} \cos\theta_V \cos\rho_V & \cos\theta_V \sin\rho_V & -\sin\theta_V \\ -\cos\varphi_V \sin\rho_V + \sin\varphi_V \sin\theta_V \cos\rho_V & \cos\varphi_V \cos\rho_V + \sin\varphi_V \sin\theta_V \sin\rho_V & \sin\varphi_V \cos\theta_V \\ \sin\varphi_V \sin\rho_V + \cos\varphi_V \sin\theta_V \cos\rho_V & -\sin\varphi_V \cos\rho_V + \cos\varphi_V \sin\theta_V \sin\rho_V & \cos\varphi_V \cos\theta_V \end{bmatrix} * \begin{bmatrix} s_x \\ s_y \\ s_z \end{bmatrix}$$

$$c_x = s_x \cos\theta_V \cos\rho_V + s_y \cos\theta_V \sin\rho_V - s_z \sin\theta_V$$

$$c_y = s_x \begin{pmatrix} -\cos\varphi_V \sin\rho_V + \\ \sin\varphi_V \sin\theta_V \cos\rho_V \end{pmatrix} + s_y \begin{pmatrix} \cos\varphi_V \cos\rho_V + \\ \sin\varphi_V \sin\theta_V \sin\rho_V \end{pmatrix} + s_z \sin\varphi_V \cos\theta_V$$

$$c_z = s_x \begin{pmatrix} \sin\varphi_V \sin\rho_V + \\ \cos\varphi_V \sin\theta_V \cos\rho_V \end{pmatrix} + s_y \begin{pmatrix} -\sin\varphi_V \cos\rho_V + \\ \cos\varphi_V \sin\theta_V \sin\rho_V \end{pmatrix} + s_z \cos\varphi_V \cos\theta_V$$

The transformed plane c is illustrated in FIG. 15B. For simplicity, it can be seen that the transformed plane c has been obtained from the rectangular plane s by rotating it by an angle $\theta_V$ about the y-axis. This corresponds to a yaw of the virtual camera 1600 of $\theta_V$ with respect to the camera 104. In reality, the transformation of the rectangular plane, s, may be the result of a non-zero yaw, pitch and roll of the virtual camera, resulting in a rotation about each of the x, y and z axes.

When considered from the perspective of the camera 104, the transformed plane c appears to have moved to a different position compared to the plane s. This is because the transformed plane c is a result of rotating the plane s about the origin (x=0, y=0, z=0) when the plane s is located at a non-zero z-position, given by $s_z = -F_V * n_x$.

The transformed plane c also appears to have a warped, non-rectangular shape. This is the perspective-corrected shape 1635 of the image cut-out. The next step is to transform this perspective-corrected shape 1635 into two-dimensions, so that an image-cut with this perspective-corrected shape can be mapped onto the two-dimensional image 101. This is achieved by dividing the coordinates $c_x$ and $c_y$ of the transformed plane c by $c_z$, and then zooming in by the focal length of the camera 104, $-F_c$, so as to obtain the set of two-dimensional coordinates:

$$c' = \begin{bmatrix} c'_x \\ c'_y \end{bmatrix}$$

where:

$$c'_x = -F_c * \frac{s_x \cos\theta_V \cos\rho_V + s_y \cos\theta_V \sin\rho_V - s_z \sin\theta_V}{s_x(\sin\varphi_V \sin\rho_V + \cos\varphi_V \sin\theta_V \cos\rho_V) + s_y(-\sin\varphi_V \cos\rho_V + \cos\varphi_V \sin\theta_V \sin\rho_V) + s_z \cos\varphi_V \cos\theta_V}$$

$$c'_y = -F_c * \frac{s_x(-\cos\varphi_V \sin\rho_V + \sin\varphi_V \sin\theta_V \cos\rho_V) + s_y(\cos\varphi_V \cos\rho_V + \sin\varphi_V \sin\theta_V \sin\rho_V) + s_z \sin\varphi_V \cos\theta_V}{s_x(\sin\varphi_V \sin\rho_V + \cos\varphi_V \sin\theta_V \cos\rho_V) + s_y(-\sin\varphi_V \cos\rho_V + \cos\varphi_V \sin\theta_V \sin\rho_V) + s_z \cos\varphi_V \cos\theta_V}$$

The set of coordinates, c' is illustrated in FIG. 15C. The coordinates c' define the shape 1635 of the image cut-out which must be used in order for the perspective of the image cut-out to appear correct when it is displayed as a zoomed-in portion of the image 200 on a lower resolution device such as high definition television. $c'_x$ is output to be within the range −1−+1 and $c'_y$ is output to be within the range −a−+a where a is the aspect ratio of the image 101, given by $$a = \frac{\text{image height}}{\text{image width}}.$$

Again, the focal length of the camera 104, $F_c$, is defined in units such that $F_c = 1$ for a field of view of 90 degrees. In embodiments, the focal length, $F_c$, of the camera 104 can be obtained automatically using metadata from the lens of the camera. This allows the two-dimensional perspective-corrected shape 1635 to be generated for any lens, without the user having to manually change the focal length $F_c$ used in calculations by the scalable content preparation means 110 whenever the lens is changed. Alternatively, the focal length $F_c$ could be set by the user. The yaw and pitch of the virtual camera 1600, $\theta_V$, $\varphi_V$ are controlled by the computer 107. The roll of the virtual camera, $\rho_V$, can be calculated automatically to correct for any roll in the original image caused by the tilt of the camera rig, or caused by the distortion that naturally occurs when filming with a wide angle lens. This roll is particularly noticeable when taking a cut-out from the original image.

For example, the virtual camera roll may be calculated as follows:

$$\rho_V = \sin^{-1}(\sin(\theta_V) * \sin(\varphi_V + \varphi_{rig}))$$

where $\varphi_{rig}$ is the angle of tilt (pitch) of the camera rig (e.g. 20 degrees) and $\theta_V$, $\varphi_V$ are the yaw and pitch of the virtual camera as defined previously. In this way, the correct roll can be calculated automatically, without any need for additional correction by the user.

The angle of tilt of the rig can be obtained from a sensor in the camera or in the tripod (such as an accelerometer) or by an external device, or it could be manually entered by the user during calibration.

If the camera rig is not level and has its own roll, the virtual camera roll must also be corrected for this. Let the camera rig roll=$\rho_{rig}$. Then the virtual camera roll may be calculated as follows:

$$\rho_V = \sin^{-1}(\sin(\theta_V) * \sin(\varphi_V + \varphi_{rig})) + \rho_{rig}$$

Alternatively, if the rig tilt is unknown, a manual adjustment may be made by adjusting an additional parameter, $\rho_{manual}$. An equation such as equation 2 below may then be used to calculate the virtual camera roll:

$$\rho_V = \sin^{-1}(\sin(\theta_V) * \sin(\varphi_V)) + \theta_V * \rho_{manual} + \rho_{rig} \quad (2)$$

$\rho_{manual}$ should be adjusted by the user while the virtual camera is panned to one side, until vertical lines appear correctly on the screen. However, the equation using rig tilt is preferred. To correct for any picture distortion caused by the lens of the camera 104, lens distortion correction may also be applied to the coordinates c' by the scalable content preparation means 110. The correction may be achieved by adjusting the derived coordinates c', found using the equations described above, by a small amount dependent on the nature of the lens distortion. For example, a position ($c'_x$, $c'_y$) in the set of coordinates c' may be moved towards or away from the origin. This will help compensate, respectively, for pin cushion or barrel distortion in the original image 101 when an image cut-out with the perspective-corrected shape 1635 is used with the original image 101 (as described later). This can be done using the following equations:

$$c''_x = c'_x + b * c'_x * (C - l^2)$$

$$c''_x = c'_y + b * c'_y * (C - l^2)$$

where $$l^2 = (c'_x * c'_x + c'_y * c'_y) * K$$

and C and K are constants. For a typical CCD, C=1.70 and K=1.29 provide good results when the original image 101 is a 16:9 aspect ratio picture.

b is the lens distortion correction parameter. This should be set according to the lens of the camera 104 being used. If the lens is a zoom lens, then the parameter b is likely to be different at different focal lengths.

b=0 for cases when no lens distortion correction is necessary.

b>0 to correct for barrel distortion, while b<0 to correct for pin cushion distortion. In embodiments, we may have −0.1<b<0.1.

The lens distortion characteristics can be passed to the scalable content preparation device 505 as additional metadata from the lens. The lens distortion parameter, b, can then be derived from this.

Alternatively, just the lens specification (make and type) can be passed to the scalable content preparation means 110 as metadata and this can then be looked up in a look-up table stored in the storage medium 114 to find the appropriate lens distortion correction parameter, b. For a zoom lens, the current focal length, $F_c$, may also be passed from the lens to allow the lens distortion parameter, b, to be looked up for the given lens at the specified focal length. When the above lens distortion correction algorithm is applied, the corners of the perspective-corrected shape 1635 defined by the coordinates c' should always remain at the same co-ordinates, while the edges will move towards the centre (when correcting for pin cushion distortion) or away from the centre (when correcting for barrel distortion). We note that the description below refers to the coordinates c', that is, the transformed coordinate plane which has not been corrected for lens distortion. However, it will be appreciated that the description could also apply to the c'coordinate plane when lens distortion correction has been performed.

The result of the process of FIGS. 15A-15C is that for any given pixel co-ordinate, $s_x$, $s_y$, of a desired low resolution, rectangular, zoomed-in image, the position of a corresponding source pixel in the image 101 can be calculated. This will be for a given virtual camera yaw $\theta_V$, pitch $\varphi_V$, roll $\rho_V$ and focal length $F_V$, for a given original camera focal length $F_c$, and for a given height and width of each of the image 101 and the desired low resolution, zoomed-in image. This is subject to the coordinates c' being scaled (if necessary) and offset according to the dimensions of the image 101.

The coordinates c' may have to be scaled because they have been calculated with respect to normalised original image dimensions (it is recalled that $c_x'$ is between −1 and +1 and $c_y'$ is between −a and +a). What is actually required is for the coordinates c' to be defined with respect to the actual dimensions of the image 101. This is because the coordinates c' form a perspective-corrected cut-out 1300' of the image, as will be explained later. Thus, if the actual image dimensions are not the same as the normalised image dimensions, then scaling is necessary. The scaling of the coordinates c' is such that $c_x$ is between −image width/2 and +image width/2 (the image width being the width of the original image 101) and $c_y$ is between −image height/2 and +image height/2 (the image height being the width of the original image 101).

Figure 16A:
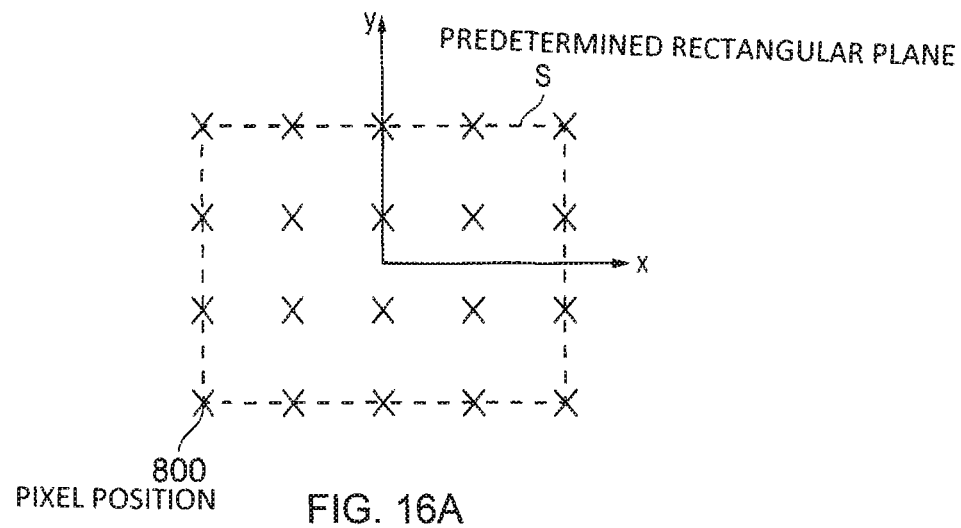
FIGS. 16A-16B show pixel positions located within the rectangular planes of FIG. 15A-15C.
Figure 16B:
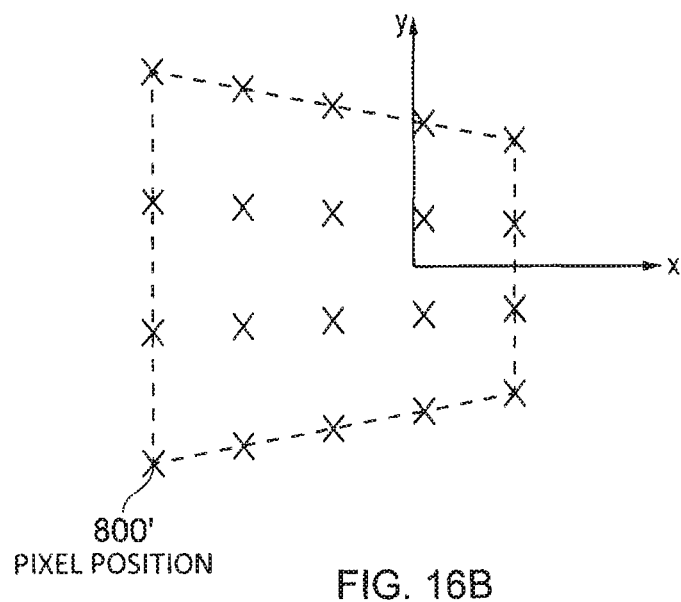

The coordinates c' must also be offset, by adding image width/2 to $c_x$ and adding image height/2 to $c_y$. This offsetting is necessary because the coordinates c' have been defined so as to include both positive and negative coordinate values (that is, $c_x$ is between −image width/2 and +image width/2 and $c_y$ is between −image height/2 and +image height/2), where as pixels in the image 101 are defined using only positive coordinates (that is, between 0 and image width in the x-direction and 0 and image height in the y-direction). The coordinates c' are offset by adding image width/2 to $c_x'$ and adding image height/2 to $c_y'$. As will be explained in more detail, this allows the coordinates c' to define a cut-out 300' of the image 101. The finding of corresponding source pixels in the image 101 is described with reference to FIGS. 16-24. FIGS. 16A and 16B are reproduced versions of FIGS. 15A and 15C, respectively. The difference, however, is that pixel positions have been marked onto the sets of coordinates s and c'. Specifically, in FIG. 16A, pixels positions 800 on the plane s have been marked. These pixel positions 800 represent the positions of pixels in the rectangular zoomed-in image that is to be displayed by the lower resolution device. In FIG. 16B, transformed pixel positions 800' on the transformed plane c' are shown. The transformed pixel positions 800' are the result of applying the virtual camera rotation matrix V to the plane s (see FIG. 15B) and performing the two-dimensional transformation (see FIG. 15C) previously described on the pixel positions 800.

The set of pixel positions 800' in FIG. 16B form the perspective-corrected shape 1635 of the cut-out of the image 101. The perspective-corrected zoomed-in image that is to be displayed on the relevant lower resolution device can now be obtained by mapping the pixel positions 800' to appropriate pixel positions in the image 101. The values of the mapped pixels in the image 101 are then are then used, via the one-to-one relationship between the transformed pixel positions 800' and the original pixel positions 800, to obtain pixel values for the rectangular zoomed in image. This is explained in more detail with reference to FIGS. 17A-17B.

Figure 17A:
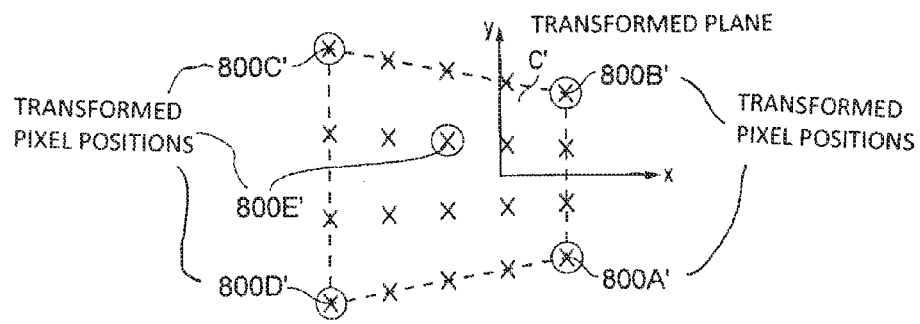
FIGS. 17A-17C shows the transformation of pixel positions in a transformed rectangular plane to corresponding pixel positions in the captured image.

FIG. 17A shows transformed pixel positions 800A', 800B', 800C', 800D' and 800E' of the transformed plane c'. It will be demonstrated how each of these transformed pixel positions will be mapped to a corresponding pixel in the image 101. It is to be understood that in embodiments, all the pixel positions on the transformed plane c' will each be mapped to a corresponding pixel in the image 101, using the method described for pixel positions 800A', 800B', 800C', 800D' and 800E'.

Figure 17B:
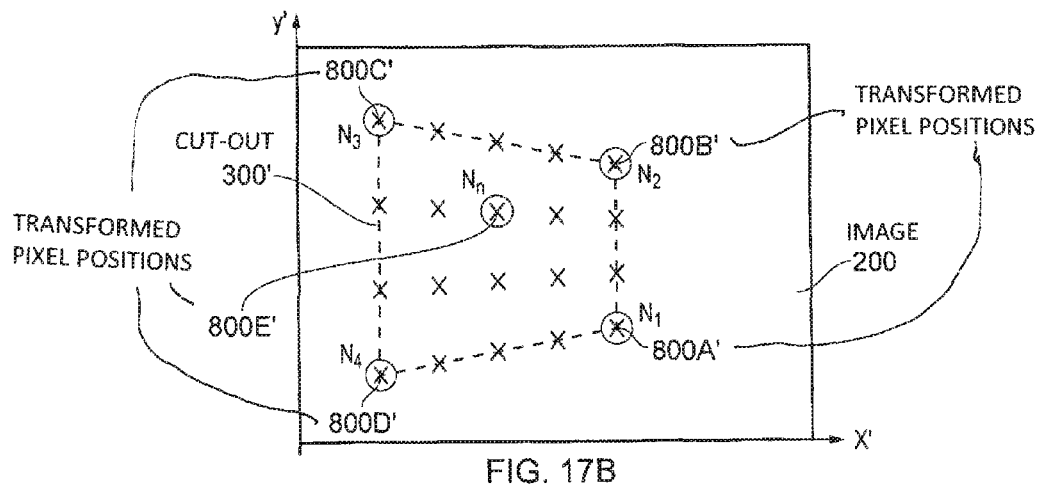

FIG. 17B shows the transformed pixel positions 800A', 800B', 800C', 800D' and 800E' once the transformed plane c' has been scaled (if necessary) and offset according to the dimensions of the original image. This allows the transformed pixel positions 800A', 800B', 800C', 800D' and 800E' to be mapped onto the image 101. More specifically, the transformed pixel positions 800A', 800B', 800C', 800D' and 800E' can each be mapped onto a pixel of the image 101. For each transformed pixel position, the value of the pixel to which it has been mapped can be associated with that transformed pixel position.

In FIG. 17B, it can be seen that transformed pixel position 800A' is associated with a pixel value $N_1$ of the original image 101. Similarly, the transformed pixel position 800B' is associated with a pixel value $N_2$ of the original image 101. This is repeated for the remaining transformed pixel positions, so that transformed pixel positions 800C', 800D' and 800E' are associated with pixel values $N_3$, $N_4$ and $N_n$, respectively. Pixel value $N_n$ is an arbitrary pixel value, used to demonstrate that the pixel matching process can be used for any arbitrary number of transformed pixel positions on the transformed plane c'.

In embodiments, the pixels of the image 101 may be colour pixels. Therefore, each pixel value $N_1$, $N_2$, etc. may comprise, for example, a separate value for each of the colours red, green and blue.

Figure 17C:
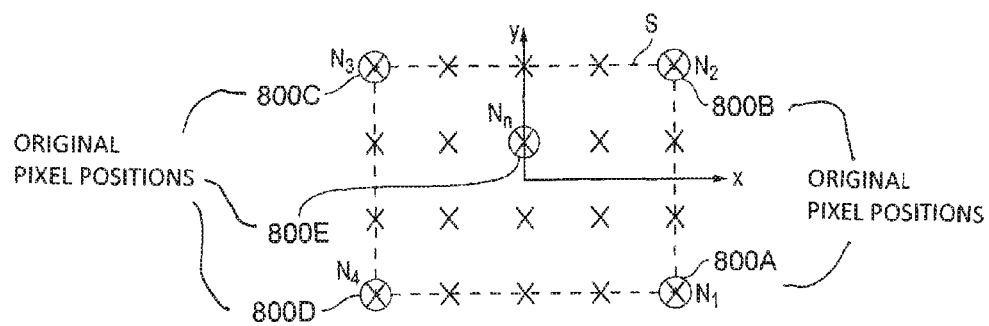

In FIG. 17C, original pixel positions of the plane s, labelled 800A, 800B, 800C, 800D and 800E are shown. These correspond, respectively, to the transformed pixel positions 800A', 800B', 800C', 800D' and 800E'. Because the pixel value $N_1$ has been associated with the transformed pixel position 800A', the pixel $N_1$ can also be associated with the original pixel position 800A. This is because of the one-to-one correspondence between the pixel position 800A and the transformed pixel position 800A'. The same is true for each of the pixel values $N_2$, $N_3$, etc. Specifically, the pixel value $N_2$ can be associated with original pixel position 800B, the pixel value $N_3$ can be associated with original pixel position 800C, etc. In the rectangular, perspective-corrected zoomed-in image, the shape of which is determined by the plane s, the value of pixels in the pixel positions 800A-800E can then be determined using the pixel values $N_1$-$N_n$.

Using this method, each of the original pixel positions 800 can be mapped to a corresponding pixel in the image 101. A rectangular, perspective-corrected zoomed-in image can thus be obtained using the selected pixels of the image 101. It is noted that the selected pixels of the image 101 form a patch of pixels with the perspective-corrected image cut-out shape 1635. This is an image cut-out 300' with perspective correction, as shown in FIG. 17B.

Figure 18:
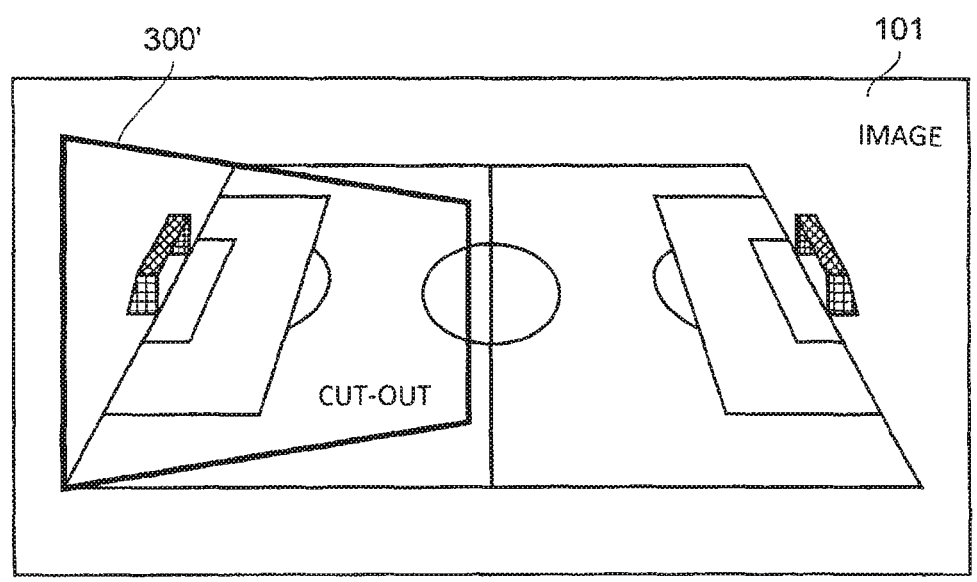
FIG. 18 is similar to FIG. 13, but shows an image cut-out 300' with perspective correction instead of the conventional rectangular image cut-out.

FIG. 18 is similar to FIG. 12, but shows an image cut-out 300' with perspective correction instead of the conventional rectangular image cut-out 300. By using the image cut-out with perspective correction, a zoomed-in, lower resolution portion of the image 101 may be obtained which appears as if it has been captured by the real, physical panning, tilting and/or zooming of the real camera 104. Such a zoomed-in image is generated from the pixels of the cut-out 300', and is illustrated in FIG. 18. The zoomed-in image generated from the cut-out 300' avoids the unnatural-looking perspective that arises from using the non-corrected cut-out 300.

Figure 19:
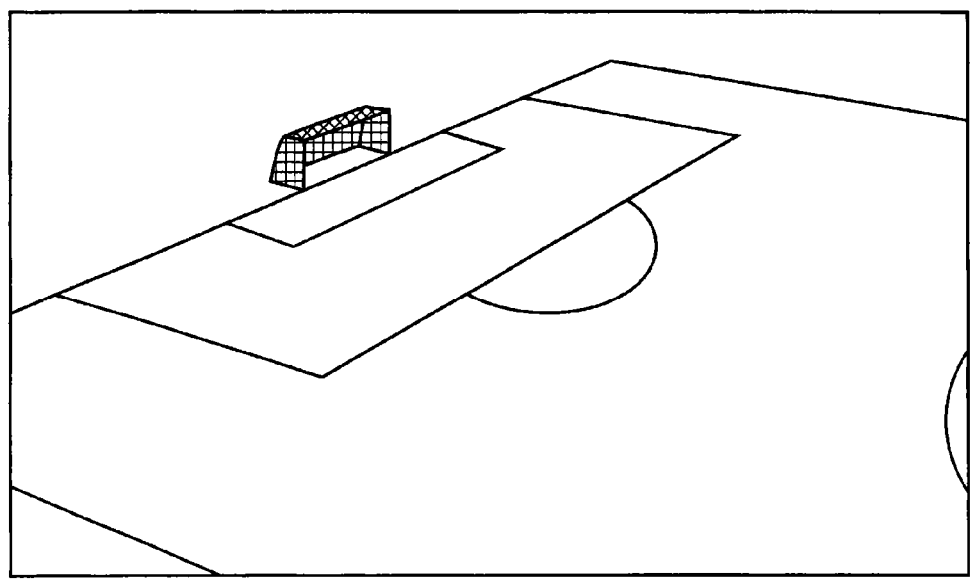
FIG. 19 shows an expanded view of the cut out of FIG. 18 when displayed.
Figure 20:
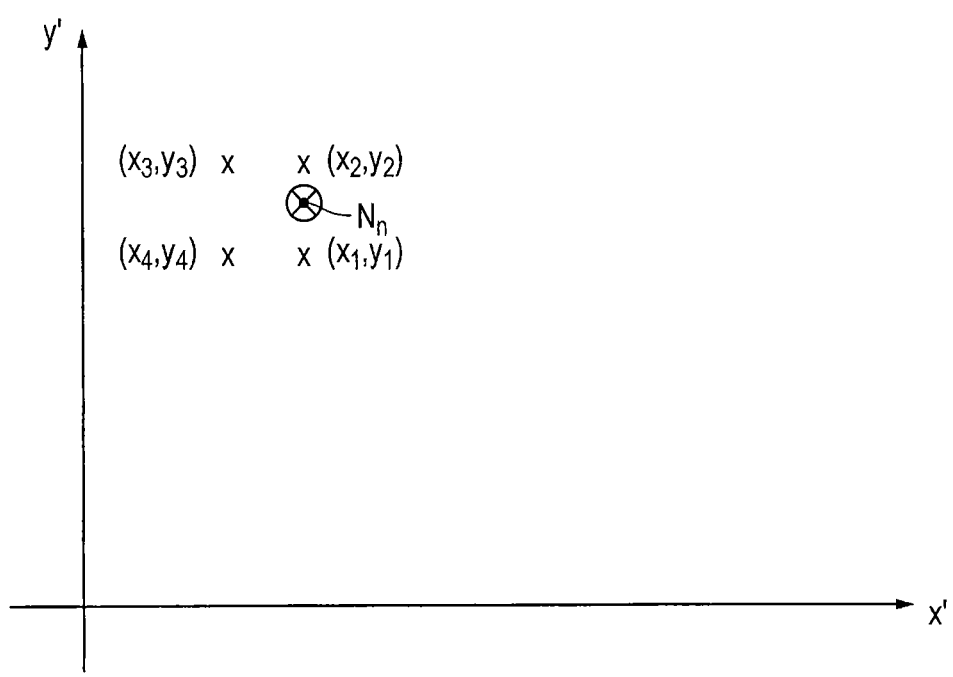
FIG. 20 shows a situation in which the position of the selected pixel in the image, as determined by the position of the virtual camera, does not fall exactly on a pixel position in the image.

FIG. 19 illustrates a situation in which the position of a pixel $N_n$, which is to be mapped to a transformed pixel position 800' in the cut-out 300', does not fall exactly on a pixel position in the image 101. This can occur if, for example, the motion of the virtual camera is perfectly continuous, that is, not granulated so as to take into account the fact that the image 101 is formed from discrete pixels.

In this example, four of the actual pixel positions in the image 101 are illustrated. These actual pixel positions are denoted by $(x_1, y_1)$, $(x_2, y_2)$, $(x_3, y_3)$ and $(x_4, y_4)$. The pixel value $N_n$ is thus determined using at least one of these pixels positions. In embodiments, the value of the closest pixel to that of the selected pixel position could be used. Alternatively, an average or weighted average of the values of at least two of the actual pixels in the image 101 could be used.

Figure 24:
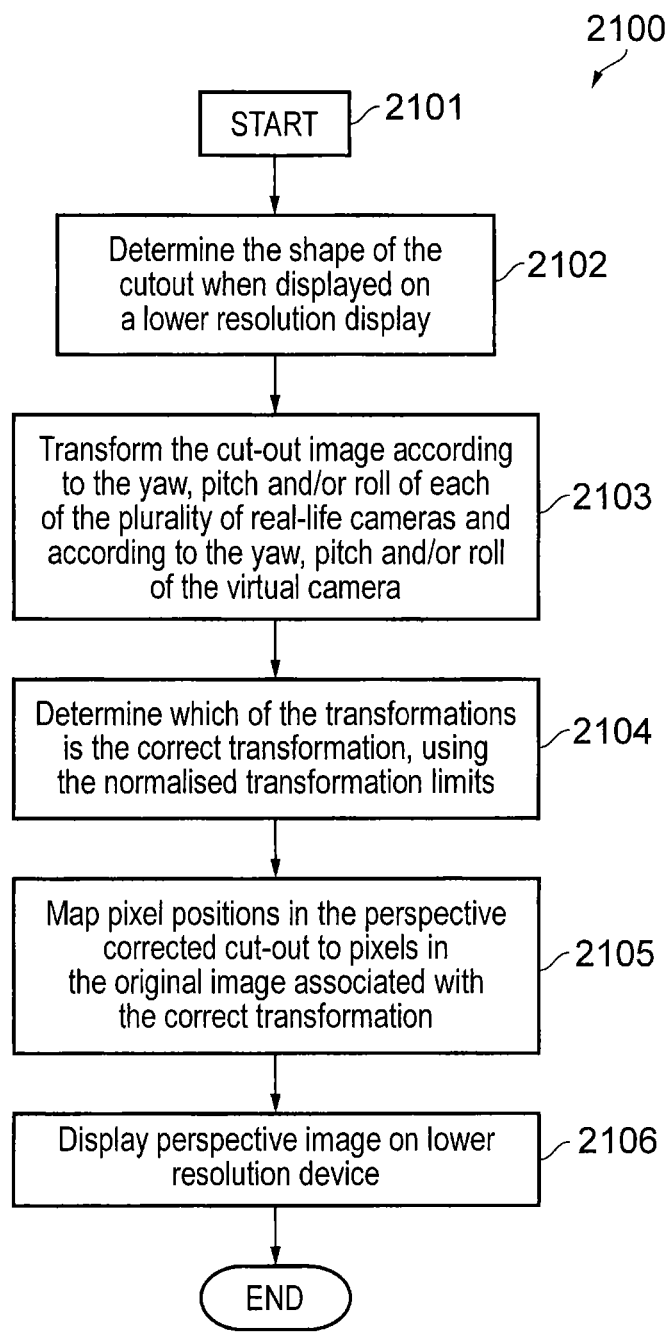
FIG. 24 shows a flow chart explaining embodiments multiple captured images of the scene.

A flow chart 2000 describing this process is shown in FIG. 24. The process starts in step 2001. In step 2002, the shape of the cut out when displayed to the user of the lower resolution device is determined. This is typically a rectangular cut-out shaped to fit the screen of the display. In step 2004, the cut-out image is transformed according to the pitch, yaw and roll of the virtual camera. This provides a position and perspective corrected shape for the cut-out. Scaling (if necessary) and offsetting are performed at this stage. In step 2005, the pixel positions in the perspective corrected cut-out are mapped to the pixel positions in the original image. In this way, pixel values for the image to be displayed on the lower resolution device are obtained. In step 2006, the perspective corrected image is displayed on the lower resolution device. Finally, in step 2007, the process ends.

Multiple Cameras

Although the above was discussed in relation to one camera, the image 101 may also be a stitched image produced from two cameras. This is the scenario described in FIG. 1.

As noted earlier, by using multiple cameras to capture images of the scene from different positions, parts of the scene can effectively be zoomed-in on by the virtual camera whilst still maintaining a reasonably high resolution in the zoomed images. Of course, the number of cameras is not limited to two. Any number of cameras may be used.

Figure 21:
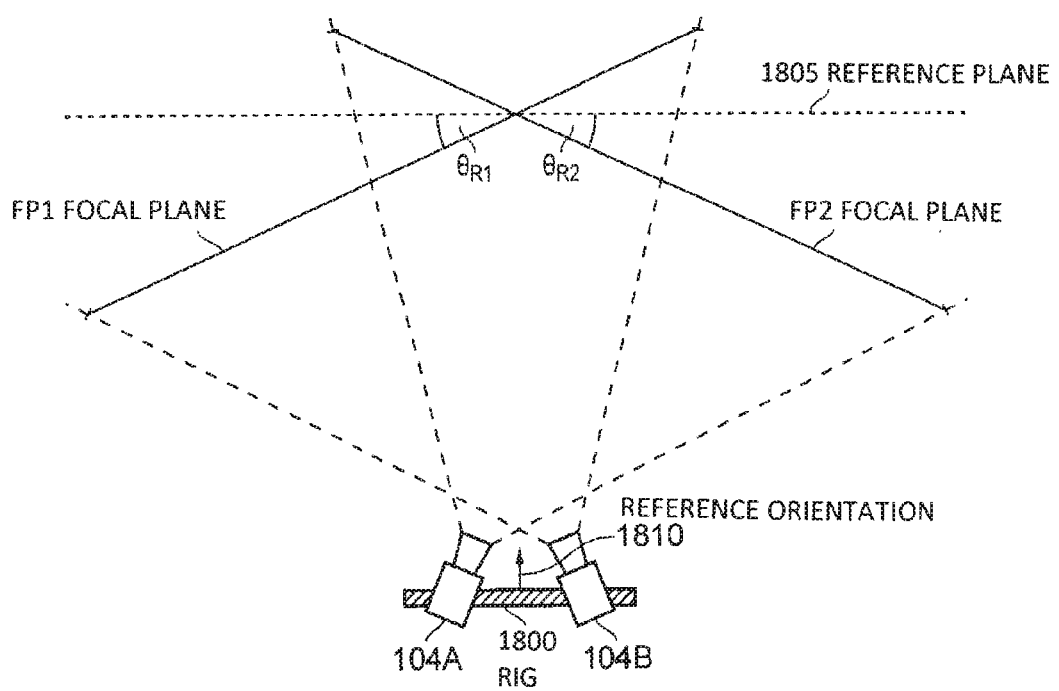
FIG. 21 shows a plan view of a camera array used to capture the image of the scene and the associated camera planes.

FIG. 21 illustrates the focal planes of each of two cameras 104A and 104B, the cameras being held on a rig 1800. The focal plane of the right camera 104B is focal plane FP1 and the focal plane of the left camera 104A is focal plane FP2. The focal planes FP1 and FP2 are angled, respectively, at angles $\theta_{R_1}$ and $\theta_{R_2}$ with respect a reference plane 1805. The orientation of the virtual camera 600 is determined with respect to a reference orientation 1810. When the orientation of the virtual camera 600 is the reference orientation 1800, then the focal plane of the virtual camera is aligned with the reference plane 1805.

In embodiments, the focal planes FP1 and FP2 of the cameras may not be orientated with respect to the reference plane 1805 in just one rotational dimension. Rather, each of the cameras 104A and 104B may be rotated in three dimensions (by a yaw, pitch and/or roll), resulting in the focal planes FP1 and FP2 being orientated with respect to the reference plane 1805 in three rotational dimensions. Each of the cameras 104A and 104B may thus be associated with a camera rotation matrix R. The camera rotation matrix R is similar to the virtual camera rotation matrix V. In embodiments, a general camera rotation matrix R may be expressed as a combination of pitch, yaw and roll:

$$R = R_R * P_R * Y_R$$

where $P_R$ is a pitch rotation matrix given by:

$$P_R = \begin{bmatrix} 1 & 0 & 0 \\ 0 & \cos\varphi_R & -\sin\varphi_R \\ 0 & \sin\varphi_R & \cos\varphi_R \end{bmatrix},$$

pitch being a rotation of an angle of $\varphi_R$ around the x-axis; $Y_R$ is a yaw rotation matrix given by:

$$Y_R = \begin{bmatrix} \cos\theta_R & 0 & \sin\theta_R \\ 0 & 1 & 0 \\ -\sin\theta_R & 0 & \cos\theta_R \end{bmatrix},$$

yaw being a rotation of an angle of $\theta_R$ around the y-axis; and $R_R$ is a roll rotation matrix given by:

$$R_R = \begin{bmatrix} \cos\rho_R & -\sin\rho_R & 0 \\ \sin\rho_R & \cos\rho_R & 0 \\ 0 & 0 & 1 \end{bmatrix},$$

roll being a rotation of an angle of $\rho_R$ around the z-axis.

Again, it has been found that the order in which $R_R$, $P_R$ and $Y_R$ are multiplied together to obtain R, as given here, results in the most natural-looking image cut-out. However, $R_R$, $P_R$ and $Y_R$ could also be multiplied in a different order.

Because the orientation of each of the cameras 104A and 104B is different, each of the cameras 104A and 104B is associated with a different camera rotation matrix R. Specifically, camera 104B, which has focal plane FP1, may be associated with a first camera rotation matrix $R_1$ and camera 104A, which has focal plane FP2, may be associated with a second camera rotation matrix $R_2$. Each of the camera rotation matrices $R_1$ and $R_2$ are defined by the yaw, pitch and roll of their respective cameras, and are calculated by a camera position calculation device located in the scalable content preparation means 110.

Figure 22:
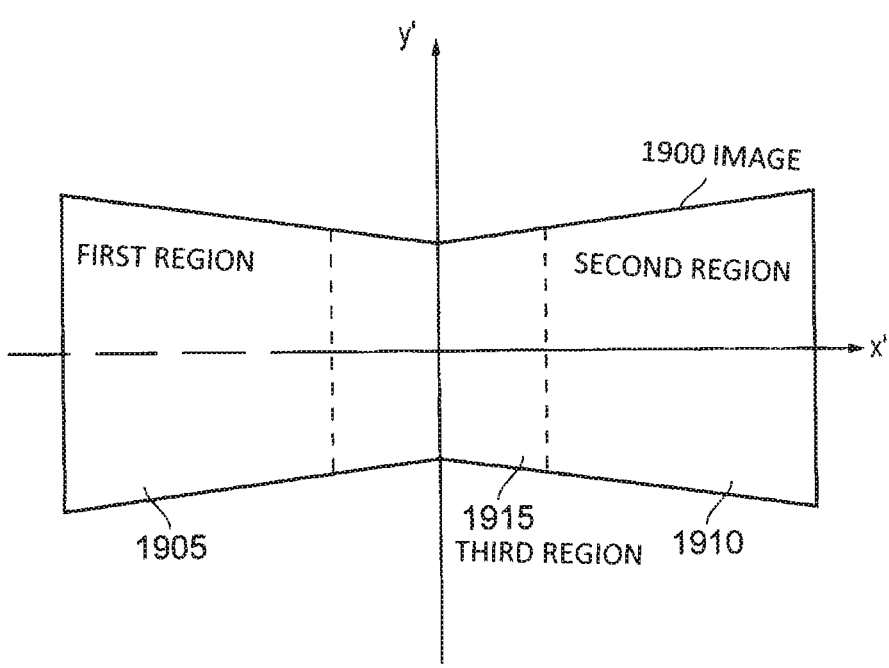
FIG. 22 shows a resultant stitched image using the arrangement of FIG. 21.
Figure 23:
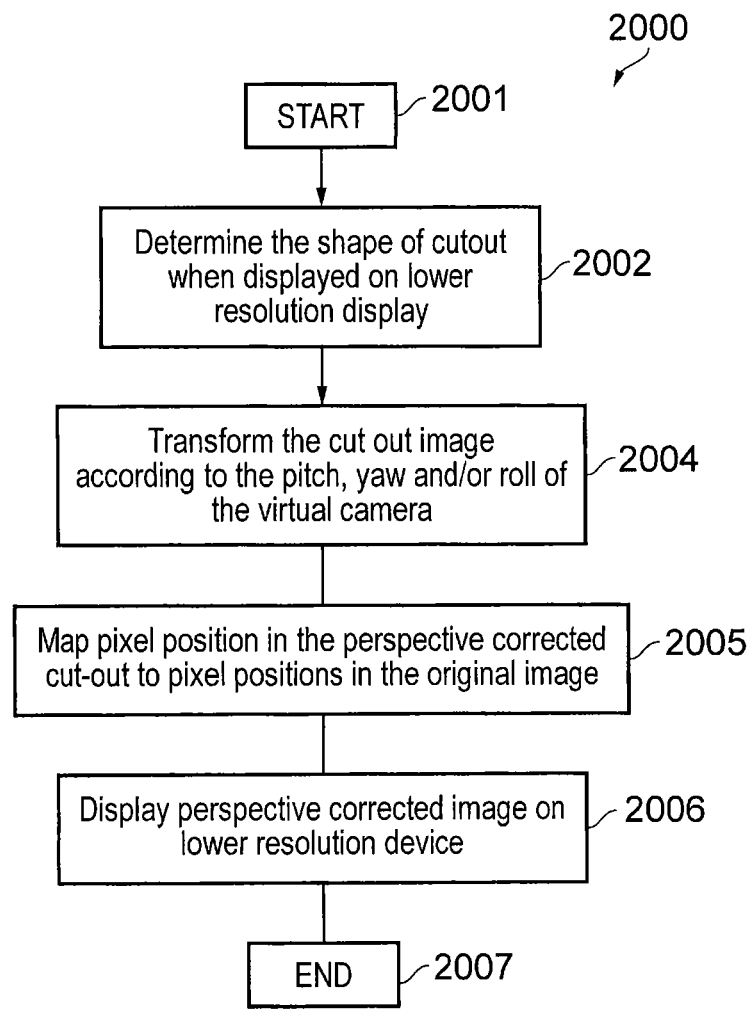
FIG. 23 shows a flow chart explaining embodiments.

Images from each of the cameras 104B and 104A are formed, respectively, from objects in the focal planes FP1 and FP2. The images are then stitched together as described above to obtain the two-dimensional stitched image. This is illustrated in FIG. 22 as image 1900. In embodiments, the stitched image may comprise a first region 1905, with image data corresponding only to the first focal plane FP1 (that is, from camera 104B), a second region 1910, with image data corresponding only to the second focal plane FP2 (that is, from camera 104A) and a third region 1915, with image data corresponding to both focal planes FP1 and FP2 (that is, from both cameras). The third region 1915 is formed due to the overlap of the focal planes FP1 and FP2.

It is recalled that in the single image embodiments described earlier (that is, where the image 101 is an image captured from a single camera), a perspective-corrected image cut-out shape 1635 is obtained by multiplying a predetermined rectangular plane of the size and shape of the desired zoomed-in, lower resolution image by the virtual camera rotation matrix V. This also applies to the multiple, stitched image embodiments. However, an extra term is required in order to compensate for the different orientations of the cameras 104A and 104B. This term is the relevant camera rotation matrix $R_1$ or $R_2$. Thus, for embodiments with a stitched image, the transformation equation $$c = V*s$$

becomes $$c = R*V*s$$

where R can be $R_1$ or $R_2$. The rest of the processing, such as the transformation of the plane c into two dimensions so as to obtain the coordinates c', remains the same as that described with reference to the single camera embodiment.

Thus, when there are two cameras, for each of the pixel positions 800 in the predetermined rectangular plane s, there are two possible transformations. Specifically, there is one transformation with $R_1$ and one transformation with $R_2$. In order to obtain the required perspective corrected shape and position of the cut-out 300', the transformation of each of the pixel positions in the plane s is performed for both $R_1$ and $R_2$. Once the two-dimensional transformation has been achieved so as to obtain the c' coordinates, the resulting value of the c' coordinates reveals whether pixels from the left-most image (from camera 104B, formed by objects in the focal plane FP1) or the right-most image (from camera 104A, formed by objects in the focal plane FP2) are to be used as source pixels.

To consider this in more detail, it is recalled that for the single camera case, the two-dimensional transformed coordinate $c_x'$ will be between −1 and 1 and the two-dimensional transformed coordinate $c_y'$ will be between −a and a, where $$a = \frac{\text{image height}}{\text{image width}}$$

(the image height and image width being the height and width of the original image 200, respectively). For the multiple camera case, these limits should also apply to the transformed coordinates ($c_x'$, $c_y'$) (with the limit a being determined from the height and width of an image from one of the cameras 104A and 104B) for at least one of $R_1$ and $R_2$. For a given original pixel position 800, there are three possible cases following the transformation using each of $R_1$ and $R_2$.

In the first case, the obtained coordinates ($c_x'$, $c_y'$) for the transformed pixel position 800' fall within the above defined limits when $R_1$ is used, but not when $R_2$ is used. This means that the correct transformed pixel position 800' to use is the one for $R_1$. It also means that a pixel value to be associated with the original pixel position 800 (to form the final zoomed-in image) will be taken from the left-hand image (that is, from the image defined by the focal plane FP1 of the camera 104B).

In the second case, the obtained coordinates ($c_x'$, $c_y'$) for the transformed pixel position 800' fall within the above defined limits when $R_2$ is used, but not when $R_1$ is used. This means that the correct transformed pixel position 800' to use is the one for $R_2$. It also means that a pixel value to be associated with the original pixel position 800 (to form the final zoomed-in image) will be taken from the right-hand image (that is, from the image defined by the focal plane FP2 of the camera 104A).

In the third case, the obtained coordinates ($c_x'$, $c_y'$) for the transformed pixel position 800' fall within the above defined limits for both $R_1$ and $R_2$. This means that either of the transformed pixel positions 800' may be used and that a source pixel value may be taken from either of the left-hand or right-hand image.

In embodiments, the scalable content preparation means 110 may be set to select one of the transformed pixel positions 800' in this case. For example, the scalable content preparation means 110 may be set to always choose the transformed pixel position 800' determined for $R_1$ (although, it would equally be possible for the transformed pixel position 800' determined for $R_2$ to be chosen instead). In this case, a pixel value to be associated with the original pixel position 800 (to form the final zoomed-in image) will be taken from the left-hand image. Alternatively, both calculated transformed pixel positions 800' can be used, and a pixel value to be associated with the original pixel position 800 (to form the final zoomed-in image) can be obtained as a weighted combination of the mapped pixel values in the left-hand and right-hand original images.

Thus, by transforming each of the pixel positions 800 using, separately, the camera rotation matrices $R_1$ and $R_2$, and by then choosing one of the resulting transformed pixel positions using the predetermined c' coordinate limits, a set of final transformed pixel positions 800' is obtained. Also, for each transformed pixel position 800', a pixel value to be associated with the relevant original pixel position 800 may be found, for the formation of the final, perspective-corrected, zoomed-in image.

In a similar way to the single camera case previously described with reference to FIGS. 17A-17C, the transformed pixel positions 800' form the shape of a perspective-corrected cut-out 300'. By scaling and offsetting the set of transformed pixel positions 800' as appropriate, pixel values from at least one of the original images captured by the cameras 104A and 104B may be associated with each of the original pixel positions 800, thus allowing a perspective-corrected zoomed-in image to be obtained.

A flow chart 2100 describing this process is shown in FIG. 24. The process starts in step 2101. In step 2102, the shape of the cut out when displayed to the user of the lower resolution device is determined. This is typically a rectangular cut-out shaped to fit the screen of the display. In step 2103, the cut-out image is transformed according to the pitch, yaw and/or roll of each of the real life cameras and according to the yaw, pitch and/or roll of the virtual camera. This provides a plurality of possible transformations for the cut-out image. In step 2104, a correct transformation of the cut-out image is determined. A correct transformation is one where the pixel positions of the transformed cut-out fall within the predetermined, normalised x and y limits. There may be more than one correct transformation for a given pixel position. This provides a position and a perspective corrected shape for the cut-out with respect to the original image(s) associated with the correct transformation(s). Scaling (if necessary) and offsetting are performed at this stage. In step 2105, the pixel positions in the perspective corrected cut-out are mapped to the pixel positions in the original image(s). In this way, pixel values for the image to be displayed on the lower resolution device are obtained. In step 2106, the perspective corrected image is displayed on the lower resolution device. Finally, in step 2008, the process ends.

Virtual Camera Limiting Algorithm

For both the single camera and multiple camera cases, the lower resolution perspective-corrected zoomed-in image is obtained from pixel values of an original captured image 101 using the perspective-corrected cut-out 300'. Specifically, the values of pixels which fall within the area of the scaled and offset perspective-corrected cut-out 300' are used to generate the pixels of the perspective-corrected-zoomed in image.

In order to ensure that there are no blank pixels in the resulting zoomed-in image (that is, pixels for which no data can be obtained), a limiting process may be applied to the three-dimensional rotation of the virtual camera 600 so as to ensure that the entirety of the scaled and offset perspective-corrected cut-out 300' remains within the area of the original image. In other words, no part of the cut-out 300' must be allowed to move outside of the area of the original image, since this will result in certain areas of the zoomed-in image being left blank (because there is no corresponding pixel data from the original image).

In embodiments, the following limiting algorithm may be used to ensure that the cut-out 300' remains within the area of the original captured image.

It is recalled that equation 3 below defines the first step in calculating a transformed pixel position 800' from an original pixel position 800. Specifically, this equation describes the rotational transformation of the predetermined rectangular plane s to obtain the plane c (see FIGS. 15A-15B):

$$c = R*V*s \quad (3)$$

For the multiple camera case, the camera rotation matrix R is expressed as a combination of pitch, yaw and roll of each camera:

$$R = R_R * P_R * Y_R$$

For the single camera case, no rotation of the physical camera 104 is required, and hence R is set equal to the identity matrix (I).

The virtual camera rotation matrix V is also expressed as a combination of pitch, yaw and roll (albeit in a different order):

$$V = P_V * Y_V * R_V$$

So, the equation for obtaining the transformed coordinate plane c $$c = R*V*s$$

can be written as:

$$c = R_R * P_R * Y_R * P_V * Y_V * R_V * s$$

The minimum and maximum yaw and pitch of the virtual camera 600 depend on the current level of zoom as well as the current position of the virtual camera.

Yaw Limits Algorithm

The minimum yaw for the virtual camera can be considered as the yaw for which the left corners of the final zoomed-in image (represented by the plane s) meet the left edge original image 101. This can be obtained by finding the yaw $\theta_V$ for a given set of transformed coordinates c' and original coordinates s. All other parameters such as the current pitch, $\varphi_V$, roll, $\rho_V$ and focal length, $F_V$, are fixed at their current values for the calculation.

First, combining the terms either side of the virtual camera yaw rotation matrix, $Y_V$, gives:

$$c = A*Y_V*B*s$$

where $$A = R_R * P_R * Y_R * P_V$$

and $$B = R_V$$

Let the vector p be the partial result, $$p = B*s$$

So, $$c = A*Y_V*p$$

Writing this out in full gives:

$$\begin{bmatrix} c_x \\ c_y \\ c_z \end{bmatrix} = \begin{bmatrix} A_{11} & A_{12} & A_{13} \\ A_{21} & A_{22} & A_{23} \\ A_{31} & A_{32} & A_{33} \end{bmatrix} * \begin{bmatrix} \cos\theta_V & 0 & -\sin\theta_V \\ 0 & 1 & 0 \\ \sin\theta_V & 0 & \cos\theta_V \end{bmatrix} * \begin{bmatrix} p_x \\ p_y \\ p_z \end{bmatrix}$$

$$\begin{bmatrix} c_x \\ c_y \\ c_z \end{bmatrix} = \begin{bmatrix} A_{11} & A_{12} & A_{13} \\ A_{21} & A_{22} & A_{23} \\ A_{31} & A_{32} & A_{33} \end{bmatrix} * \begin{bmatrix} p_x \cos\theta_V - p_z \sin\theta_V \\ p_y \\ p_x \sin\theta_V + p_z \cos\theta_V \end{bmatrix}$$

$$\begin{bmatrix} c_x \\ c_y \\ c_z \end{bmatrix} = \begin{bmatrix} A_{11} p_x \cos\theta_V - A_{11} p_z \sin\theta_V + A_{12} p_y + \\ A_{13} p_x \sin\theta_V + A_{13} p_z \cos\theta_V \\ A_{21} p_x \cos\theta_V - A_{21} p_z \sin\theta_V + A_{22} p_y + \\ A_{23} p_x \sin\theta_V + A_{23} p_z \cos\theta_V \\ A_{31} p_x \cos\theta_V - A_{31} p_z \sin\theta_V + A_{32} p_y + \\ A_{33} p_x \sin\theta_V + A_{33} p_z \cos\theta_V \end{bmatrix}$$

We are interested in the leftmost corners of the perspective-corrected cut-out 300' coinciding with the left hand edge of the original image. This will occur when the leftmost value of the two-dimensional transformed plane c', as defined in the x-direction, is given by $c_x'=-1$. We recall that $c_x'$ can be found by dividing $c_x$ by $c_z$ and then zooming in by the focal length ($F_c$) of the camera 104, $$c_x' = -F_c * \frac{c_x}{c_z}$$

$$c_x' = -F_c * \frac{A_{11}p_x\cos\theta_V - A_{11}p_z\sin\theta_V + A_{12}p_y + A_{13}p_x\sin\theta_V + A_{13}p_z\cos\theta_V}{A_{31}p_x\cos\theta_V - A_{31}p_z\sin\theta_V + A_{32}p_y + A_{33}p_x\sin\theta_V + A_{33}p_z\cos\theta_V}$$

$$c_x'A_{31}p_x\cos\theta_V - c_x'A_{31}p_z\sin\theta_V + c_x'A_{32}p_y + c_x'A_{33}p_x\sin\theta_V + c_x'A_{33}p_z\cos\theta_V = -F_cA_{11}p_x\cos\theta_V + F_cA_{11}p_z\sin\theta_V - F_cA_{12}p_y - F_cA_{13}p_x\sin\theta_V - F_cA_{13}p_z\cos\theta_V$$

$$(c_x'A_{31}p_x + c_x'A_{33}p_z + F_cA_{11}p_x + F_cA_{13}p_z)\cos\theta_V + (-c_x'A_{31}p_z + c_x'A_{33}p_x - F_cA_{11}p_z + F_cA_{13}p_x)\sin\theta_V = -c_x'A_{32}p_y - F_cA_{12}p_y$$

This is of the form:

$$a\cos\theta + b\sin\theta = c$$

This can be solved by using the trigonometric identity:

$$\cos(\theta-\alpha) = \cos\theta\cos\alpha + \sin\theta\sin\alpha$$

First, introduce, R:

$$\therefore R\cos(\theta-\alpha) = R\cos\theta\cos\alpha + R\sin\theta\sin\alpha$$

$$\therefore R\cos(\theta-\alpha) = (R\cos\alpha)\cos\theta + (R\sin\alpha)\sin\theta$$

Let $a = R\cos\alpha$; $b\cos\alpha = R\sin\alpha$
Then:

$$R\cos(\theta-\alpha) = a\cos\theta + b\sin\theta$$

Now, $a^2+b^2 = R^2\cos^2\alpha + R^2\sin^2\alpha = R^2(\cos^2\alpha+\sin^2\alpha) = R^2$ $$\therefore R = \sqrt{a^2+b^2}$$

Also, $$\frac{R\sin\alpha}{R\cos\alpha} = \frac{b}{a}, \therefore \tan\alpha = \frac{b}{a}$$

$$\therefore \alpha = \tan^{-1}\frac{b}{a}$$

So, $$\sqrt{a^2+b^2}\cos(\theta-\alpha) = a\cos\theta + b\sin\theta$$

where $$\alpha = \tan^{-1}\frac{b}{a}$$

Comparing with $a\cos\theta + b\sin\theta = c$ we see that:

$$c = \sqrt{a^2+b^2}\cos(\theta-\alpha)$$

Rearranging to find:

$$\cos(\theta-\alpha) = \frac{c}{\sqrt{a^2+b^2}} \qquad (4)$$

$$\theta - \alpha = \cos^{-1}\frac{c}{\sqrt{a^2+b^2}}$$

$$\theta = \cos^{-1}\frac{c}{\sqrt{a^2+b^2}} + \alpha$$

$$\theta = \cos^{-1}\frac{c}{\sqrt{a^2+b^2}} + \tan^{-1}\frac{b}{a}$$

This can now be used to solve for $\theta_V$, by substituting in the values for a, b and c:

$$a = c_x'A_{31}p_x + c_x'A_{33}p_z + F_cA_{11}p_x + F_cA_{13}p_z$$

$$b = -c_x'A_{31}p_z + c_x'A_{33}p_x - F_cA_{11}p_z + F_cA_{13}p_x$$

$$c = -c_x'A_{32}p_y - F_cA_{12}p_y$$

Matrix A can be calculated from the known camera rotation matrix R (if applicable) and the current virtual camera pitch rotation matrix:

$$A = R_R * P_R * Y_R * P_V$$

Partial result, p, can be calculated using:

$$p = B * s$$

where $B = R_V$ is the current virtual camera roll rotation matrix, and s is the appropriate coordinate of the rectangular plane s which represents the size and shape of the desired zoomed-in image. In other words, s is an appropriate screen coordinate of the zoomed-in image (we recall that the original pixel positions 800, which define the actual pixel coordinates of the zoomed-in image, are defined on the plane s).

Typically, two screen co-ordinates are tested for each limit. To find the minimum yaw, we test the top left screen co-ordinate and the bottom left screen co-ordinate.

For top left screen co-ordinate, set $$s = \begin{bmatrix} -n_x \\ m_x \\ -F_v \end{bmatrix}.$$

For bottom left screen co-ordinate, set $$s = \begin{bmatrix} -n_x \\ -m_x \\ -F_v \end{bmatrix}.$$

Here, $F_v$ is the focal length of the virtual camera 600, and the earlier definitions of $n_x$ and r (which describe the size of the zoomed-in image with respect to the size of the original image) are used.

As already mentioned, we are interested in the leftmost corners of the perspective-corrected cut-out 300' coinciding with the left hand edge of the original image. This will occur when the leftmost value of the two-dimensional transformed plane c', as defined in the x-direction, is given by $c_x'=-1$. This value of $c_x'$ is thus used together with each of the top left and bottom left screen coordinates in equation (4) so as to obtain two values of $\theta_V$. The first is the yaw value for which the top left screen co-ordinate coincides with the left hand edge of the original image, while the second is yaw value for which the bottom left screen co-ordinate coincides with the left hand edge of the original image. The most restrictive of these two values (i.e. the least negative) should be used as the current value of the minimum yaw. The process is repeated to find the maximum yaw, this time using the top right screen co-ordinate and the bottom right screen co-ordinate.

For top right screen co-ordinate, set $$s = \begin{bmatrix} n_x \\ rn_x \\ -F_v \end{bmatrix}.$$

For bottom right screen co-ordinate, set $$s = \begin{bmatrix} n_x \\ -rn_x \\ -F_v \end{bmatrix}.$$

These co-ordinates are tested against the right hand edge of the original image, so this time, $c_x'=1$ should be used.

This will again result in two values of $\theta_V$ being calculated. The first is the yaw value for which the top right screen co-ordinate coincides with the right hand edge of the original image, while the second is the yaw value for which the bottom right screen co-ordinate coincides with the right hand edge of the original image. The most restrictive of these two values (i.e. the least positive) should be used as the current value of the maximum yaw.

In embodiments, these limits are applied in a damping algorithm (as will be described below) to limit the current x value of the virtual camera position.

It should be noted that if the user zooms in or out, the minimum and maximum yaw calculated will be affected (since $F_v$ will have changed) and the new minimum and maximum yaw will immediately be applied as described in the damping algorithm. This also occurs if the user changes the pitch of the virtual camera 1600, or if the roll of the virtual camera changes. The pitch and/or roll of the virtual camera may change due to a change in pitch or rig pitch or indeed if any of the parameters describing the camera 104 are changed. In this way, the virtual camera 600 is constantly kept within the bounds of the original image.

Thus, the limiting technique described obtains the left-most and right-most possible values of the two-dimensional transformed set of coordinates c' (that is, $c_x'=\pm 1$), the set of coordinates c' defining the perspective-corrected cut-out shape 1635. It also obtains coordinates for the corners of the plane s, the plane s defining the size and shape of the final, zoomed-in image. The limiting technique then uses this, with all other real camera 104 and virtual camera 1600 parameters fixed, to find the minimum and maximum yaw of the virtual camera 1600.

This technique has advantages over other techniques that may use a different algorithm to test whether the corners of the cut-out are outside the bounds of the original image and apply a control mechanism to correct the virtual camera position. A control mechanism is likely to have some latency, so the cut-out cannot be guaranteed to always be within the bounds of the original image at all times. This results in the zoomed-in image having blank pixels until these are subsequently corrected, which is undesirable. Also, such control mechanisms can become unstable as they can tend to over-correct the error.

In order to calculate the minimum and maximum yaw with multiple images, the minimum yaw will be calculated with respect to the left hand image (that is, the image defined by objects in the first focal plane FP1) and the maximum yaw will be calculated with respect to the right hand image (that is, the image defined by objects in the second focal plane FP2). For the left hand image, $R_1$ would be used in the above equations. For the right hand image, $R_2$ would be used in the above equations.

Pitch Limits Algorithm

A similar method is used to limit the pitch of the virtual camera. In this case, the terms either side of the virtual camera pitch rotation matrix, $P_V$, are combined to give:

$$c = A * P_V * B * s$$

where $$A = R_R * P_R * Y_R$$

and $$B = Y_V * R_V$$

Again, let the vector p be the partial result, $$p = B * s$$

So, $$c = A * P_V * p$$

Writing this out in full gives:

$$\begin{bmatrix} c_x \\ c_y \\ c_z \end{bmatrix} = \begin{bmatrix} A_{11} & A_{12} & A_{13} \\ A_{21} & A_{22} & A_{23} \\ A_{31} & A_{32} & A_{33} \end{bmatrix} * \begin{bmatrix} 1 & 0 & 0 \\ 0 & \cos\varphi_V & \sin\varphi_V \\ 0 & -\sin\varphi_V & \cos\varphi_V \end{bmatrix} * \begin{bmatrix} p_x \\ p_y \\ p_z \end{bmatrix}$$

This can be expanded using the same approach as for the yaw, except this time we are interested in the y position, $c_y'$. The same trigonometric identity can then again be used to derive the solution for determining the pitch, $\varphi_V$.

Typically, two screen co-ordinates would be tested for each limit. To find the minimum pitch for the virtual camera, the top left screen co-ordinate and the top right screen co-ordinate is tested.

For top left screen co-ordinate, set $$s = \begin{bmatrix} -n_x \\ rn_x \\ -F_v \end{bmatrix}.$$

For top right screen co-ordinate, set $$s = \begin{bmatrix} n_x \\ rn_x \\ -F_v \end{bmatrix}.$$

These co-ordinates are tested against the top edge of the original image 101, so $c_y'=a$ should be used (where a is the ratio of the original image height to the original image width, as defined earlier). This results in two values of $\varphi_V$ being calculated. The first is the pitch value for which the top left screen co-ordinate coincides with the top edge of the original image, while the second value is the pitch value for which the top right screen co-ordinate coincides with the top edge of the original image. The most restrictive of these two values (that is, the least negative) should be used as the current value of the minimum pitch.

The process is repeated to find the maximum pitch, this time using the bottom left screen co-ordinate and the bottom right screen co-ordinate.

For bottom left screen co-ordinate, set $$s = \begin{bmatrix} -n_x \\ -rn_x \\ -F_v \end{bmatrix}$$

For bottom right screen co-ordinate, set $$s = \begin{bmatrix} n_x \\ -rn_x \\ -F_v \end{bmatrix}$$

These co-ordinates are tested against the bottom edge of the original image, so $c'_y = -a$ should be used.

This will again result in two values of $\varphi_V$, being calculated. The first is the pitch value for which the bottom left screen co-ordinate coincides with the bottom edge of the original image, while the second is the pitch value for which the bottom right screen co-ordinate coincides with the bottom edge of the original image. The most restrictive of these two values (i.e. the least positive) should be used as the current value of the maximum pitch.

In embodiments, these limits are applied in a damping algorithm (as will be described below) to limit the current y value of the virtual camera position.

In embodiments, to obtain the minimum and maximum pitch when there are multiple cameras, the above algorithm may be used to test against the left hand image (that is, the image defined by objects in the first focal plane FP1) when the virtual camera is pointing left, $\theta_V < 0$, and the right hand image (that is, the image defined by objects in the second focal plane FP2) when the virtual camera is pointing right, $\theta_V > 0$. For the left hand image, $R_1$ would be used in the above equations. For the right hand image, $R_2$ would be used in the above equations.

Alternatively, the pitch limits can be calculated against both cameras at all times (taking the most restrictive values by testing for both $R_1$ and $R_2$), or the pitch limits may gradually change from being calculated against the left image (using $R_1$) to being calculated against the right image (using $R_2$) as the yaw changes from negative to positive.

Adjusting the Limits for Lens Distortion Correction

As previously described, additional barrel or pin cushion distortion correction may be performed on the transformed coordinates c' which define the shape 1635 of the perspective-corrected cut-out 300'. Because such additional correction will slightly change the shape 1635 of the perspective-corrected cut-out 300', the limits on the motion of the virtual camera 1600 will need to be slightly adjusted to take this into account. Specifically, the yaw and pitch limits for the virtual camera 1600 need to be reduced when barrel distortion correction is performed on the transformed coordinates c', since this will result in the transformed coordinates c' moving further from the centre of the original image 101 (and thus the edges of the cut-out 300' may move off the original image 101 at the conventional limits). The limits for the yaw and/or pitch may be reduced by using the previously defined lens distortion correction equations to modify the values of $c'_x$ or $c'_y$ that are used to calculate the yaw and pitch limits. The lens distortion correction equations are repeated here:

$$c''_x = c'_x + b * c'_x * (C - l^2)$$

$$c''_y = c'_y + b * c'_y * (C - l^2)$$

where $$l^2 = (c'_x * c'_x + c'_y * c'_y) * K$$

C and K are constants and b is the lens distortion correction parameter, as described previously.

The yaw and pitch limits should only be modified for cases where b>0 (barrel distortion), as this is when the edges of the barrel distortion-corrected original image will move towards the centre and the virtual camera limits should thus be made more restrictive. It is noted that the movement of the edges of the original image 101 towards the centre to correct for barrel distortion is equivalent to the edges of the cut-out 300' moving away from the centre to correct for barrel distortion. In embodiments, the edges of the cut-out 300' are moved away from the centre through the use of the distortion correction equations on the transformed coordinates c'. Advantageously, this means that barrel distortion correction is only performed on the part of the original image 101 required for cut-out, reducing the amount of processing required.

However, because of this equivalence, the calculation of the new limits, following barrel distortion correction of the shape of the cut-out 300', can be performed by considering movement of the edges of the original image 101. The calculation of the new limits, using this approach, is explained below.

Yaw Limits

When adjusting the value of $c'_x (-1$ or $+1)$ to test for the yaw limits, $c'_y = 0$ will give the worst case adjustment. This is because $c'_y = 0$ is the midpoint position along the left or right hand edge of the original image, which will move the greatest distance towards the centre following correction for barrel distortion. Therefore, $c'_y = 0$ should be used in the lens distortion correction equations above to find the worst-case adjusted value of $c'_x$. The adjusted value, $c''_x$, can then be used in the yaw limits equations in place of $c'_x$. That is, instead of using the limits $c_x = \pm 1$ in the yaw limits equations, the adjusted values determined for each of $\pm 1$ using the distortion correction equations can be used instead.

Pitch Limits

Likewise, when adjusting the value of $c'_y (-a$ or $+a)$ to test for the pitch limits, $c'_x = 0$ will give the worst case adjustment. This is because $c'_x = 0$ is the midpoint position along the top or bottom edge of the original image, which will move the greatest distance towards the centre following correction for barrel distortion. Therefore, $c'_x = 0$ should be used in the lens distortion equations to find the worst-case adjusted value of $c'_y$. The adjusted value, $c''_y$, can then be used in the pitch limits equations in place of $c'_y$. That is, instead of using the limits $c_x = \pm a$ in the pitch limits equations, the adjusted values determined for each of $\pm a$ using the distortion correction equations can be used instead.

Note that when b is negative, meaning that pin cushion distortion correction is being applied, the edges of the original image 101 will have moved away from the centre.

In this case, one might think that the yaw and pitch limits could be made less restrictive. However, only the edges of the original image will have moved while the corners will have stayed in the same place. This means that the worst case, in terms of restrictions of the yaw and pitch, is at the corners. Therefore, to ensure that the cut-out 300' is always within the bounds of the original image at the corners, no changes should actually be made to make the limits less restrictive.

Figure 25:
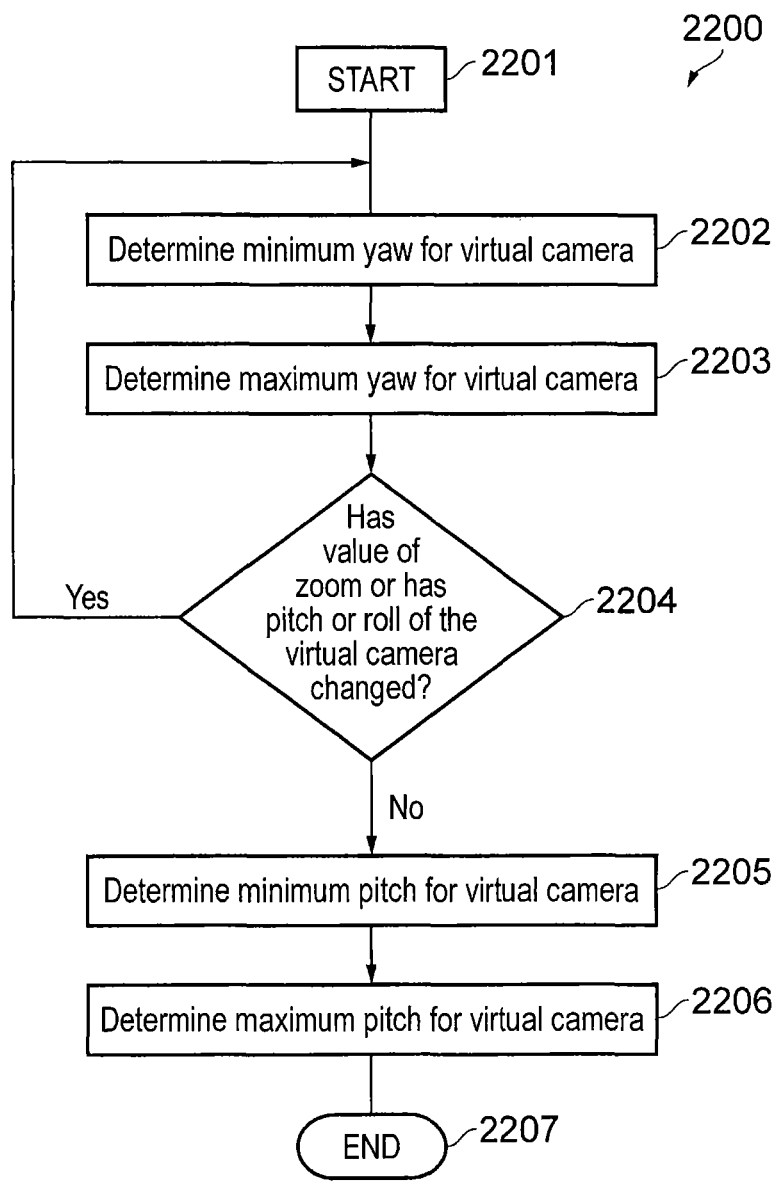
FIG. 25 shows a flow chart explaining the limitation of movement associated with the virtual camera.

Referring to FIG. 25, a flow chart 2200 showing the virtual camera limiting algorithm is provided. This process starts at 2201. The minimum yaw for the virtual camera is determined in 2202. The maximum yaw for the virtual camera is determined in 2203. In step 2204, it is decided whether the value of zoom or pitch or roll of the virtual camera has changed. If the answer is yes, the process returns to step 2202. Alternatively, if the answer is no, the minimum pitch for the virtual camera is determined in 2205. The maximum pitch for the virtual camera is determined in 2206 and the process ends in 2207.

Damping and Sensitivity Algorithm

The aim of the damping algorithm is to create a realistic virtual camera movement with natural-feeling inertia from the movements of the computer 107. The computer 507 is used for altering the yaw, pitch and zoom of the virtual camera 600, and could comprise, for example, a mouse, a joystick or trackball device.

The controller movement is received as a regularly updated x, y and z position. A position could be defined as a difference from the previous position (this is how a mouse sends its co-ordinates) or as an absolute position. In embodiments, the z-position may be changed multiplicatively, so that zooming in by a certain factor (for example, by factor 2, so that the zoom is doubled) takes the same amount of time, no matter what the zoom level (thus, it takes the user the same amount of time to zoom in from ×2 to ×4 as it does from ×4 to ×8). The controller position is given by:

$$j = \begin{bmatrix} j_x \\ j_y \\ j_z \end{bmatrix}$$

The x and y positions will ultimately be interpreted as the virtual camera yaw and pitch. As already mentioned, the z position will be interpreted as the virtual camera zoom.

The target yaw, pitch and zoom of the virtual camera 1600 (which, combined, may be referred to as the target virtual camera position) are calculated using a scaled version of the controller position. The scaling depends on the required positional sensitivity and zoom sensitivity of the controller.

$$\text{Target virtual camera position} = t = \begin{bmatrix} t_x \\ t_y \\ t_z \end{bmatrix} = \begin{bmatrix} PS * j_x \\ PS * j_y \\ ZS * j_z \end{bmatrix}$$

Here, PS=positional sensitivity and ZS=zoom sensitivity. These can be set according to user preference. Usually, the positional sensitivity for x and y would be the same, but a different value of PS could be used for each. If, for example, the user wanted it to be easy to change the yaw of the camera but difficult to change its pitch, a lower value of PS would be used for $j_y$ than for $j_x$.

Additionally, PS may be scaled according to the current zoom. For example, a scaled version of PS, PS', could be obtained as:

$$PS' = PS/j_z$$

or $$PS' = PS/\sqrt{j_z}$$

This ensures that the position of the virtual camera will change more slowly when it is zoomed in.

The target position for the virtual camera is then limited:

$$\text{Target virtual camera position} = t' = \begin{bmatrix} t'_x \\ t'_y \\ t'_z \end{bmatrix} = f_{limit}(t)$$

The function $f_{limit}$ is a function which uses the limiting algorithm described earlier. It prevents the position of the virtual camera 1600 from exceeding predetermined limits of the yaw and/or pitch which would result in certain pixels of the final, zoomed-in image being left blank (due to corresponding areas of the perspective-corrected cut-out 300' moving off the edge of the original image 101).

The current position of the virtual camera 1600, that is, the position that is currently used for the generation of the zoomed-in image, will be gradually modified to move towards the target position at a rate determined by a damping coefficient. Each new, temporary, virtual camera position v' that occurs during this gradual modification is obtained from the previous position v using the equation:

$$\text{New virtual camera position} = v' = \begin{bmatrix} v'_x \\ v'_y \\ v'_z \end{bmatrix} = \begin{bmatrix} v_x + (t'_x - v_x) * d \\ v_y + (t'_y - v_y) * d \\ v_z + (t'_z - v_z) * d \end{bmatrix}$$

The damping coefficient, d, is typically 0.1, but can be adjusted to any value, for example, according to user preference. Also, the damping coefficient may be changed in dependence on the new virtual camera position. For example, the damping coefficient may be increased towards the edge of the original image 101 to avoid over-run of the virtual camera off of the original image 101.

Finally, the current virtual camera position v' is also limited, to again ensure that the entirety of the perspective-corrective cut-out 300', from which the final, zoomed-in image is formed, remains within the bounds of the original image 200.

$$\text{Limited new virtual camera position} = v'' = \begin{bmatrix} v''_x \\ v''_y \\ v''_z \end{bmatrix} = f_{limit}(v')$$

The additional limiting is necessary as the interim positions between the starting virtual camera position and the target virtual camera position will not previously have been tested against the limits. This means that the virtual camera 1600 appears to pan from one position to another, with all the interim images produced during this pan being within the limits of the original image 101 (and thus no blank pixels are generated). This results in the pan of the virtual camera 1600 appearing more like the pan of a real camera across a scene.

The x, y and z positions are interpreted as virtual camera yaw, pitch and zoom using a scaling constant:

$$\text{Yaw, } \theta_v = v'_x * S_x$$

$$\text{Pitch, } \varphi_v = v'_y * S_y$$

$$\text{Zoom, } F_v = v'_z * S_Z$$

Here, $S_x$, $S_y$, and $S_z$ are scaling constants.

Alternatively, because the controller motion is supposed to represent the angular movement of a camera in an arc, yaw and pitch may be obtained by an inverse tangent operation:

$$\text{Yaw, } \theta_v = \tan^{-1}(v'_x * S_x)$$

$$\text{Pitch, } \varphi_v = \tan^{-1}(v'_y * S_y)$$

This gives the camera a more accurate constant speed of movement across the original (or stitched) camera picture.

Auto Generation of Border

Figure 26A:
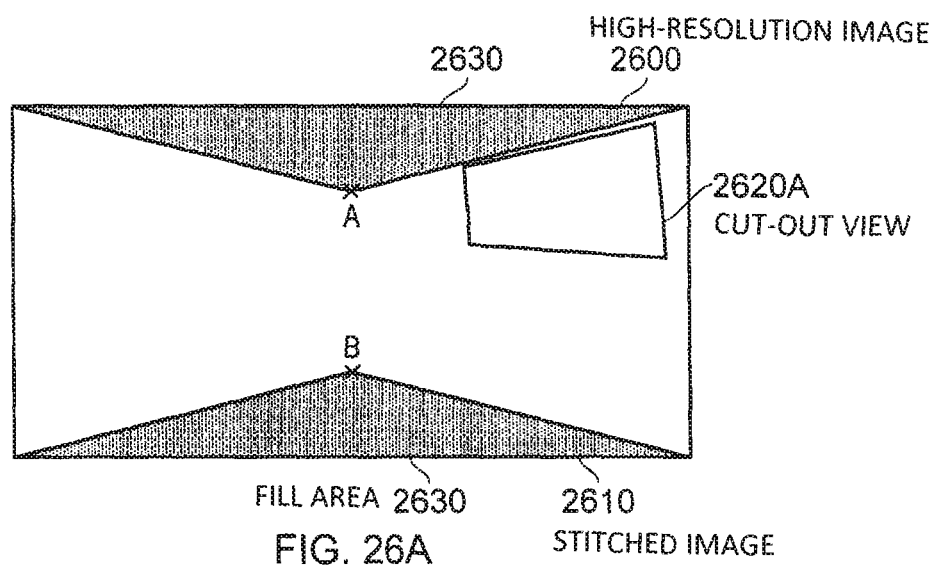
FIG. 26A-26F shows simplified screen shots of a first image including a stitched image and a cut out moving around the first image.

Referring now to FIG. 26A, a simplistic view of the output ultra-high resolution image 2600 is shown. Specifically, the ultra-high resolution 2600 contains the stitched image 2610 and a fill area 2630. In other words, the ultra-high resolution image 2600 comprises the stitched image 2610 and the fill area 2630. The reason the ultra-high resolution image 2600 includes both the stitched image 2610 and the fill area 2630 is because the cameras are located above the real life scene and because the cameras have a different field of view. In other words, as the cameras are looking down on the real life scene, and have a different field of view to one another, the stitched image 2610 does not completely fill the ultra-high resolution image 2600. Additionally, as shown in FIG. 26A, the virtual camera 2620 can be controlled to produce a perspective corrected version of the cut-out (or segment) of the ultra-high definition image 2600.

Figure 26B:
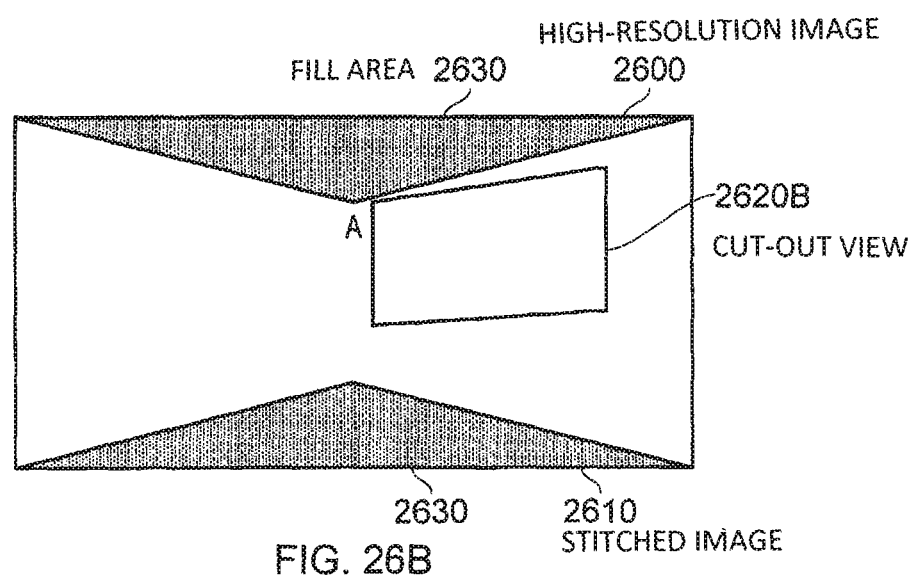

Referring now to FIG. 26B, as can be seen, the cut-out 2620 is moved in towards the centre of the stitched image 2610. It should be noted here that because of the pitch limiting algorithm described above, the cut-out 2620 is bound to the upper edge of the stitched image 2610. In other words, the cut-out 2620 contains only part of the stitched image 2610 and no fill area 2630.

Figure 26C:
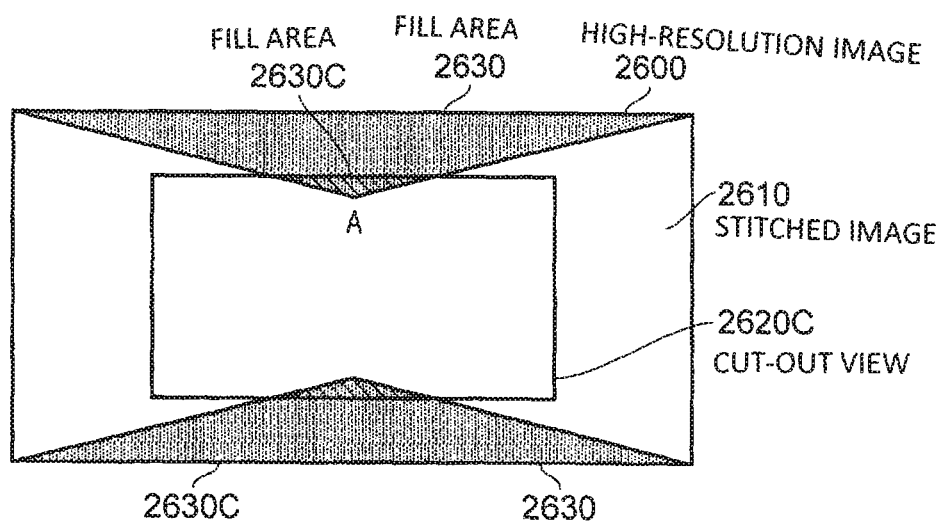
Figure 27A:
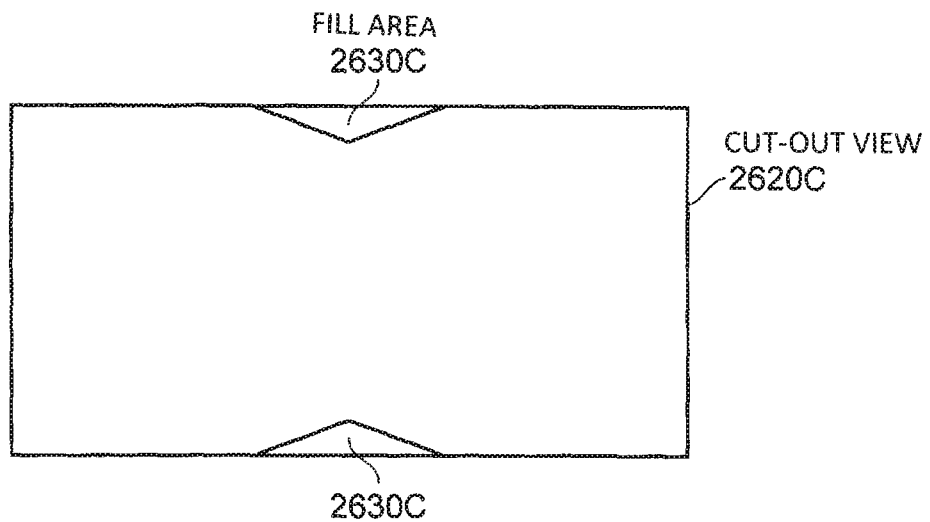
FIGS. 27A-27D shows a simplified screen shot of a second image which is the output of the cut out.

Referring now to FIG. 26C, the cut-out 2620 is towards the centre of the stitched image 2610. However, as the virtual camera is zoomed out (i.e. the cut-out is made bigger), the cut-out 2620 includes both the stitched image 2610 and part of the fill area 2630C. The actual cut-out 2620 from FIG. 26C is shown in FIG. 27A. Specifically, the cut-out 2620C of the ultra-high definition image 2600 includes both the wanted stitched image 2610 and parts of the fill area 2630C. As will be appreciated, including the fill area 2630C is undesirable in the cut out 2620C as this destroys the illusion of the virtual camera (or the cut-out) as capturing the image.

Embodiments of the disclosure aim to address this issue.

Figure 26D:
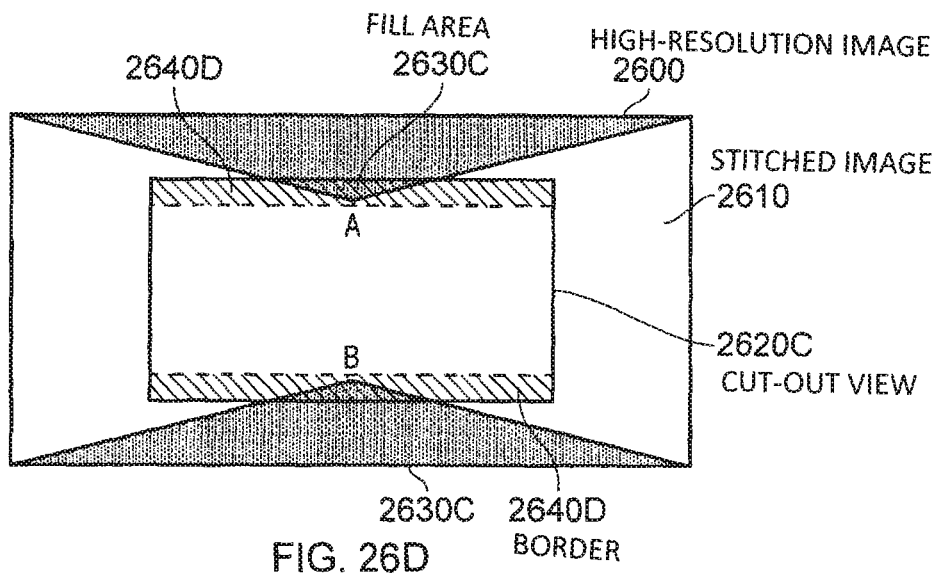
Figure 26F:
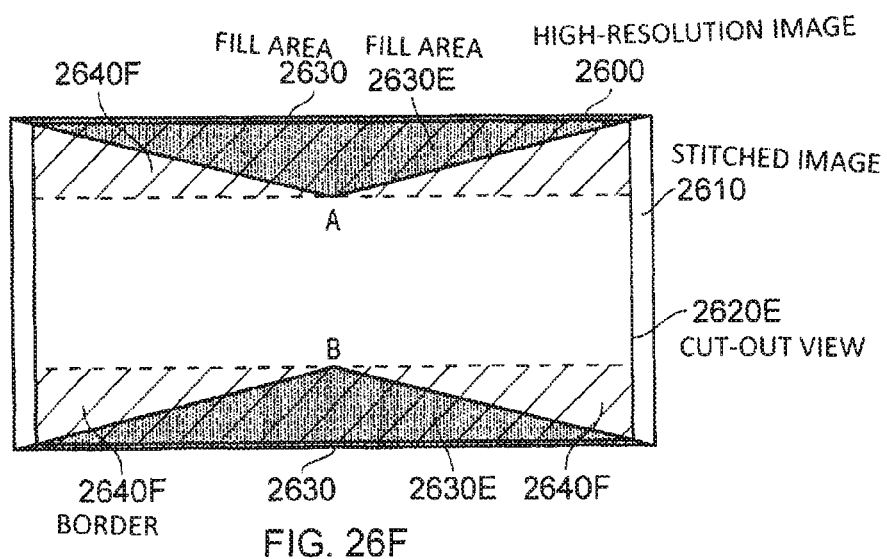
Figure 27B:
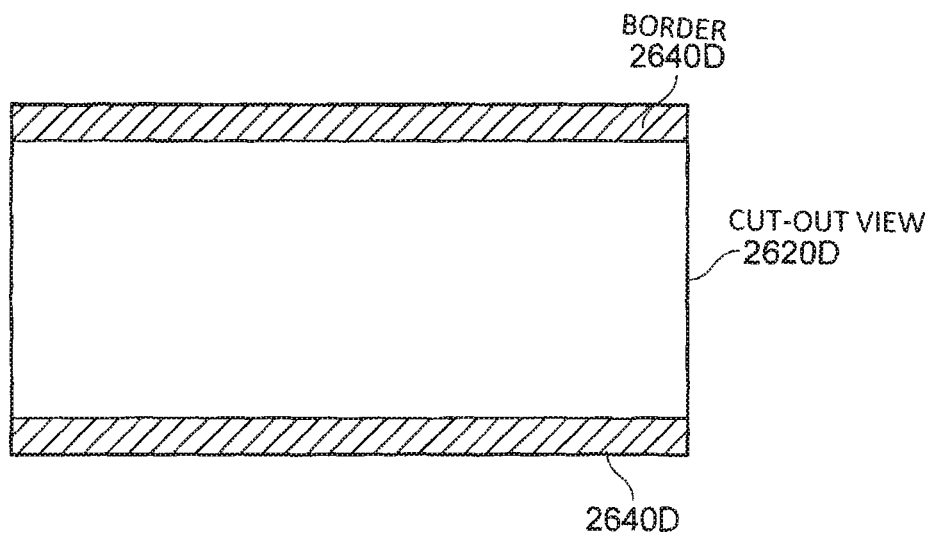

Referring to FIG. 26D, the cut out 2620D (which is the same as the cut out 2620C but with embodiments of the disclosure applied) according to embodiments is shown. In this cut out 2620D, a border 2640D is drawn across the width of the cut out 2620D. The depth of the upper border 2640D extends from point A in the cut out 2620D to the upper boundary of the cut out and similarly, the depth of the lower border 2640D extends from point B in the cut out to the lower boundary of the cut out 2640D. In other words, a border 2640D is drawn from point A to the upper edge of the cut out 2620D and from point B to the lower edge of the cut out 2620D. This border 2640D is, in embodiments, black in colour, although the disclosure is not limited. By having the border 2640D in black provides the illusion of a "letterbox" view. Point A represents the lowest point from the upper boundary of the cut out at which the fill area 2630D impinges into the cut out 2620D. Similarly, point B represents the highest point from the lowest boundary at which the fill area 2630D impinges into the cut out 2620D. The output of the virtual camera view is shown in FIG. 27B. Specifically, the cut out 2620D is displayed as the output of the virtual camera. In this case, instead of having the included fill area 2630C, the border 2640D is applied and extends along the entire width of the virtual camera view 2620D. This gives the letterbox appearance which ensures the integrity of the virtual camera view is maintained.

Figure 26E:
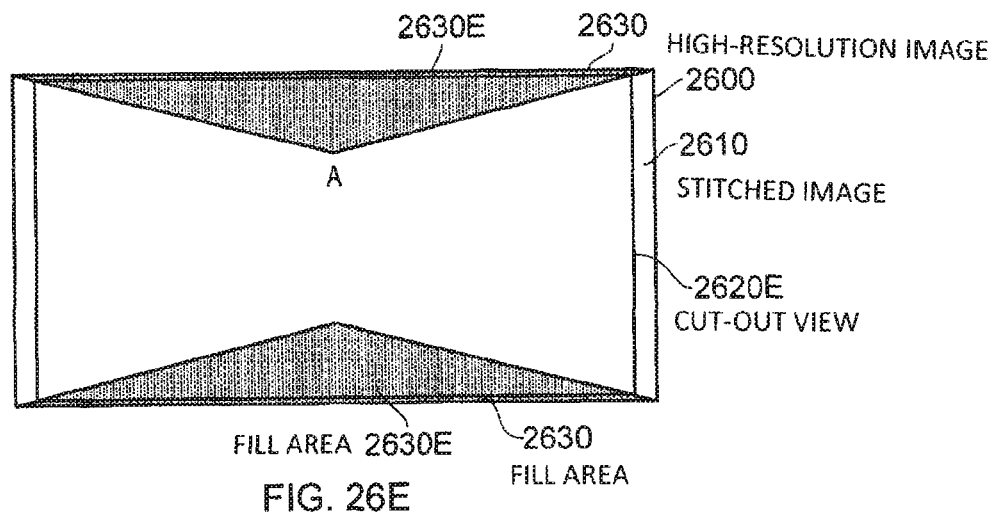
Figure 27C:
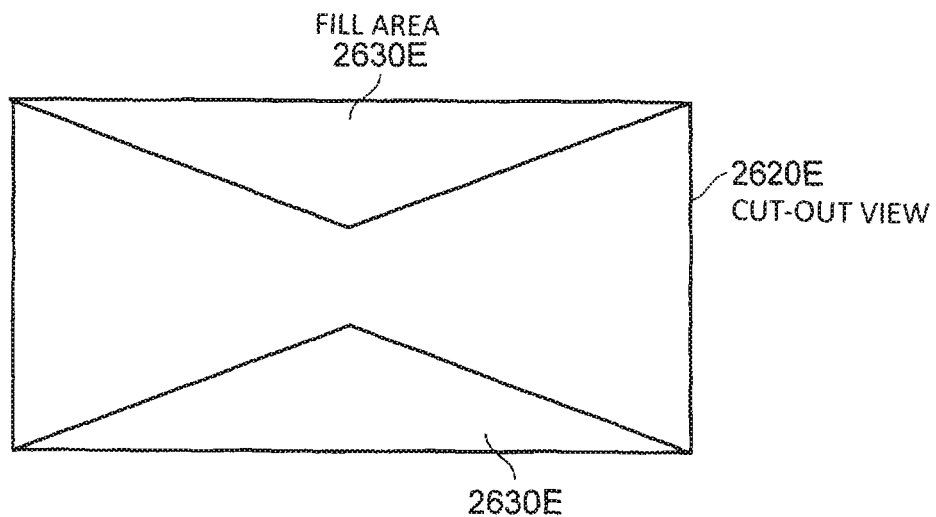
Figure 27D:
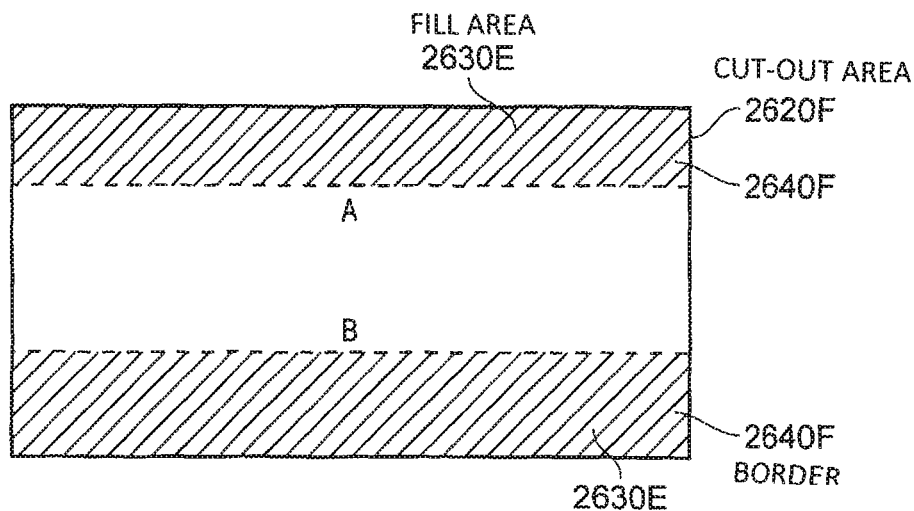

Similarly, referring to FIG. 26E, the virtual camera view is further zoomed out (i.e. the cut out 2620E is made bigger). Accordingly, compared to the view in FIG. 26C, more of the fill area 2630 is included in the cut out 2620E. This included fill area is reference 2630E in the Figure. Again, referring to FIG. 27C, the virtual camera view (i.e. the cut out view) with embodiments of the disclosure is shown. As can be seen, the included fill area 2630E is larger than in the example of FIG. 27A and again destroys the illusion of the virtual camera. As explained above, in embodiments of the disclosure, a border 2640F is drawn from point A to the upper edge of the cut out 2620E and from point B to the lower edge of the cut out 2620E. The effect of this border 2640F is shown in FIG. 27D. As can be seen in FIG. 27D, the border 2640F ensures that the illusion of the cut out representing a virtual camera view is maintained. This is achieved by automatically applying a border and thus representing the virtual camera view, which is output to a user, as a letterbox view.

Figure 28:
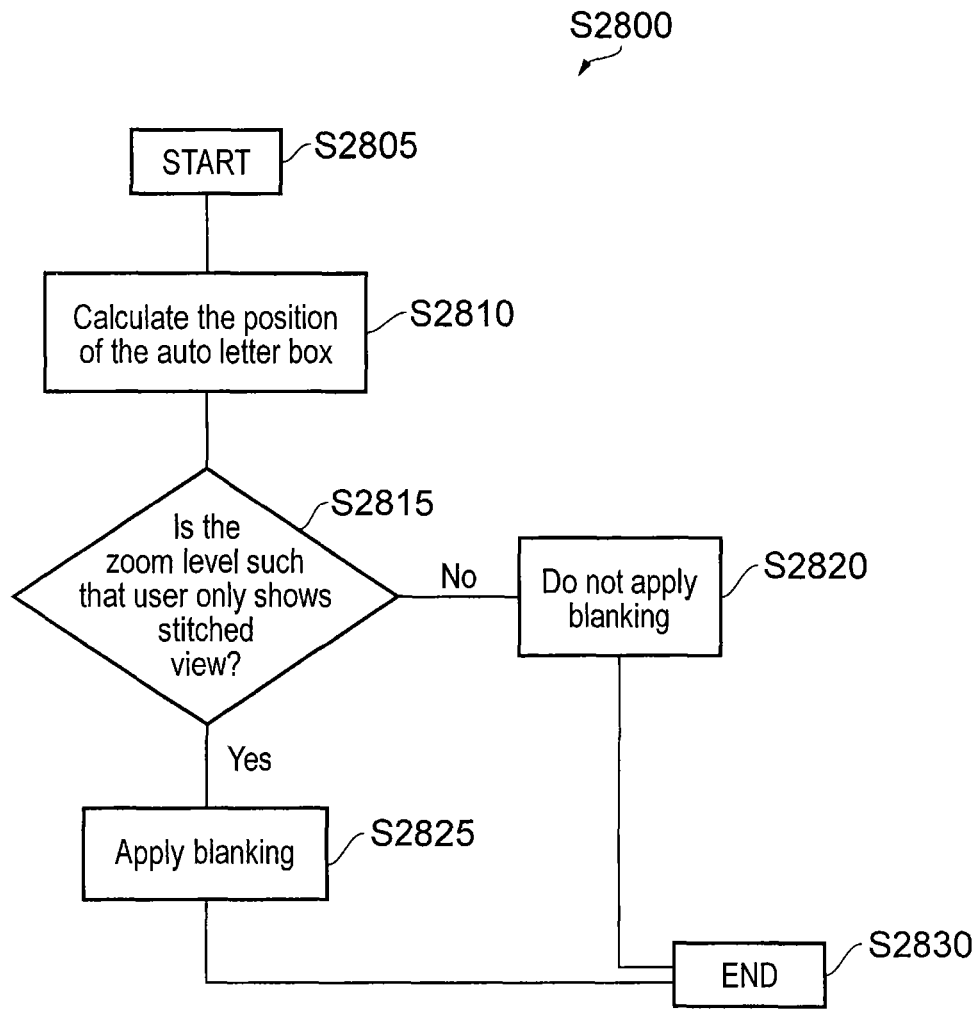
FIG. 28 shows a flow chart according to embodiments of the disclosure.

Referring to FIG. 28, a flow chart S2800 is shown. The flow chart S2800 shows how the border is generated and applied to the cut out. For each frame where the cut out is generated, the process starts at step S2805. The position of the border (termed the "auto-letterbox" in the Figure) is calculated in step S2810. This is described in detail in FIG. 29 later. As will become apparent, the position of the border need only be calculated once, when the system is switched on, or when the system is calibrated after the cameras capturing the real-life scene are disturbed in some way, and the values may be stored and re-used for each frame where the cut-out is generated. This is because the position of the auto-letterbox is determined by the stitched image rather than the position of the cut out. By performing this step once reduces processing effort.

After the position of the border is calculated in step S2810 (or in fact read from memory), the process moves to step S2815 where it is decided whether the current zoom level of the virtual camera is shows only the stitched image. In other words, in step S815, it is decided whether the cut out includes only the stitched image or whether the cut out includes both the stitched image and the fill area.

In the event that the cut out includes only the stitched image (and thus no fill area), then the "no" path is followed and blanking is not applied. This is step S2820. This is advantageous because un-necessary application of the border is avoided which maximises the amount of the cut out which may be displayed to the user. For example, referring back to FIG. 26A and FIG. 26B, if the border was applied all the time, then the border would be applied from point A across the width of the stitched image. This would mean much of the cut-out view 2620A would be removed unnecessarily which is undesirable. Therefore, by making this decision at step S2815 in FIG. 28 ensures that the border is applied only where necessary to maintain the illusion of the virtual camera view.

Returning to FIG. 28, in the event that the cut out includes both the stitched image and the fill area, then the "yes" path is followed to step S2825. In this step, the border is applied to the cut out image as explained with reference to FIG. 26D, FIG. 26F, FIG. 27B and FIG. 27D.

After the border is applied or not applied as the case may by, the process for that position of the cut out is ended in step S2830.

Figure 29:
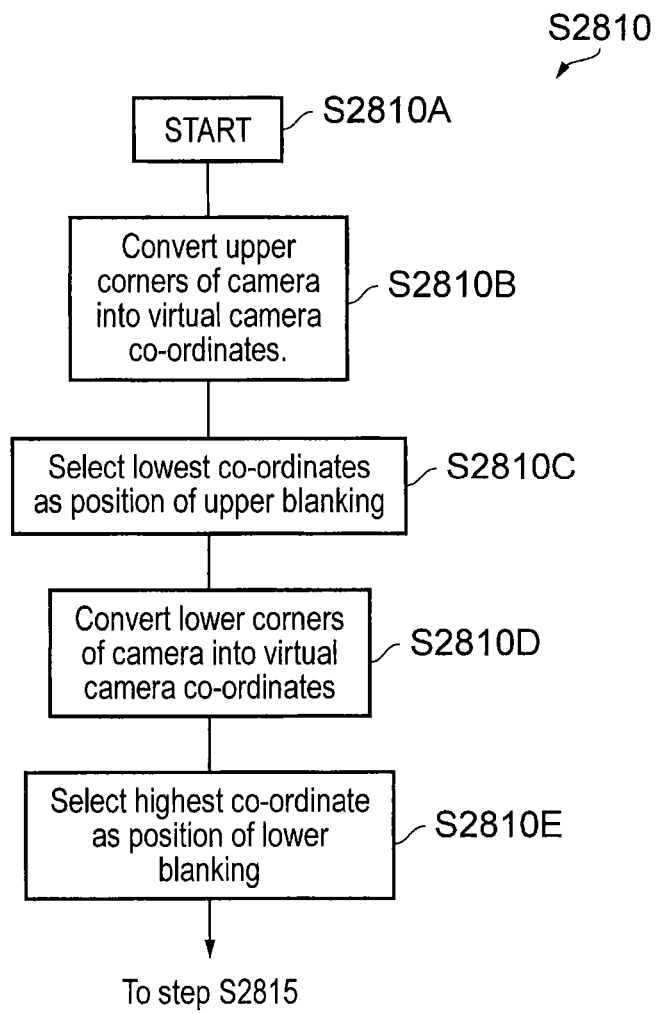
FIG. 29 shows a flow chart of the position calculating step of FIG. 28.

Referring to FIG. 29, a more detailed explanation of step S2810 is provided. The process S2810 is started at step S2810A. In step S2810B, the upper corners of the captured image from each camera are converted into virtual camera co-ordinates. It is advantageous to perform this for both upper corners of each camera (in the case of a stitched image made from two cameras) to ensure that the border is applied to the lowest point irrespective of the stitching of the images so as to avoid any fill area being shown in the cut-out. The mechanism for converting the upper corners of the captured image into virtual camera co-ordinates is the inverse transform to that explained above in the section entitled "multiple cameras". So instead of:

$$c=R*V*s$$

the equation:

$$s=V^{-1}*R^{-1}*c$$

is used. Then, for each camera, the co-ordinates $c=(-1,a)$ are used to find position on screen, s, of upper left corner and the co-ordinates $c=(1,a)$ are used to find position on screen, s, of upper right corner.

Note that the virtual camera rotation matrix, V, will change every frame as the virtual camera is moved so these calculations may be performed optionally every frame. The virtual camera movement (which affects V) as well as the calibration (which affects the R matrices for each camera) determines whether we need to recalculate.

In step S2810C, the lowest converted virtual camera co-ordinate of the stitched image is selected as the position of the upper border (or upper blanking in the Figure).

In a similar fashion to step S2810B, the lower corners of the captured image from each camera are converted into virtual camera co-ordinates in step S2810D. In this case, for each camera, use the co-ordinates $c=(-1,-a)$ to find position on screen, s, of lower left corner and use the co-ordinates $c=(1,-a)$ to find position on screen, s, of lower right corner. The highest converted virtual camera co-ordinate positions of the stitched image is then selected as the position of the lower border (or lower blanking in the Figure) in step S2810E.

The process then continues to step S2815 in FIG. 28.

As noted above, this process may be carried out for each frame. However, in embodiments, it is carried out only periodically, maybe every predetermined number of frames, or every instance where the system needs calibration. At other times, these co-ordinate values are stored and simply referred to in step S2815. This reduces processing requirements of the system.

Figure 30:
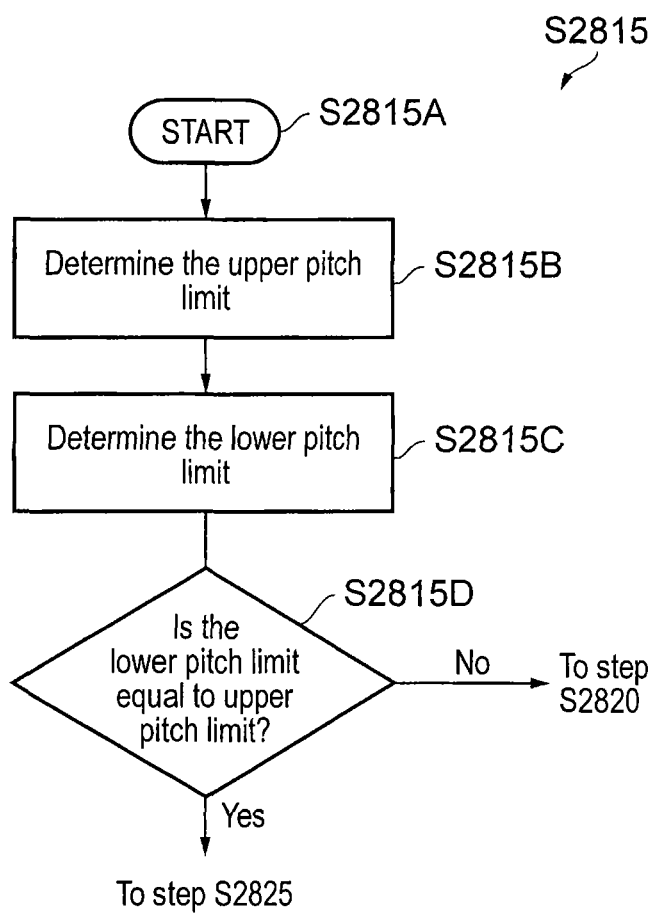
FIG. 30 shows a flow chart of the decision step in FIG. 28.

Referring to FIG. 30, a more detailed flow chart of step S2815 is shown. The process starts at step S2815A. The upper pitch limit of the cut out is determined in step S2815B. In other words, the upper pitch limit of the virtual camera is determined in step S2815B. This is explained above in the section entitled "pitch limits". In an embodiment, the upper pitch limit itself is limited so that its minimum allowable value is zero.

The lower pitch limit of the cut out is determined in step S2815C. In other words, the lower pitch limit of the virtual camera is determined in step S2815C. This is explained above in the section entitled "pitch limits".

In an embodiment, the lower pitch limit itself is limited so that its maximum allowable value is zero.

It is advantageous to limit the upper and lower pitch limits to zero because if the upper limit became lower than the lower limit this would cause the virtual camera to bounce between the two limits each frame. Therefore, limiting them both to zero prevents this and centres the virtual camera when zooming out to show the stitched view.

A comparison between the values of the upper pitch limit and the lower pitch limit is then made in step S2815D. If the upper pitch limit is less than or equal to the lower pitch limit (or zero in the above pitch limited case), then it is determined that there will be fill area included in the cut out. The "yes" path is followed to step S2825 where the border is applied to the cut out. However, if the upper pitch limit is not equal to the lower pitch limit, then it is determined that fill area is not included in the cut out and the "no" path is followed to step S2820 so that no border is applied.

The reason that this comparison is made is because the pitch limit algorithm stops the virtual camera from showing any of the fill area at either the upper or lower limit. In other words, unless the virtual camera is in the centre of the stitched image (i.e. centered between points A and B), then either the upper pitch limit or the lower pitch limit would stop the cut out from including the fill area. However, in the case that the upper and lower pitch limit is equal then the cut out must be located at the centre of the stitched image and by zooming out, fill area will be included in the cut out.

In the case that the upper pitch limit is (less than or) equal to the lower pitch limit, the vertical position of the virtual camera is prevented from moving either up or down and must at least be touching, if not already overlapping, both points A and B.

However, if the upper pitch limit is greater than the lower pitch limit, some movement of the vertical position of the virtual camera is allowed and the pitch limits algorithm will be keeping the virtual camera entirely within the stitched view; therefore, no blanking is required. Of course, although FIG. 30 shows that the determination as to whether the cut out includes fill area uses the fact that the upper and lower pitch limits are the same, the disclosure is not so limited. For example, once the lowest converted co-ordinate and the highest converted co-ordinate are calculated, if the lowest converted co-ordinate and the highest converted co-ordinate are not located in the cut out, then blanking is not applied to the cut out. However, if the lowest converted co-ordinate and the highest converted co-ordinate are in the cut out, then the blanking may be applied.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

It is envisaged that embodiments of the present disclosure may be performed on a computer and/or microprocessor. In this case, the disclosure may be embodied as a computer program that contains computer readable instructions that configure the computer and/or microprocessor to perform a method embodying the disclosure. It is envisaged that such a program may be stored on a computer readable medium such as an optical disk, hard drive or even signals transmitted over the Internet or any type of network. In this case, the disclosure may be embodied in such a form.

Clauses

Embodiments of the disclosure may be defined in general terms in the following numbered paragraphs.

1. A method of generating an image, comprising:
obtaining a first image comprised of a first area being a plurality of images having different field of views of a real-life scene and captured from a location above the real-life scene stitched together to form a panoramic view of the real-life scene, and a second area which does not include the plurality of images;
generating a second image which is a segment of the first image;
determining whether the second image includes only the first area; and when the second image includes both the first area and at least part of the second area, the method further comprises:
applying a border to the second image that extends along an upper boundary and along a lower boundary of the second image, the border being applied above the upper boundary and below the lower boundary.

2. A method according to clause 1, further comprising:
determining the co-ordinates of the upper corners of each of the plurality of images;
applying a transform to the upper corner co-ordinates to obtain transformed upper corner co-ordinates;
determining the co-ordinates of the lower corners of each of the plurality of images;
applying a transform to the lower corner co-ordinates to obtain transformed lower corner co-ordinates; and
determining the upper boundary as passing through the lowest of the transformed upper corner co-ordinates and determining the lower boundary as passing through the highest of the transformed lower corner co-ordinates.

3. A method according to clause 2, wherein the upper boundary is a horizontal line passing through the lowest transformed upper corner co-ordinate and the lower boundary is a horizontal line passing through the highest transformed lower co-ordinate.

4. A method according to either one of clauses 2 or 3, wherein the step of determining whether the second image includes only the first area comprises the steps of:
determining whether the second image includes the lowest of the transformed lower corner co-ordinates and the highest of the transformed upper corner co-ordinates, whereby when the second image does include both the lowest of the transformed upper corner co-ordinates and the highest of the transformed lower corner co-ordinates, then determining that the second image includes both the first area and the second area.

5. A method according to any one of clause 2 or 3, wherein the step of determining whether the second image includes only the stitched image comprises the steps of:
determining whether the centre of the second image is located between the lowest of the transformed lower corner co-ordinates and the highest of the transformed upper corner co-ordinates.

6. A computer program containing computer readable instructions which, when loaded onto a computer, configure the computer to perform a method according to any one of clauses 1 to 5.

7. A computer program product configured to store computer readable instructions, which when loaded onto a computer, configure the computer to perform a method according to any one of clauses 1 to 5.

8. A device for generating an image, comprising:
an imaging unit configured to obtain a first image comprised of a first area being a plurality of images having different field of views of a real-life scene and captured from a location above the real-life scene stitched together to form a panoramic view of the real-life scene, and a second area which does not include the plurality of images;
an image processing unit configured to i) generate a second image which is a segment of the first image;
ii) determine whether the second image includes only the first area; and when the second image includes both the first area and at least part of the second area, the image processing unit is further configured to:
apply a border to the second image that extends along an upper boundary and along a lower boundary of the second image, the border being applied above the upper boundary and below the lower boundary.

9. A device according to clause 8, wherein the image processing unit is further configured to: determine the co-ordinates of the upper corners of each of the plurality of images;
apply a transform to the upper corner co-ordinates to obtain transformed upper corner co-ordinates;
determine the co-ordinates of the lower corners of each of the plurality of images;
apply a transform to the lower corner co-ordinates to obtain transformed lower corner co-ordinates; and
determine the upper boundary as passing through the lowest of the transformed upper corner co-ordinates and determining the lower boundary as passing through the highest of the transformed lower corner co-ordinates.

10. A device according to clause 9, wherein the upper boundary is a horizontal line passing through the lowest transformed upper corner co-ordinate and the lower boundary is a horizontal line passing through the highest transformed lower co-ordinate.

11. A device according to either one of clauses 8 or 9, wherein the image processing unit is further configured, when determining whether the second image includes only the first area, to:

determine whether the second image includes the lowest of the transformed lower corner co-ordinates and the highest of the transformed upper corner co-ordinates, whereby when the second image does include both the lowest of the transformed upper corner co-ordinates and the highest of the transformed lower corner co-ordinates, then determining that the second image includes both the first area and the second area.

12. A device according to either one of clauses 9 or 10, wherein the image processing unit is further configured, when determining whether the second image includes only the stitched image to:

determine whether the centre of the second image is located between the lowest of the transformed lower corner co-ordinates and the highest of the transformed upper corner co-ordinates.

13. A method, device, computer program or computer program product as substantially hereinbefore described with reference to the accompanying drawings.

CROSS REFERENCE TO RELATED APPLICATIONS

The present application claims priority to United Kingdom Application 1306050.4 filed on 4 Apr. 2013 and United Kingdom Application 1320154.6 filed on 14 Nov. 2013, the contents of which are being incorporated herein by reference in their entirety.

The invention claimed is:

1. A method of generating an image, comprising:
obtaining a first image comprised of a first area being a plurality of images having different field of views of a real-life scene and captured from a location above the real-life scene stitched together to form a panoramic view of the real-life scene, and a second area which does not include the plurality of images;
generating a second image which is a segment of the first image;
determining whether the second image includes only the first area; and when the second image includes both the first area and at least part of the second area, the method further comprises:
determining a distance by which said at least part of the second area impinges into the second image; and
applying a border to the second image that extends along an upper boundary and along a lower boundary of the second image, the border being applied above the upper boundary and below the lower boundary to provide a letterbox view of a part of the second image, a dimension of the border being determined in accordance with the distance by which said at least part of the second area impinges into the second image such that the letterbox view excludes said at least part of the second area.

2. A method according to claim 1, wherein said determining the distance comprises:
determining the co-ordinates of the upper corners of each of the plurality of images;
applying a transform to the upper corner co-ordinates to obtain transformed upper corner co-ordinates;
determining the co-ordinates of the lower corners of each of the plurality of images;
applying a transform to the lower corner co-ordinates to obtain transformed lower corner co-ordinates; and
determining the upper boundary as passing through the lowest of the transformed upper corner co-ordinates and determining the lower boundary as passing through the highest of the transformed lower corner co-ordinates.

3. A method according to claim 2, wherein the upper boundary is a horizontal line passing through the lowest transformed upper corner co-ordinate and the lower boundary is a horizontal line passing through the highest transformed lower co-ordinate.

4. A method according to claim 2, wherein the step of determining whether the second image includes only the first area comprises the steps of:
determining whether the second image includes the lowest of the transformed lower corner co-ordinates and the highest of the transformed upper corner co-ordinates, whereby when the second image does include both the lowest of the transformed upper corner co-ordinates and the highest of the transformed lower corner co-ordinates, then determining that the second image includes both the first area and the second area.

5. A method according to claim 2, wherein the step of determining whether the second image includes only the stitched image comprises the steps of:
determining whether the centre of the second image is located between the lowest of the transformed lower corner co-ordinates and the highest of the transformed upper corner co-ordinates.

6. A non-transitory computer readable medium including computer program instructions, which when executed by a computer causes the computer to perform the method of claim 1.

7. A device for generating an image, comprising:
an imaging unit circuitry configured to obtain a first image comprised of a first area being a plurality of images having different field of views of a real-life scene and captured from a location above the real-life scene stitched together to form a panoramic view of the real-life scene, and a second area which does not include the plurality of images;
an image processing unit circuitry configured to i) generate a second image which is a segment of the first image;
ii) determine whether the second image includes only the first area; and when the second image includes both the first area and at least part of the second area, the image processing unit circuitry is further configured to:
determine a distance by which said at least part of the second area impinges into the second image; and
apply a border to the second image that extends along an upper boundary and along a lower boundary of the second image, the border being applied above the upper boundary and below the lower boundary to provide a letterbox view of a part of the second image, a dimension of the border being determined in accordance with the distance by which said at least part of the second area impinges into the second image such that the letterbox view excludes said at least part of the second area.

8. A device according to claim 7, wherein the image processing unit circuitry is configured to determine the distance by:
- determining the co-ordinates of the upper corners of each of the plurality of images;
- applying a transform to the upper corner co-ordinates to obtain transformed upper corner co-ordinates;
- determining the co-ordinates of the lower corners of each of the plurality of images;
- applying a transform to the lower corner co-ordinates to obtain transformed lower corner co-ordinates; and
- determining the upper boundary as passing through the lowest of the transformed upper corner co-ordinates and determining the lower boundary as passing through the highest of the transformed lower corner co-ordinates.

9. A device according to claim 8, wherein the upper boundary is a horizontal line passing through the lowest transformed upper corner co-ordinate and the lower boundary is a horizontal line passing through the highest transformed lower co-ordinate.

10. A device according to claim 8, wherein the image processing unit circuitry is further configured, when determining whether the second image includes only the stitched image to:
- determine whether the centre of the second image is located between the lowest of the transformed lower corner co-ordinates and the highest of the transformed upper corner co-ordinates.

11. A device according to claim 7, wherein the image processing circuitry unit is further configured, when determining whether the second image includes only the first area, to:
- determine whether the second image includes the lowest of the transformed lower corner co-ordinates and the highest of the transformed upper corner co-ordinates, whereby when the second image does include both the lowest of the transformed upper corner co-ordinates and the highest of the transformed lower corner co-ordinates, then determining that the second image includes both the first area and the second area.

* * * * *